US012192492B2

(12) United States Patent
Schierl et al.

(10) Patent No.: US 12,192,492 B2
(45) Date of Patent: *Jan. 7, 2025

(54) LOW DELAY PICTURE CODING

(71) Applicant: GE Video Compression, LLC, Albany, NY (US)

(72) Inventors: Thomas Schierl, Berlin (DE); Valeri George, Berlin (DE); Anastasia Henkel, Berlin (DE); Detlev Marpe, Berlin (DE); Karsten Grüneberg, Berlin (DE); Robert Skupin, Berlin (DE)

(73) Assignee: GE Video Compression, LLC, Niskayuna, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,622

(22) Filed: Mar. 8, 2022

(65) Prior Publication Data
US 2022/0264127 A1   Aug. 18, 2022

Related U.S. Application Data

(63) Continuation of application No. 16/514,052, filed on Jul. 17, 2019, now Pat. No. 11,343,517, which is a (Continued)

(51) Int. Cl.
*H04N 11/02* (2006.01)
*H04N 19/13* (2014.01)
(Continued)

(52) U.S. Cl.
CPC ........... *H04N 19/188* (2014.11); *H04N 19/13* (2014.11); *H04N 19/174* (2014.11);
(Continued)

(58) Field of Classification Search
CPC .. H04N 19/00884; H04N 19/46; H04N 19/91; H04N 19/188; H04N 19/174;
(Continued)

(56) References Cited

U.S. PATENT DOCUMENTS 5,020,121 A * 5/1991 Rosenberg ............... G09G 5/28
358/1.9
5,736,947 A * 4/1998 Imanaka ................. G06T 9/004
382/244
(Continued)

FOREIGN PATENT DOCUMENTS

CN      1795680 A      6/2006
CN      1526238 A      7/2006
(Continued)

OTHER PUBLICATIONS

Hendry; AHG4: Unified marker for Tiles' and WPP's entry points ; JCTVC-T0080 (Year: 2012).*

(Continued)

*Primary Examiner* — Philip P. Dang
(74) *Attorney, Agent, or Firm* — Morgan, Lewis & Bockius LLP

(57) ABSTRACT

Parallel processing concepts such as wavefront parallel processing, are realized with a reduced end-to-end delay by giving up the usual slice concept according to which slices are either coded/decoded completely independent from areas of the picture outside of the respective slice, or at least independent from areas outside the respective slice as far as the entropy coding is concerned, namely in favor of slices of different modes, namely ones called dependent slices which allow for interdependencies across slice boundaries, and others which do not, called normal slices, for example. Combined with the aspect or not, WPP processing concept (Continued)

is made more efficiently by using the slices' start syntax portions to locate WPP entry points.

19 Claims, 33 Drawing Sheets

Related U.S. Application Data continuation of application No. 16/153,307, filed on Oct. 5, 2018, now Pat. No. 10,674,164, which is a continuation of application No. 14/511,200, filed on Oct. 10, 2014, now Pat. No. 10,123,006, which is a continuation of application No. PCT/EP2013/057798, filed on Apr. 15, 2013.

(60) Provisional application No. 61/666,185, filed on Jun. 29, 2012, provisional application No. 61/624,098, filed on Apr. 13, 2012.

(51) Int. Cl.
| | |
|---|---|
| *H04N 19/169* | (2014.01) |
| *H04N 19/174* | (2014.01) |
| *H04N 19/436* | (2014.01) |
| *H04N 19/46* | (2014.01) |
| *H04N 19/463* | (2014.01) |
| *H04N 19/70* | (2014.01) |
| *H04N 19/91* | (2014.01) |
| H04N 19/593 | (2014.01) |

(52) U.S. Cl.
CPC ........... *H04N 19/436* (2014.11); *H04N 19/46* (2014.11); *H04N 19/463* (2014.11); *H04N 19/70* (2014.11); *H04N 19/91* (2014.11); H04N 19/593 (2014.11)

(58) Field of Classification Search
CPC ...... H04N 19/70; H04N 19/436; H04N 19/13; H04N 19/463; H04N 19/593
See application file for complete search history.

(56) References Cited

U.S. PATENT DOCUMENTS

| | | | |
|---|---|---|---|
| 5,786,858 A | 7/1998 | Yagasaki et al. | |
| 6,025,932 A * | 2/2000 | Imanaka | H04N 1/417 |
| | | | 358/448 |
| 6,111,916 A | 8/2000 | Talluri et al. | |
| 6,646,578 B1 * | 11/2003 | Au | H04N 19/61 |
| | | | 375/E7.129 |
| 6,894,628 B2 * | 5/2005 | Marpe | H03M 7/4006 |
| | | | 341/107 |
| 7,093,028 B1 | 8/2006 | Shao et al. | |
| 7,305,036 B2 * | 12/2007 | MacInnis | H04N 19/40 |
| | | | 375/E7.199 |
| 7,440,626 B2 | 10/2008 | Kong et al. | |
| 7,522,935 B2 | 4/2009 | Rey et al. | |
| 7,675,549 B1 | 3/2010 | Brower | |
| 7,738,560 B2 | 6/2010 | Gordon et al. | |
| 7,782,947 B2 | 8/2010 | Jeon et al. | |
| 7,884,743 B2 * | 2/2011 | Sakaguchi | H04N 19/91 |
| | | | 341/51 |
| 8,031,778 B2 * | 10/2011 | Kusakabe | H04N 19/176 |
| | | | 348/565 |
| 8,345,767 B2 | 1/2013 | Nanbu et al. | |
| 8,548,064 B2 | 10/2013 | Kitahara et al. | |
| 8,670,486 B2 | 3/2014 | Hannuksela | |
| 8,831,095 B2 | 9/2014 | Koto et al. | |
| 8,848,789 B2 | 9/2014 | Bao | |
| 8,885,731 B2 | 11/2014 | Tomo et al. | |
| 9,131,033 B2 | 9/2015 | Chen et al. | |
| 9,185,439 B2 | 11/2015 | Chen-et al. | |
| 9,215,473 B2 * | 12/2015 | Coban | H04N 19/174 |
| 9,930,562 B2 | 3/2018 | Lumbatis | |
| 2004/0175047 A1 | 9/2004 | Gormish et al. | |
| 2004/0223551 A1 | 11/2004 | Hannuksela | |
| 2006/0120610 A1 | 6/2006 | Kong et al. | |
| 2006/0268859 A1 | 11/2006 | Lee et al. | |
| 2007/0022215 A1 | 1/2007 | Singer et al. | |
| 2007/0036215 A1 | 2/2007 | Pan et al. | |
| 2007/0230574 A1 | 10/2007 | Valente | |
| 2008/0002767 A1 * | 1/2008 | Schwarz | H04N 19/174 |
| | | | 375/E7.153 |
| 2008/0013622 A1 * | 1/2008 | Bao | H04N 19/34 |
| | | | 375/240.18 |
| 2008/0031346 A1 * | 2/2008 | Segall | H04N 19/40 |
| | | | 375/E7.092 |
| 2008/0143710 A1 * | 6/2008 | Lee | G06T 11/20 |
| | | | 345/419 |
| 2008/0247459 A1 * | 10/2008 | Hu | H04N 19/91 |
| | | | 375/E7.199 |
| 2008/0285657 A1 | 11/2008 | Fu et al. | |
| 2008/0288441 A1 | 11/2008 | Lee et al. | |
| 2008/0292003 A1 | 11/2008 | Wang et al. | |
| 2009/0010337 A1 * | 1/2009 | Wang | H04N 19/563 |
| | | | 375/E7.123 |
| 2009/0010338 A1 * | 1/2009 | Wang | H04N 19/563 |
| | | | 375/240.16 |
| 2009/0022219 A1 | 1/2009 | Goel | |
| 2009/0028247 A1 * | 1/2009 | Suh | H04N 21/41407 |
| | | | 375/240.24 |
| 2009/0037959 A1 | 2/2009 | Suh et al. | |
| 2009/0097704 A1 | 4/2009 | Savidge | |
| 2009/0119730 A1 | 5/2009 | Perman et al. | |
| 2009/0122865 A1 | 5/2009 | Henocq et al. | |
| 2009/0175349 A1 * | 7/2009 | Ye | H04N 19/70 |
| | | | 375/240.23 |
| 2009/0213938 A1 * | 8/2009 | Lee | H04N 19/61 |
| | | | 375/E7.076 |
| 2009/0224950 A1 * | 9/2009 | Xu | H04N 19/61 |
| | | | 341/51 |
| 2009/0279604 A1 * | 11/2009 | Chono | H04N 19/15 |
| | | | 375/240.03 |
| 2009/0323809 A1 | 12/2009 | Raveendran | |
| 2010/0014590 A1 | 1/2010 | Smith | |
| 2010/0091837 A1 | 4/2010 | Zhu et al. | |
| 2010/0098155 A1 * | 4/2010 | Demircin | H03M 7/4006 |
| | | | 375/E7.126 |
| 2010/0098163 A1 | 4/2010 | Chiu et al. | |
| 2010/0135416 A1 | 6/2010 | Huang et al. | |
| 2010/0158099 A1 | 6/2010 | Kalva et al. | |
| 2010/0189182 A1 | 7/2010 | Hannuksela | |
| 2010/0208735 A1 | 8/2010 | Wiegand | |
| 2010/0238998 A1 | 9/2010 | Nanbu et al. | |
| 2010/0246662 A1 | 9/2010 | Koto et al. | |
| 2010/0246683 A1 * | 9/2010 | Webb | H04N 19/895 |
| | | | 375/E7.123 |
| 2010/0254620 A1 * | 10/2010 | Iwahashi | H04N 19/61 |
| | | | 382/233 |
| 2010/0284460 A1 | 11/2010 | Tsai et al. | |
| 2010/0296428 A1 | 11/2010 | Ho | |
| 2010/0322317 A1 * | 12/2010 | Yoshimatsu | H04N 19/44 |
| | | | 375/240.24 |
| 2011/0032999 A1 | 2/2011 | Chen | |
| 2011/0069153 A1 | 3/2011 | Nakane | |
| 2011/0087487 A1 * | 4/2011 | Neuman | G11B 20/10527 |
| | | | 704/201 |
| 2011/0116542 A1 * | 5/2011 | Oger | H04N 19/13 |
| | | | 375/240.03 |
| 2011/0188572 A1 | 8/2011 | Min et al. | |
| 2011/0200104 A1 * | 8/2011 | Korodi | H04N 19/44 |
| | | | 375/E7.076 |
| 2011/0228858 A1 | 9/2011 | Budagavi et al. | |
| 2011/0280314 A1 * | 11/2011 | Sankaran | H04N 19/44 |
| | | | 710/33 |
| 2011/0317769 A1 * | 12/2011 | Tanaka | H04N 19/46 |
| | | | 375/E7.2 |
| 2012/0008675 A1 * | 1/2012 | Karczewicz | H04N 19/176 |
| | | | 375/240.18 |

(56) References Cited

U.S. PATENT DOCUMENTS

| | | | |
|---|---|---|---|
| 2012/0014429 A1* | 1/2012 | Zhao | H04N 19/61 375/E7.026 |
| 2012/0014434 A1 | 1/2012 | Hong | |
| 2012/0014451 A1* | 1/2012 | Lee | H04N 19/436 375/E7.243 |
| 2012/0014454 A1 | 1/2012 | Budagavi et al. | |
| 2012/0027316 A1 | 2/2012 | Wang et al. | |
| 2012/0081241 A1* | 4/2012 | Misra | H03M 7/4093 341/107 |
| 2012/0082218 A1* | 4/2012 | Misra | H04N 19/46 375/E7.243 |
| 2012/0082232 A1 | 4/2012 | Sole Rojals et al. | |
| 2012/0082235 A1 | 4/2012 | Lou et al. | |
| 2012/0086587 A1* | 4/2012 | Sze | H04N 19/91 341/107 |
| 2012/0163457 A1* | 6/2012 | Wahadaniah | H04N 19/159 375/E7.243 |
| 2012/0189049 A1* | 7/2012 | Coban | H04N 19/96 375/E7.125 |
| 2012/0201306 A1 | 8/2012 | Kang et al. | |
| 2012/0230428 A1 | 9/2012 | Segall et al. | |
| 2012/0328003 A1 | 12/2012 | Chien et al. | |
| 2012/0328004 A1 | 12/2012 | Coban et al. | |
| 2013/0016786 A1 | 1/2013 | Segall | |
| 2013/0034171 A1 | 2/2013 | Winken et al. | |
| 2013/0107952 A1 | 5/2013 | Coban et al. | |
| 2013/0202050 A1 | 8/2013 | Koto et al. | |
| 2013/0294506 A1 | 11/2013 | Kang et al. | |
| 2014/0161190 A1 | 6/2014 | Park et al. | |
| 2014/0205008 A1 | 7/2014 | Wu | |
| 2014/0341549 A1 | 11/2014 | Hattori | |
| 2015/0208095 A1 | 7/2015 | Schierl et al. | |
| 2018/0220161 A1 | 8/2018 | Schierl et al. | |
| 2023/0188738 A1 | 6/2023 | Nalci et al. | |

FOREIGN PATENT DOCUMENTS

| | | |
|---|---|---|
| CN | 1957617 A | 5/2007 |
| CN | 101106711 A | 1/2008 |
| CN | 101110958 A | 1/2008 |
| CN | 101150719 A | 3/2008 |
| CN | 101283351 A | 10/2008 |
| CN | 101313578 A | 11/2008 |
| CN | 101385350 A | 3/2009 |
| CN | 101491097 A | 7/2009 |
| CN | 101552924 A | 10/2009 |
| CN | 101553988 A | 10/2009 |
| CN | 101568037 A | 10/2009 |
| CN | 101677430 B | 3/2010 |
| CN | 101690228 A | 3/2010 |
| CN | 101842988 A | 9/2010 |
| CN | 101878649 A | 11/2010 |
| CN | 101889442 A | 11/2010 |
| CN | 101939994 A | 1/2011 |
| CN | 101960853 A | 1/2011 |
| CN | 102474655 A | 5/2012 |
| EP | 1667460 A2 | 6/2006 |
| EP | 2136563 A2 | 12/2009 |
| EP | 3 481 068 A1 | 5/2019 |
| GB | 2360163 B | 9/2001 |
| GB | 2491164 A | 11/2012 |
| JP | H09-298668 A | 11/1997 |
| JP | 3133403 B2 | 2/2001 |
| JP | 3409552 B2 | 5/2003 |
| JP | 2005-347780 A | 12/2005 |
| JP | 2006180521 A | 7/2006 |
| JP | 2007-535208 A | 11/2007 |
| JP | 2008017331 A | 1/2008 |
| JP | 2009510888 A | 3/2009 |
| JP | 2009177787 A | 8/2009 |
| JP | 2010516085 A | 5/2010 |
| JP | 2010-130402 A | 6/2010 |
| JP | 2010174497 A | 8/2010 |
| JP | 2010-532121 A | 9/2010 |
| JP | 2010-232720 A | 10/2010 |
| JP | 2011-223358 A | 11/2011 |
| JP | 2013132048 A | 7/2013 |
| JP | 2013535886 A | 9/2013 |
| JP | 2013535900 A | 9/2013 |
| JP | 2013536623 A | 9/2013 |
| JP | 7140870 B2 | 9/2022 |
| KR | 10-2006-0079051 A | 7/2006 |
| KR | 101858200 B1 | 5/2018 |
| RU | 2093968 C1 | 10/1997 |
| RU | 2406258 C2 | 9/2007 |
| RU | 2374786 C1 | 11/2009 |
| RU | 2375839 C2 | 12/2009 |
| RU | 2384970 C1 | 3/2010 |
| TW | 488155 B | 5/2002 |
| TW | 527798 B | 4/2003 |
| TW | 200926654 A | 6/2009 |
| TW | 201105112 A1 | 2/2011 |
| TW | I362205 B | 4/2012 |
| WO | 1997/005747 A1 | 2/1997 |
| WO | 01/80570 A2 | 10/2001 |
| WO | 2003/043345 A1 | 5/2003 |
| WO | 2008/030067 A1 | 3/2008 |
| WO | 2010/050157 A1 | 5/2010 |
| WO | 2011/003084 A1 | 1/2011 |
| WO | 2011038021 A1 | 3/2011 |
| WO | 2011/100456 A1 | 8/2011 |
| WO | 2012/009566 A2 | 1/2012 |
| WO | 2012/033673 A1 | 3/2012 |
| WO | 2012/045037 A1 | 4/2012 |
| WO | 2012/121420 A1 | 9/2012 |
| WO | 2013/077236 A1 | 5/2013 |
| WO | 2013063094 A1 | 5/2013 |
| WO | 2013063425 A | 5/2013 |
| WO | 2013/161203 A1 | 10/2013 |
| WO | 2013151634 A1 | 10/2013 |

OTHER PUBLICATIONS

Bross, B; JCTVC-H1003: High efficiency video coding (HEVC) text specification draft 6, Feb. 1-10, 2012 (Year: 2012).*

Segall, A, Parallel Entropy Decoding for High Resolution Video Coding, Jan. 24, 2016 (Year: 2016).*

Official Action issued in corresponding Russian Patent Application No. 2020114791/07(024606) dated Dec. 3, 2020, with English translation.

Office Action issued in Korean Patent Application No. 10-2020-7030444 dated Jan. 6, 2021, with English translation.

Notice of Issuance issued in Chinese Patent Application No. 201810340438.2 dated Jan. 19, 2021.

Notice of Issuance issued in Chinese Patent Application No. 201810340459.4 dated Jan. 19, 2021.

Office Action issue in corresponding Chinese Patent Application No. 201910661351X dated Apr. 2, 2021, with English Translation.

Office Action issue in corresponding Japanese Patent Application No. 2019-132737 dated Feb. 25, 2021, with English Translation.

Office Action issue in corresponding Russian Patent Application No. 2019141081 dated Mar. 29, 2021, with English Translation.

Office Action issue in corresponding Israeli Patent Application No. 277485 dated Feb. 15, 2021.

Office Action issue in corresponding Ukrainian Patent Application No. a 2017 02253 dated Mar. 25, 2021, with English Translation.

Notice of Allowance issued in corresponding U.S. Appl. No. 16/819,652 dated Jun. 14, 2021.

Notice of Allowance issued in corresponding Mexican Application No. MX/a/2020/009883 dated May 27, 2021.

Office Action issued in corresponding Israeli Patent Application No. 268801 dated May 6, 2021, with English translation.

Office Action issued in corresponding Israeli Patent Application No. 283196 dated May 18, 2021.

Office Action issued in corresponding Taiwan Patent Application No. 108115080 dated May 3, 2021, with English translation.

Office Action issued in corresponding Japanese Patent Application No. 2019-186497 dated Jun. 29, 2021.

(56) References Cited

OTHER PUBLICATIONS

Office Action issued in corresponding Australian Patent Application No. 2020289848 dated Jul. 7, 2021.
Hearing Notice issued in corresponding Indian Patent Application No. 2390/KOLNP/2014 dated Aug. 9, 2021.
Office Action issued in corresponding U.S. Appl. No. 15/930,937 dated Jun. 29, 2021.
Office Action (Decision to Grant) issued in corresponding Russian Patent Application No. 2019141081 dated Aug. 17, 2021, with English translation.
Office Action issued in corresponding Malaysian Patent Application No. PI 2018000040 dated Aug. 19, 2021.
Office Action (Notice of Allowance) issued in corresponding Korean Patent Application No. 10-2020-7030444 dated Aug. 20, 2021, with English translation.
Notice of Eligibility of Grantis issued in corresponding Singapore Patent Application No. 10201702988R dated Nov. 8, 2021.
Office Action issued in corresponding Ukranian Patent Application No. a 2017 02384 dated Nov. 24, 2021, with English translation.
Chi Ching Chi, et al., "Parallel HEVC; Decoding on Multi- and Many-core Architectures", Journal of Signal Processing Systems, 71 (3), Jun. 2012. pp. 1-14.
Decision to Grant issued in corresponding Russian Patent Application No. 2020114791 dated Dec. 10, 2021, with English translation.
Office Action issued in corresponding Mexican Patent Application No. MX/a/2016/016671 dated Dec. 16, 2021.
Decision to Grant issued in corresponding Japanese Patent Application No. 2019-186497 dated Jan. 4, 2022.
Office Action issued in corresponding Korean Patent Application No. 10-2021-7037683 dated Jan. 7, 2022, with English translation.
Office Action issued in corresponding Chinese Patent Application No. 201910661351X dated Jan. 20, 2022, with English translation.
Notice of Allowance issued in corresponding U.S. Appl. No. 16/514,052 dated Dec. 29, 2021.
Final Office Action issued in corresponding U.S. Appl. No. 16/514,052 dated Jul. 7, 2021.
Office Action issued in corresponding U.S. Appl. No. 16/514,052 dated Mar. 15, 2021.
Final Office Action issued in corresponding U.S. Appl. No. 16/514,052 dated Aug. 28, 2020.
Notice of Allowance issued in corresponding U.S. Appl. No. 16/514,052 dated Dec. 12, 2019.
Office Action issued in corresponding U.S. Appl. No. 16/514,052 dated Aug. 14, 2019.
Office Action and Search Report issued in corresponding Russian Patent Application No. 2021129916 dated Jan. 13, 2022, with English translation.
Notice of Allowance issued in corresponding Israeli Patent Application No. 268801 dated Feb. 1, 2022 (Withdrawn (Feb. 16, 2022).
Office Action issued in corresponding Chinese Patent Application No. 2019108763916 dated Feb. 7, 2022.
Office Action issued in corresponding Israeli Patent Application No. 268801 dated Feb. 16, 2022, with English translation.
Office Action issued in corresponding Indian Patent Application No. 201938040831 dated Mar. 1, 2022.
Notice of Allowance issued in corresponding Patent Application in Taiwan 110128381 dated Mar. 2, 2022 with English translation.
Office Action issued in corresponding Australian Patent Application 2020289848 dated Mar. 3, 2022.
Office Action issued in corresponding Australian Patent Application 2021201682 dated Mar. 10, 2022.
Schwarz et al., "Overview of the Scalable Video Coding Extension of the H.264/AVC Standard", IEEE Transactions on Circuits and Systems for Video Technology, vol. 17, No. 9, Sep. 2007.
Office Action dated May 26, 2017 U.S. Appl. No. 14/511,200.
Office Action dated Jun. 20, 2017 in Japanese Patent Application No. 2016-160844.
T. Schierl et al., Dependent slices support in HEVC main profile, Joint Collaborative Team on Video Coding (JCT-VC) of ITU-T SG16 WP3 and ISO/IEC JTC1/SC29/WG11, 10th Meeting: Stockholm, SE, Jul. 11, Jul. 20, 2012, Jul. 2, 2012, JCTVC-J0264, URL:http://phenix-it-subparis.eu/jct/doc_end_user/documents/10-Stockholm/wg11/jctvc-j0264-v1.zip.
Chih-Wei Hsu et al., AHG4: Wavefront tile parallel processing, Joint Collaborative Team on Video Coding (JCT-VC) of ITU-T SG16 WP3 and ISO/IEC JTC1/SC29/WG11, 7th Meeting: Geneva, CH, Nov. 21-30, 2011, Nov. 27, 2011, JCTVC-G199 URL:http://phenix-it-subparis.eu/jct/doc_end_user/documents/7-Geneva/wg11/JCTVC-G199-v6.zip.
Decision to Grant dated Sep. 11, 2017 in Korean Application No. 10-2016-7034316.
Kiran Misra et al., "Entropy slices for parallel entropy coding", JCT-VC of ITU-T SG16 WP3 and ISO/IEC JTC1/SC29/WG11, 2nd Meeting: Geneva CH Jul. 21-28, 2010, Document: JCTVC-B 111.
Office Action dated Jan. 8, 2018 in U.S. Appl. No. 14/511,200.
Search Report issued Nov. 30, 2017 in Taiwanese Application 116111143.
Office Action issued Dec. 12, 2017 in Japanese Application 2017-019898.
MenHuang Lee et al., "ROI Slice SEI message", Joint Video Team (JVT) of ISO/IEC MPEG & ITU-T VCED (ISO/IEC TCT1/SC29/WG11 and ITU-T SG16 Q.6), 18th Meeting: Bangkok, Thailand, Jan. 2006, JVT-R024, pp. 1-8.
MenHuang Lee et al., "ROI Slice SEI message", Joint Video Team (JVT) of ISO/IEC MPEG & ITU-T VCED (ISO/IEC JTC1/SC29/WG11 and ITU-T SG16 Q.6), 19th Meeting: Geneva, Switzerland, Apr. 2006, JVT-S054r1, pp. 1-13.
Ye-Kui Wang et al., "Tile groups", Joint Collaborative Team on Video Coding (JCT-VC) of ITU-T SG16 WP3 and ISO/IEC JTC1/SC29/WG11, 8th Meeting: San Jose, CA, USA Jan. 2012, JCTVC-H0520r1, pp. 1-8.
R. Skupin et al., "Tile-based region-of-interest signaling with sub-picture SEI messages" Joint Collaborative Team on Video Coding (JCT-VC) of ITU-T SG16 WP3 and ISO/IEC JTC1/SC29/WG11, 11th Meeting: Shanghai, CN, Oct. 2012, JCTVC-K0218, pp. 1-3.
Office Action issued Dec. 26, 2017 in Japanese Application No. 2017-019896.
Yoshihisa Yamada et al., "Standardization trend of High-quality Video Coding Technics", Mitsubishi Electric Technical Report, Japan, Mitsubishi Electric Engineering Company Limited, Dec. 25, 2008, vol. 82, No. 12, pp. 7-10.
Office Action issued Dec. 1, 2017 in Taiwanese Application No. 106110824.
Examination Report issued in corresponding Canadian Patent Application No. 2,877,045 dated Apr. 23, 2018.
Muhammed Coban et al., "On Entropy Slices", Joint Collaborative Team on Video Coding (JCT-VC) of ITU-T SG16 WP3 and ISO/IEC JTC1/SC29/WG11, 8th Meeting: San Jose, CA, USA Jan. 2012, JCTVC-H0515r2, pp. 1-7.
Felix Henry et al, "Wavefront Parallel Processing", Joint Collaborative Team on Video Coding (JCT-VC) of ITU-T SG16 WP03 and ISO/IEC JTC1/SC29/WG11, 5th Meeting: Geneva, CH, Mar. 2011, JCTVC-E196, pp. 1-9.
Gordon Clare et al., "Wavefront and Cabac Flush: Different Degrees of Parallelism Without Transcoding", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F275, pp. 1-11.
Kiran Misra et al., "Harmonization of Entry Points for Tiles and Wavefront Processing", Joint Collaborative Team on Video Coding (JCT-VC) of ITU-T SG16 WP3 and ISO/IEC JTC1/SC29/WG11, 7th Meeting: Geneva, CH, Nov. 2011, JCTVC-G722-r1, pp. 1-4.
Notification of Reasons for Refusal Japanese Patent Application No. 2016-160844 dated Apr. 24, 2018 with English translation.
Non-final Office Action U.S. Appl. No. 15/928,742 dated Jul. 15, 2018.
Notice of Allowance U.S. Appl. No. 14/511,200 dated Jun. 22, 2018.
Notification of the First Office Action Chinese Patent Application No. 2016104209369 dated Jun. 27, 2018 with English translation.
Notification of the First Office Action Chinese Patent Application No. 2016104229593 dated Jul. 3, 2018 with English translation.

(56) References Cited

OTHER PUBLICATIONS

Notification of the First Office Action Chinese Patent Application No. 2016104153556 dated Jul. 2, 2018 with English translation.
Office Action Russian Patent Application No. 2016141337/08(066168) dated Aug. 16, 2018 with English translation.
Notification of Reasons for Refusal Japanese Patent Application No. 2017-019896 dated Jul. 17, 2018 with English translation.
Kimihiko Kazui et al., AHG9: Improvement of HRD for sub-picture based operation, Joint Collaborative Team on Video Coding (JCT-VC) of ITU-T SG16 WP3 and ISO/IEC JTC 1/SC/29/EG11, 10th Meeting: Stockholm, SE, Jul. 2012, JCTVC-J0136, pp. 1-10.
Non-final Office Action U.S. Appl. No. 16/153,307 dated Dec. 11, 2018.
Jie Zhao, Parallel entropy decoding for high resolution video coding, Visual Communications and Image Processing 2009, p. 1-12.
Notification of Reasons for Refusal Japanese Patent Application No. 2016-160844 dated Nov. 20, 2018.
Notice of Acceptance of Application dated Jan. 7, 2019 issued in Australian Patent Application No. 2016259446.
Office Action dated Dec. 26, 2018 issued in India Patent Application No. 2390/KOLNP/2014.
Notice of Allowance U.S. Appl. No. 15/928,742 dated Jan. 24, 2019.
Extended European Search Report EP Application No. 18211768.9 dated Feb. 27, 2019.
Notice of Allowance Taiwanese Patent Application No. 2107128325 dated Mar. 29, 2019.
Notification of Reasons for Refusal Japanese Patent Application No. 2017-019896 dated Feb. 20, 2019.
Notice of Allowance U.S. Appl. No. 16/153,307 dated Apr. 24, 2019.
Office Action Israeli Patent Application No. 261382 dated May 26, 2019.
Decision to Grant Japanese Patent Application No. 2016-160844 dated Jun. 18, 2019.
Notification to Grant Chinese Patent Application No. 201380031293.3 dated Jul. 3, 2019 with English translation.
Notice of Allowance Philippines Patent Application No. 1/2017/501901 dated Jul. 3, 2019.
Notice of Allowance Philippines Patent Application No. 1/2017/501900 dated Jul. 3, 2019.
Iffice Action Korean Patent Application No. 10-2019-7014099 dated Jul. 3, 2019 with English translation.
Office Action Korean Patent Application No. 10-2019-7014098 dated Jul. 3, 2019 with English translation.
Office Action Korean Patent Application No. 10-2019-7014097 dated Jul. 3, 2019 with English translation.
Office Action India Patent Application No. 3035/KOLNP/2014 dated Jul. 16, 2019 with English translation.
Examination report No. 1 issued in corresponding Australian Patent Application No. 2022201459; dated Apr. 20, 2022; 3 pages.
Notification of Reasons for Refusal issued in corresponding Japanese Patent Application No. 2021-062819; dated Mar. 14, 2022; 6 pages.
Decision to Grant a Patent issued in corresponding Korean Patent Application No. 10-2020-702774; dated Mar. 29, 2022; 8 pages.
ITU-T Recommendation H.264. Advanced video coding for generic audiovisual services. Mar. 2005, pp. 1-324.
Notice of Allowance U.S. Appl. No. 14/510,264 dated Apr. 2, 2018.
Non-final Office Action U.S. Appl. No. 14/510,264 dated Aug. 15, 2017.
Official Communication issued in corresponding International Application PCT/EP2013/057803, mailed on Oct. 31, 2013.
T. Wiegand et al., "Overview of the H.264/AVC Video Coding Standard", IEEE Transactions on Circuits and Systems for Video Technology, Jul. 2003, pp. 1-19.
B. Bross et al. "High Efficiency Video Coding (HEVC) Text Specification Draft 6", 8th JCT-VC Meeting, ITU-T SG 16 WP3 and ISO/IEC JTC1/SC29/WG11, Document: JCTVC-H1003, Feb. 1-10, 2012, 259 DOS.

Series H: Audiovisual and Multimedia Systems, Infrastructure of Audiovisual Services—Transmission Multiplexing and Synchronization, "Information Technology—Generic Coding of Moving Pictures and Associated Audio Information: Systems", International Standard ISO/IEC 13818-1, ITU-T Recommendation H.222.0, 2012, 234 pgs.
B. Bross et al., "High Efficiency Video Coding (HEVC) Text Specification Draft 7", 9th JCT-VC Meeting, ITU-T SG16 WP3 and ISO/IEC JTC1/SC29/WG11, Document JCTVC-I1003_d6, Apr. 27-May 7, 2012, 278 pgs.
M. Alvarez-Mesa et al., "Parallel Video Decoding in the Emerging HEVC Standard", IEEE ICASSP, 2012, pp. 1545-1548.
K. Misra et al., "Entropy Slices for Parallel Entropy Coding", 3rd JCT-VC Meeting, ITU-T SG16 WP3 and ISO/IEC JTC1/SC29/WG11, Document: JCTVC-C256, Oct. 7-15, 2010, DD. 1-6.
H. Schulzrinne et al., "RTP: A Transport Protocol for Real-Time Applications" Network Working Group, Request for Comments: 3550, Obsoletes: 1889, Category: Standards Track, Jul. 2003, DD. 1-78.
T. Lee et al., "Simplification on Tiles and Slices", 8th JC-VC Meeting, ITU-T SG16 WP3 and ISO/IEC JTC1/SC29/WG11, Document: JCTVC-H0348, Feb. 1-10, 2012, pp. 1-9.
T. Schierl et al., "Dependent Slices", 9th JCT-VC Meeting, ITU-T SG16 WP3 and ISO/IEC JTC1/SC29/WG11, Document: JCTVC-I0229, Apr. 27-May 7, 2012, pp. 1-7.
G. Clare et al., "Wavefront Parallel Processing for HEVC Encoding and Decoding", 6th JTC-VC Meeting, ITU-T SG16 WP3 and ISO/IEC JTC1/SC29/WG11, Document: JCTVC-F274, Jul. 14-22, 2011, pp. 1-16.
Y. Wang et al., "RTP Payload Format for H.264 Video", Internet Engineering Task Force, Request for Comments: 6184, Obsoletes: 3984, Category: Standards Track, ISSN: 2070-1721, May 2011, pp. 1-101.
S. Wenger et al., "RTP Payload Format for Scalable Video Coding", Internet Engineering Task Force, Request for Comments: 6190, Category: Standards Track, ISSN: 2070-1721, May 2011, DD. 1-100.
T. Schierl, et al., "RTP Payload Format for High Efficiency Video Coding Draft-Schierl-Payload-rtp-h265-03.txt", Network Working Group, Internet Draft, Intended Status: Standards Track, Jun. 11, 2013, pp. 1-69.
R. Skupin et al., "Generic HEVC High Level Syntax for Scalability and Adaption", 9th JCT-VC Meeting, ITU-T SG16 WP3 and ISO/IEC JTC1/SC29/WG11, Document: JCTVC-10217, Apr. 27-May 7, 2012, DD. 1-6.
J. Kang et al., "Simple NAL Unit Header for HEVC", 8th JCT-VC Meeting, ITU-T SG16 WP3 and ISO/IEC JTC1/SC29/WG11, Document: JCTVC-H0410, Feb. 1-10, 2012, pp. 1-5.
J. Boyce et al., "High Level Syntax Hooks for Future Extensions", 8th JCT-VC Meeting, ITU-T SG16 WP3 and ISO/IEC JTC1/SC29/WG11, Document: JCTVC-H0388, Feb. 1-10, 2012, DD. 1-8.
Y. Wang et al., "On SVC Scalability Information Related SEI Messages", 23rd JCT-VC Meeting, Iso/Iec Mpeg and ITU-T VCEG, (ISO/IEC JTC1/SC29/WG11 and ITU-T SG 16 Q 6), Document: JVT-W051, Apr. 21-27, 2007, pp. 1-14.
Y. Chen et al., "View Scalability Information SEI Message for MVC", 23rd JCT-VC Meeting, ISO/IEC MPEG and ITU-T VCEG, (ISO/IEC JTC1/SC29/WG11 and ITU-T SG 16 Q. 6) Document: JVT-W037, Apr. 21-27, 2007, pp. 1-10.
Y. Wang et al., "Sub-Picture Based CPB Operation", 9th JCT-VC Meeting, ITU-T SG16 WP3 and ISO/IEC JTC1/SC29/WG11, Document: JCTVC-10588, Apr. 27-May 7, 2012, pp. 1-2.
Y. Wang et al., "Sub-Picture-Level Low-Delay CPB Behavior", 9TH JCT-VC Meeting, ITU-T SG16 WP3 and ISO/IEC JTC1/SC29/WG11, Document: JCTVC-10349 Apr. 27-May 7, 2012, pp. 1-3.
T. Schierl et al., "Slice Prefix for Sub-Picture and Slice Level HLS Signaling," 10th JCT-VC Meeting, ITU-T SG16 WP3 and ISO/IEC JTC1/SC29/WG11, Document: JCTVC-J0255, Jul. 11-20, 2012, DD. 1-12.
Office Action and Search Report dated Jan. 28, 2016, issued in parallel Russian Patent Application No. 2014145559, with English translation, 6 pgs.

(56) References Cited

OTHER PUBLICATIONS

Office Action dated Feb. 23, 2016, issued in parallel Japanese Patent Application No. 2015-519177, with English translation, 29 pgs.
Sakae Okubo, (Supervisor), Impress Standard Textbook Series, Modified 3rd ed. H.264/AVC Textbook, 1st ed., Jan. 1, 2009, Impress R&D, Corporation, pp. 99-107, 185-193, ISBN: 978-4-8843-2664-9, 27 pg.
Office Action issued in parallel Japanese Patent Application No. 2015-504979 dated Nov. 17, 2015 with English translation, 26 pgs.
Xun Guo et al., "Ordered Entropy Slices for Parallel CABAG", [online], May 2, 2009, ITU-Telecommunications Standardization Sector Study Group 16 Question 6, Document: VCEG-AK25 (Filename: VCEG-AK25 r1 .doc) [Searched on Nov. 16, 20151, 11 pgs.
Tammy Lee et al., "Simplification on tiles and slices", [online] Feb. 1, 2011, Joint Collaborative Team on Video Coding (JCT-VC) of ITU-T SG16 WP3 and ISO/IEC JTC1/SC29/WG11, Document: JCTVC-H0348 (version 3), [Searched on Nov. 16, 2015], 15 pgs.
Hendry Sangoh Jeong et al., "AHG4: Harmonized Method for Signalling Entry Points of Tiles and WPP Substreams" [online], Feb. 10, 2011, Joint Collaborative Team on Video Coding (JCT-VC) of ITU-T SG16 WP3 and ISO/IEC JTC1/SC29/WG11, [Searched Nov. 16, 2015], 12 pages.
Office Action dated Apr. 4, 2016, issued in parallel Russian Application No. 2015102812, with English translation, 11 pgs.
European Search Report issued in European Application 16200327.1 dated Feb. 6, 2017.
Ye-Kui Wang et al., "AHG4: Tile Groups" 7, JCT-VC Meeting; 98, MPEG Meeting: Nov. 21, 2011-Nov. 30, 2011; Geneva (Joint Collaborative Team on Video Coding of ISO/IEC JTC1/SC29/WG11 and ITU-T SG.16); URL: http:/wftp3 itu.int/av-arch/jctvc-site/, No. JCTVC-G318, Nov. 9, 2011 XP030110302.
Fuldseth (Cisco) A:"Replacing slices with tiles for high level parallelism", JCT-VC Meeting; 95.MPEG Meeting: Jan. 20, 2011-Jan. 28, 2011: Daegu (Joint Collaborative Team on Video Coding of ISO/IEC JTC1/SC29/WG11and ITU-T SG.16); URU-ITTF-'!/WFTf-\3 !TU INT//.\V-/.\F?CH/JCTV(>SITEi No. JCTVC-0227, Jan. 15, 2011 XP030008267, ISSN: 0000-0013.
Office Action issued in Korean Application 10-2016-7034316 dated Jan. 4, 2017.
P. Lambert et al.,"11 Flexible macroblock ordering in H.264/AVC", Journal of Visual Communication and Image Representation, Academic Press, Inc., US, vol. 17, No. 2, Apr. 1, 2006, pp. 358-375, XP024905097, ISSN: 1047-3203, DOI: 10.1016/J.JVCI R 2005.05.008.
Office Action issued Feb. 24, 2017 in Taiwanese Patent Application No. 105130457.
Office Action issued Mar. 16, 2017 in European Patent Application No. 16206334.1.
M. Coban et al., "AHG4: Unification of picture partitioning schemes", 7. JCT-VC Meeting, 98, MPEG Meeting, Geneva, Nov. 2011 (Joint Collaborative Team on Video Codning of ISO/IEC JTC1/SC29/WG11 and ITU-T SG.16),UFi.L:HTTf-'//WFTF:31TU INT/AV.-Af-<CH/,J GTVC-SITE!, No. JCTV-G315, XP030110299.
Ching, Chi C. et al., "A OHO-capable parallel H.264 decoder", Supercomputing, ACM, New York, May 2011, pp. 317-326, XP0580037 41, DOI: 10.1145/1995896 1995945, ISBN 978-1-4503-0102-2.
Decision to Grant dated Mar. 21, 2017 in Japanese Application 2015-504980.
Sakai Okubo, "Impress Standard Textbook Series, revision 3rd ed. H264/AVC Textbook", Japan Impress R&D Co., Ltd. Jan. 1, 2009, 1st ed. pp. 315-319, ISBN:978-4-8443-2664-9.
R. Sjoberg et al, "NAL unit header concept with support for bit stream scalability" [online] Joint Collaborative Team on Video Coding (JCT-VC) of ITU-T SG16 WP3 and ISO/IECJTC1/SC29/WG11, Mar. 19, 2011, Document: JCTVC-E422, [Searched on Oct. 2, 2013], Internet URL: https://www.itu.int/rec/dologin_pub.asp?lang=e&id=T-REC-H.264-201201-SHPDF-E&type=items.
R. Sjoberg et al., "High-Level Syntax for Bitstream Extraction", [online], Joint Collaborative Team on Video Coding (JCT-VC) of ITU-TSG16 WP3 and ISO/IEC JTC1/SC29/WG11, Nov. 26, 2011,
Document: JCTVC-G607, [Searched on Nov. 8, 2013], Internet URL:http/phenix.it-subparis.eu/jct/doc_end_user/documents/7_Geneva/wg11/JCTVC-G607-v2.zip.
J. Boyce et al., "Information for scalable Extension highly layer syntax", [online], Joint Collaborative Team on Video Coding (JCT-VC) of ITU-T SG16 WP3 and ISO/IEC JTC1/SC29/WG11, Jan. 25, 2012, Document: JCTVC-H03896, [Searched on Dec. 20, 2013] Internet URL:http//phenix.it-subparis.eu/jct/doc_end_user/documents/8_San%Jose/wg11/JCTVS-H0386-v3.zip.
Office Action dated Mar. 24, 2017 in Chinese Application No. 201380031293.3.
Office Action dated Apr. 1, 2017 in Chinese Application No. 201380034944.4.
Office Action May 3, 2017 in Chinese Application No. 201380031308.6.
Office Action dated Jun. 22, 2017 in Australian Application 2016204304.
Office Action issued in corresponding Australian Patent Application 2020289848 issued Jun. 29, 2022.
Office Action issued in corresponding Brazilian Patent Application 11 2014 025496-6 issued Jun. 1, 2022.
Office Action issued in corresponding Brazilian Patent Application 1220200076216 issued Jun. 1, 2022.
Office Action issued in corresponding Brazilian Patent Application 11 2014 032687 8 issued Jun. 9, 2022.
Office Action issued in corresponding Canadian Patent Application No. 3,095,638 issued Jul. 18, 2022.
Office Action issued in corresponding Israeli Patent Application No. 283196 dated Apr. 4, 2022.
Office Action (Notice of Issuance) issued in corresponding Israeli Patent Application No. 268801 dated May 17, 2022.
Office Action (Notice of Issuance) issued in corresponding Chinese Patent Application No. 201910661351X dated May 20, 2022.
Office Action issued in corresponding Russian Patent Application No. 2021129916 dated May 13, 2022, with English translation.
Office Action issued in corresponding Russian Patent Application No. 2022103151 dated May 24, 2022, with English translation.
Office Action issued in corresponding Russian Patent Application No. 2021129920 dated May 18, 2022, with English translation.
Office Action (Notice of Issuance) issued in corresponding Chinese Patent Application No. 2019108763916 dated Jun. 15, 2022.
Office Action issued in corresponding Brazilian Patent Application No. BR1220200079142 dated Jun. 9, 2022.
Office Action issued in corresponding Brazilian Patent Application No. BR1220200079126 dated Jun. 9, 2022.
Office Action (Notice of Acceptance) issued in corresponding Australian Patent Application 2021201682 dated Jun. 27, 2022.
Office Action (Notice of Acceptance) issued in corresponding Australian Patent Application 2022201459 dated Aug. 4, 2022.
Office Action (Decision to Grant) issued in corresponding Japanese Patent Application 2021-062819 dated Aug. 5, 2022, with English translation.
Office Action (Notice before Examination) issued in corresponding Israeli Patent Application 295693 dated Aug. 17, 2022.
Office Action issued in corresponding Malaysian Patent Application PI 2018000457 dated Aug. 31, 2022, with English translation.
Office Action (Decision to Grant) issued in corresponding Korean Patent Application 10-2021-7037683 dated Aug. 24, 2022, with English translation.
Office Action (Notice for Eligibility of Grant) issued in corresponding Singapore Patent Application 10201809547W dated Sep. 6, 2022.
Office Action issued in corresponding Taiwanese Patent Application 110145622 dated Aug. 22, 2022, with English translation.
Sullivan et al., "Meeting Report of the ninth meeting of the Joint Collaborative Team on Video Coding (JCT-VC)", Joint Collaborative Team on Video Coding (JCT-VC) of ITU-T SG16 WP3 and JTC1/SC29/WG11 9th Meeting: Geneva, CH, Apr. 27-May 7, 2012, pp. 1-239.
Office Action Taiwanese Patent Application No. 107125227 dated Jun. 28, 2019 with English translation.
Notice of Allowance mailed Jul. 29, 2019 in Philippine Application 12017501899.
Office Action issued Aug. 22, 2019 in Israeli Application 268801.

(56) References Cited

OTHER PUBLICATIONS

Decision to Grant issued Sep. 10, 2019 in Japanese Application 2017-019896.
Office Action issued Sep. 10, 2019 in Korean Application 10-2018-7002787.
Office Action issued Sep. 11, 2019 in Australian Application 2018236689.
Office Action issued Oct. 30, 2019 in U.S. Appl. No. 16/025,319.
Notice of Allowance mailed Dec. 10, 2019 in U.S. Appl. No. 16/153,307.
Office Action issued Oct. 15, 2019 in Russian Patent Application 2016141337.
Decision to Grant issued Nov. 15, 2019 in Korean Application 10-2019-7014097.
Decision to Grant issued Nov. 15, 2019 in Korean Application 10-2019-7014098.
Office Action issued Nov. 26, 2019 in Mexican Application MX/a/2017/009967.
Office Action issued Nov. 25, 2019 in Philippine Application 1-2019-501219.
Office Action issued Dec. 10, 2019 in Australian Application 2019202551.
Decision to Grant mailed Jan. 3, 2020 in Korean Application 10-2019-7014099.
Office Action issued Nov. 26, 2019 in Japanese Application 2018-207464.
Office Action issued Jan. 9, 2020 in Russian Application 2019141081.
Office Action issued Feb. 25, 2020 in Chinese Application 201810340437.8.
Office Action issued Apr. 21, 2020 in U.S. Appl. No. 16/819,652.
Decision to Grant issued Feb. 28, 2020 in Russian Application 2017137234.
Office Action issued Mar. 24, 2020 in Chinese Application 201810340438.2.
Office Action issued Mar. 24, 2020 in Chinese Application 201810340459.4.
Office Action issued Apr. 8, 2020 in Chinese Application 201810340463.0.
Office Action issued Apr. 8, 2020 in Korean Application 10-2020-7004531.
Office Action issued May 9, 2020 in Singapore Application 10201809547W.
Kazui Kimihiko, et al., "Enhancement on operation of coded picture buffer", Joint Collaborative Team on Video Coding (JCT-VG) of ITU-T SG16 WP 3 and ISO/IEC JTC1/SC29/WG11, 7th Meeting: Geneva, CH, JCTVC-G188. 30, Nov. 2011.
Notice of Allowance mailed May 27, 2020 in Canadian Application 2877045.
Office Action mailed Aug. 17, 2020 in U.S. Appl. No. 16/819,652.
Office Action mailed Aug. 28, 2020 in U.S. Appl. No. 16/514,052.
Office Action issued Jun. 28, 2020 in Korean Application 10-2018-7002787.
Decision to Grant issued Jul. 22, 2020 in Korean Application 10-2020-7004531.
Office Action issued Jul. 13, 2020 in Mexican Application MX/a/2017/009967.
Notice of Allowance issued Jul. 20, 2020 in Taiwanese Application 107125227.
Office Action issued Jul. 1, 2020 in Brazilian Application 1120140326878.
Notice of Issuance issued Aug. 28, 2020 in Chinese Application 201810340437.8.
Office Action issued Jul. 6, 2020 in Brazilian Application 112014025496-6.
Notice of Acceptance issued Sep. 10, 2020 in Australian Application 2018236689.
Gordon Clare et al.; "AHG 4: Picture Raster Scan Decoding in the presence of multiple tiles"; JCT-VG of ITU-T SG 16 WP 3 and ISO/IEC JTC 1/SC 29/WG 11, JCTVC-I0158, 9th Meeting: Geneva, CH, Apr. 27-May 7, 2012.
Notice Before Hearing issued Sep. 23, 2020 in Israeli Application 277 485.
Office Action mailed Oct. 19, 2020 in U.S. Appl. No. 16/709,971.
Office Action issued Sep. 1, 2020 in Japanese Application 2019-132737.
Office Action issued Sep. 15, 2020 in Brazilian Application 1220200076216.
Decision to Grant issued Oct. 13, 2020 in Japanese Application 2018-207464.
Office Action issued Sep. 15, 2020 in Brazilian Application 1220200079126.
Office Action issued Sep. 15, 2020 in Brazilian Application 1220200079142.
Notice of Allowance issued in corresponding Canadian Patent Application No. 3,056,122 dated Nov. 13, 2020.
Notice of Issuance issued in corresponding Chinese Patent Application No. 201810340463.0 dated Dec. 4, 2020.
Extended European Search Report issued in corresponding European Patent Application No. 20190474.5 dated Nov. 26, 2020.
Office Action issued in corresponding Korean Patent Application 10-2022-7022147 dated Feb. 8, 2023, with English translation.
Office Action issued in corresponding Russian Patent Application 2022118841 dated Feb. 10, 2023, with English translation.
Office Action issued in corresponding Japanese Patent Application 2022-015321 dated Feb. 7, 2023, with English translation.
Office Action (Extended European Search Report) issued in corresponding European Patent Application 22206072.5 dated Mar. 16, 2023.
Office Action (Notice before Examination) issued in corresponding Israeli Patent Application 301488 dated Mar. 20, 2023.
Office Action (Notice of Allowance) issued in corresponding Mexican Patent Application MX/a/2016/016671 dated Feb. 27, 2023.
Office Action issued in corresponding Korean Patent Application 10-2022-7041490 dated Mar. 7, 2023, with English translation.
Office Action (Notice before Allowance) issued in corresponding Israeli Patent Application No. 283196 dated Dec. 4, 2022.
Office Action issued in corresponding Indonesian Patent Application No. P00202002290 dated Oct. 17, 2022, with English translation.
Office Action issued in corresponding Brazilian Patent Application No. BR1220200079126 dated Nov. 18, 2022.
Office Action issued in corresponding Brazilian Patent Application No. BR 11 2014 025496-6 dated Nov. 9, 2022.
Office Action issued in corresponding Brazilian Patent Application No. BR 1220200076216 dated Nov. 9, 2022.
Office Action (Notice of Issuance) issued in corresponding Brazilian Patent Application No. BR 11 2014 032687 8 dated Nov. 18, 2022.
Office Action (Notice of Issuance) issued in corresponding Brazilian Patent Application No. BR 1220200079142 dated Nov. 18, 2022.
Office Action issued in corresponding Australian Patent Application No. 2022252837 dated Dec. 7, 2022, with English translation.
Summons to attend oral proceedings issued in corresponding European Patent No. 3151566 dated Sep. 22, 2022.
Fuldseth, A., et al., "Tiles", Joint Collaborative Team on Video Coding (JCT-VC) of ITU-T SG16 WP3 and ISO/IEC JTC1/SC29/WG11 6th Meeting: Torino, IT, Jul. 14-22, 2011, JCTVC-F335.
Sullivan, G., et al., "Meeting report of the 10th meeting of the Joint Collaborative Team on Video Coding (JCT-VC)", Joint Collaborative Team on Video Coding (JCT-VC) of ITU-T SG16 WP3 and ISO/IEC JTC1/SC29/WG11, Stockholm, SE, Jul. 11-20, 2012, J_Notes_dB.
Kanumuri, S., et al., "AHG4: Category-prefixed data batching for tiles and wavefronts", oint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, JCTVC-10427.
Hendry, Byeong Moon Jeon, "AHG4: Unified marker for Tiles' and WPP's entry points", Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, JCTVC-10080.
Certified priority document of U.S. Appl. No. 61/666,185.
Fuldseth, A., et al., "Tiles for Managing Computational Complexity of Video Encoding and Decoding", 2012 Picture Coding Symposium, May 7-9, 2012, Krakow, Poland, pp. 389-392.

(56) References Cited

OTHER PUBLICATIONS

Hannuksela, M.M., et al., "Nested hierarchy of tiles and slices through slice header prediction", Joint Collaborative Team on Video Coding (JCT-VC) of ITU-T SG 16 WP 3 and ISO/IEC JTC, /SC 29/WG 11 9th Meeting: Geneva, CH Uploaded Apr. 30, 2012, presented Apr. 27-May 7, 2012.
De Schrijver, Davy, et al. "Exploitation of Interactive Region of Interest Scalabilityin Scalable Video Coding by Using an XML-driven Adaptation Framework" Proceedings of the 2nd International conference on automated production of cross media content for multi-channel distribution, Leeds, UK Dec. 13-15, 2006.
Office Action issued in corresponding Mexican Patent Application MX/a/2016/016671 dated Sep. 2, 2022, with English translation.
Office Action (Decision to Grant) issued in corresponding Russian Patent Application 2021129920 dated Sep. 30, 2022, with English translation.
Office Action (Decision to Grant) issued in corresponding Russian Patent Application 2021129916 dated Oct. 10, 2022, with English translation.
Office Action issued in corresponding Australian Patent Application 2022268403 dated Jan. 5, 2023.
Office Action (Notice before Examination) issued in corresponding Israeli Patent Application 299951 dated Jan. 18, 2023.
Office Action (Notice of Allowance) issued in corresponding Vietnamese Patent Application 1-2019-02772 dated Dec. 26, 2022, with English translation.
Office Action (Notice of Allowance) issued in corresponding Vietnamese Patent Application 1-2019-02774 dated Dec. 26, 2022, with English translation.
Office Action (Notice of Allowance) issued in corresponding Vietnamese Patent Application 1-2019-02771 dated Dec. 26, 2022, with English translation.
Office Action (Notice of Allowance) issued in corresponding Vietnamese Patent Application 1-2019-02773 dated Dec. 26, 2022, with English translation.
Office Action issued in corresponding U.S. Appl. No. 17/321,505 dated Dec. 1, 2022.
Office Action issued in corresponding U.S. Appl. No. 17/587,849 dated Feb. 16, 2023.
Notice of Allowance issued in corresponding U.S. Appl. No. 17/321,505 dated May 11, 2023.
Office Action (Notice of Allowance) issued in corresponding Thai Patent Application 1401006173 dated Jun. 12, 2023.
Office Action issued in corresponding Taiwanese Patent Application 111119402 dated May 30, 2023, with English translation.
Office Action issued in corresponding Thai Patent Application 1401007775 dated Jul. 10, 2023.
Office Action issued in corresponding Chinese Patent Application 2022108941811 dated Jun. 29, 2023.
Notice of Acceptance issued in corresponding Australian Patent Application 2022268403 dated Jun. 1, 2023.
Office Action (Notice of Allowance) issued in corresponding Israeli Patent Application 301488 dated Jul. 20, 2023.
Office Action issued in corresponding Chinese Patent Application 202210892463.8 dated May 7, 2023.
Office Action issued in corresponding Israeli Patent Application 299951 dated May 23, 2023.
Notice of Allowance issued in corresponding Canadian Patent Application 3,095,638 dated May 29, 2023.
Notice of Allowance issued in corresponding Taiwanese Patent Application 110145622 dated May 22, 2023, with English translation.
Communication issued in corresponding European Patent 3 151 566 dated Jun. 5, 2023.
Kiran Misra et al., "New results for parallel decoding for Tiles", Joint Collaborative Team on Video Coding (JCT-VC) of ITU-T SG16 WP3 and 1S0/IEC JTC1/SC29/WG11 6th Meeting: Torino, IT, Jul. 14-22, 2011.
Kiran Misra et al., "JCTVC: New results for parallel decoding of tiles (JCTVCVV-E412)", SHARP Laboratories of America.
Sullivan, G., et al., "Meeting report of the sixth meeting of the Joint Collaborative Team on Video Coding (JCT-VC), Torino, IT, Jul. 14-22, 2011", JCT-VC of ITU-T SG16 WP3 and ISO/IEC JTC1/SC29/WG11, 6th Meeting: Torino, IT, Jul. 14-22, 2011, JCTVC-F800.
Office Action issued in corresponding Chinese Patent Application 202210892454.9 dated Jun. 10, 2023.
Notice of Allowance issued in corresponding Vietnamese Application No. 1-2018-05191 dated Jun. 30, 2023, with English translation.
Office Action issued in corresponding Japanese Patent Application No. 2022-142936 dated Jul. 11, 2023, with English translation.
Office Action issued in corresponding Israeli Application No. 292629 dated Aug. 16, 2023.
Office Action issued in corresponding Chinese Patent Application No. 202210892431.8 dated Aug. 12, 2023.
Office Action issued in corresponding Brazilian Patent Application BR1220200079126 dated Mar. 8, 2023.
Opposition by Unified Patents, LLC to EP 3151566 (EP 16200327.1) dated Mar. 22, 2023.
Wang, Y.-K., et al., "Text for tiles, WPP and entropy slices", JCT-VC of ITU-T SG16 WP3 and ISO/IEC JTC1/SC29/WG11, 8th Meeting: San José, US, Feb. 1-10, 2012, JCTVC-H0737.
Bross, B., et al., "WD 5: Working Draft 5 of High-Efficiency Video Coding", JCT-VC of ITU-T SG16 WP3 and ISO/IEC JTC1/SC29/WG11, 7th Meeting: Geneva, CH, Nov. 21-30, 2011, JCTVC-G1103_d9.
Apostolopoulos, J., et al., "Video streaming: Concepts, algorithms, and systems", Hewlett-Packard Company, Nov. 2002.
ITU-T—T.810 (May 2006), Series T: Terminals for Telematic Services, Information technology—JPEG 2000 image coding system: Wireless.
Bradley, A.P., et al., "JPEG 2000 and Region of Interest Coding", DICTA2002: Digital Image Computing Techniques and Applications, Melbourne, AU, Jan. 21-22, 2002.
Grangetto, M., et al., "Retransmission Strategies for Optimized JPEG 2000 Image Transmission in Wireless Environment", 12th European Signal Processing Conference, Vienna, AT, 2004, pp. 253-256.
Grangetto, M., et al., "Error Sensitivity Data Structures and Retransmission Strategies for Robust JPEG 2000 Wireless Imaging", IEEE Transactions on Consumer Electronics, vol. 49, No. 4, Nov. 2003.
Wikipedia entry for "Retransmission (data networks)" as of Nov. 18, 2011, retrieved from Wayback Machine at archive.org.

* cited by examiner

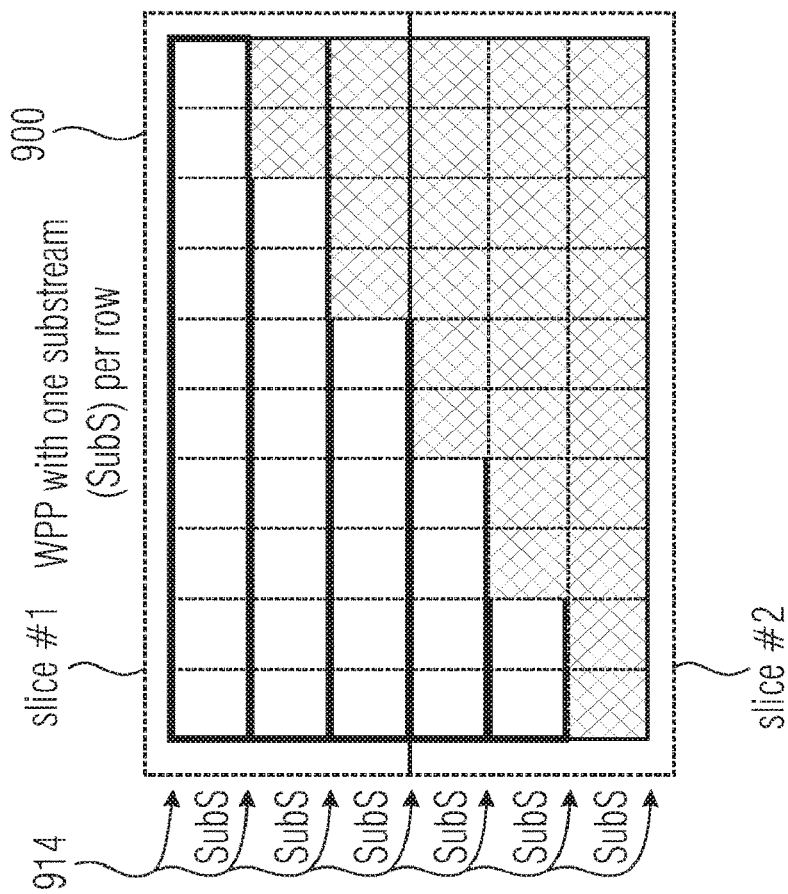
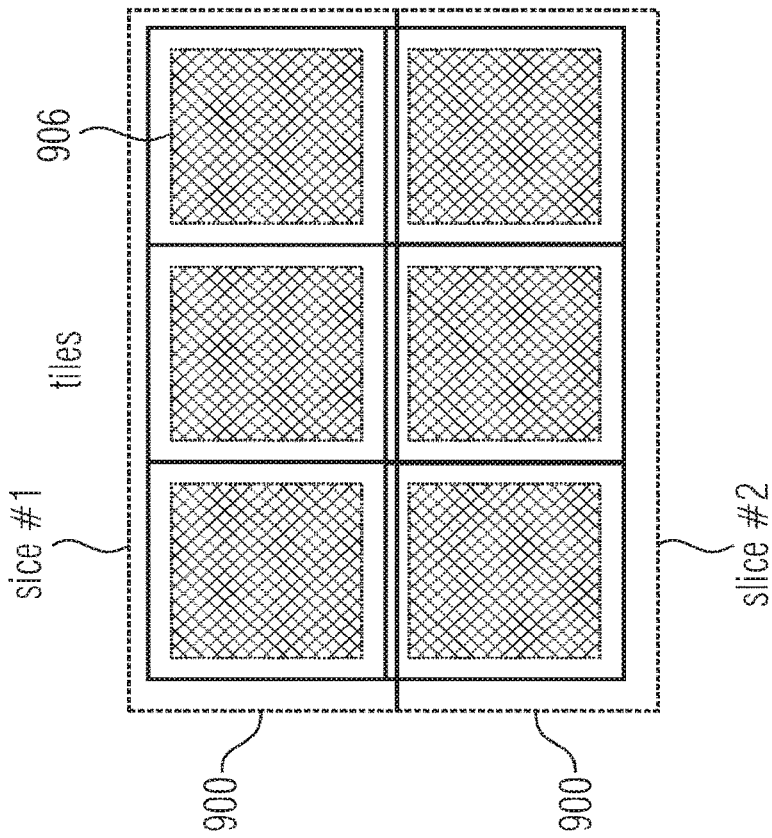
FIG 3

| seq_parameter_set_rbsp( ) { | Descriptor |
|---|---|
|    profile_idc | u(8) |
|    reserved_zero_8bits /* equal to 0 */ | u(8) |
|    level_idc | u(8) |
|    seq_parameter_set_id | ue(v) |
|    chroma_format_idc | ue(v) |
|    if( chroma_format_idc  = =  3 ) | |
|       separate_colour_plane_flag | u(1) |
|    max_temporal_layers_minus1 | u(3) |
|    pic_width_in_luma_samples | ue(v) |
|    pic_height_in_luma_samples | ue(v) |
|    pic_cropping_flag | u(1) |
|    if( pic_cropping_flag ) { | |
|       pic_crop_left_offset | ue(v) |
|       pic_crop_right_offset | ue(v) |
|       pic_crop_top_offset | ue(v) |
|       pic_crop_bottom_offset | ue(v) |
|    } | |
|    bit_depth_luma_minus8 | ue(v) |
|    bit_depth_chroma_minus8 | ue(v) |
|    pcm_enabled_flag | u(1) |
|    if( pcm_enabled_flag ) { | |
|       pcm_bit_depth_luma_minus1 | u(4) |
|       pcm_bit_depth_chroma_minus1 | u(4) |
|    } | |
|    qpprime_y_zero_transquant_bypass_flag | u(1) |
|    log2_max_pic_order_cnt_lsb_minus4 | ue(v) |
|    for( i = 0; i < = max_temporal_layers_minus1; i+ + ) { | |
|       max_dec_pic_buffering[ i ] | ue(v) |

| | |
|---|---|
| num_reorder_pics[ i ] | ue(v) |
| max_latency_increase[ i ] | ue(v) |
| } | |
| restricted_ref_pic_lists_flag | u(1) |
| if( restricted_ref_pic_lists_flag ) | |
|    lists_modification_present_flag | u(1) |
| log2_min_coding_block_size_minus3 | ue(v) |
| log2_diff_max_min_coding_block_size | ue(v) |
| log2_min_transform_block_size_minus2 | ue(v) |
| log2_diff_max_min_transform_block_size | ue(v) |
| if( pcm_enabled_flag ) { | |
|    log2_min_pcm_coding_block_size_minus3 | ue(v) |
|    log2_diff_max_min_pcm_coding_block_size | ue(v) |
| } | |
| max_transform_hierarchy_depth_inter | ue(v) |
| max_transform_hierarchy_depth_intra | ue(v) |
| scaling_list_enable_flag | |
| chroma_pred_from_luma_enabled_flag | u(1) |
| deblocking_filter_in_aps_enabled_flag | u(1) |
| seq_loop_filter_across_slices_enabled_flag | u(1) |
| asymmetric_motion_partitions_enabled_flag | u(1) |
| non_square_quadtree_enabled_flag | u(1) |
| sample_adaptive_offset_enabled_flag | u(1) |
| adaptive_loop_filter_enabled_flag | u(1) |
| if( adaptive_loop_filter_enabled_flag ) | |
|    alf_coef_in_slice_flag | u(1) |
| if( pcm_enabled_flag ) | |
|    pcm_loop_filter_disable_flag | u(1) |
| temporal_id_nesting_flag | u(1) |

FIG 11B

| FIG 11 | FIG 11A |
|---|---|
| | FIG 11B |
| | FIG 11C |

| | |
|---|---|
| if( log2_min_coding_block_size_minus3 == 0 ) | |
|     inter_4x4_enabled_flag | u(1) |
| num_short_term_ref_pic_sets | ue(v) |
| for( i = 0; i < num_short_term_ref_pic_sets; i++ ) | |
|     short_term_ref_pic_set( i ) | |
| long_term_ref_pics_present_flag | u(1) |
| tiles_or_entropy_coding_sync_idc | u(2) |
| if( tiles_or_entropy_coding_sync_idc == 1 ) { | |
|     num_tile_columns_minus1 | ue(v) |
|     num_tile_rows_minus1 | ue(v) |
|     uniform_spacing_flag | u(1) |
|     if( !uniform_spacing_flag ) { | |
|         for( i = 0; i < num_tile_columns_minus1; i++ ) | |
|             column_width[ i ] | ue(v) |
|         for( i = 0; i < num_tile_rows_minus1; i++ ) | |
|             row_height[ i ] | ue(v) |
|     } | |
|     loop_filter_across_tiles_enabled_flag | u(1) |
| } | |
| vui_parameters_present_flag | u(1) |
| if( vui_parameters_present_flag ) | |
|     vui_parameters( ) | |
| sps_extension_flag | u(1) |
| if( sps_extension_flag ) | |
|     while( more_rbsp_data( ) ) | |
|         sps_extension_data_flag | u(1) |
| rbsp_trailing_bits( ) | |
| } | |

FIG 11C

| FIG 11 | FIG 11A |
|---|---|
| | FIG 11B |
| | FIG 11C |

| pic_parameter_set_rbsp( ) { | Descriptor |
|---|---|
| pic_parameter_set_id | ue(v) |
| seq_parameter_set_id | ue(v) |
| sign_data_hiding_flag | u(1) |
| if( sign_data_hiding_flag ) | |
| sign_hiding_threshold | u(4) |
| cabac_init_present_flag | u(1) |
| num_ref_idx_l0_default_active_minus1 | ue(v) |
| num_ref_idx_l1_default_active_minus1 | ue(v) |
| pic_init_qp_minus26 | se(v) |
| constrained_intra_pred_flag | u(1) |
| enable_temporal_mvp_flag | u(1) |
| slice_granularity | u(2) |
| max_cu_qp_delta_depth | ue(v) |
| cb_qp_offset | se(v) |
| cr_qp_offset | se(v) |
| weighted_pred_flag | u(1) |
| weighted_bipred_idc | u(2) |
| output_flag_present_flag | u(1) |
| if( tiles_or_entropy_coding_sync_idc = = 1 ) { | |
| tile_info_present_flag | u(1) |
| tile_control_present_flag | u(1) |
| if( tile_info_present_flag) { | |
| num_tile_columns_minus1 | ue(v) |

FIG 12A

| FIG 12 | FIG 12A |
|---|---|
| | FIG 12B |

| | |
|---|---|
| num_tile_rows_minus1 | ue(v) |
| uniform_spacing_flag | u(1) |
| if( !uniform_spacing_flag ) { | |
|    for( i = 0; i < num_tile_columns_minus1; i++ ) | |
|       column_width[ i ] | ue(v) |
|    for( i = 0; i < num_tile_rows_minus1; i++ ) | |
|       row_height[ i ] | ue(v) |
|    } | |
| } | |
| if( tile_control_present_flag) | |
|    loop_filter_across_tiles_enabled_flag | u(1) |
| } else if( tiles_or_entropy_coding_sync_idc == 2 ) | |
|    num_substreams_minus1 | ue(v) |
| deblocking_filter_control_present_flag | u(1) |
| if( slice_type == P || slice_type == B ) | |
|    log2_parallel_merge_level_minus2 | ue(v) |
| pps_extension_flag | u(1) |
| if( pps_extension_flag ) | |
|    while( more_rbsp_data( ) ) | |
|       pps_extension_data_flag | u(1) |
| rbsp_trailing_bits( ) | |
| } | |

FIG 12B

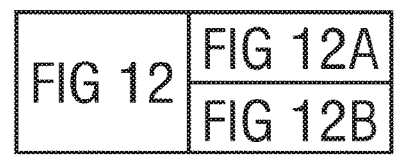

| | |
|---|---|
| slice_header( ) { | Descriptor |
|   first_slice_in_pic_flag | u(1) |
|   if( first_slice_in_pic_flag == 0 ) | |
|     slice_address | u(v) |
|   slice_type | ue(v) |
|   entropy_slice_flag | u(1) |
|   if( !entropy_slice_flag ) { | |
|     pic_parameter_set_id | ue(v) |
|     if( output_flag_present_flag ) | |
|       pic_output_flag | u(1) |
|     if( separate_colour_plane_flag == 1 ) | |
|       colour_plane_id | u(2) |
|     if( IdrPicFlag ) { | |
|       idr_pic_id | ue(v) |
|       no_output_of_prior_pics_flag | u(1) |
|     } else { | |
|       pic_order_cnt_lsb | u(v) |
|       short_term_ref_pic_set_sps_flag | u(1) |
|       if( !short_term_ref_pic_set_sps_flag) | |
|         short_term_ref_pic_set( num_short_term_ref_pic_sets ) | |
|       else | |
|         short_term_ref_pic_set_idx | u(v) |
|       if( long_term_ref_pics_present_flag ) { | |
|         num_long_term_pics | ue(v) |
|         for( i = 0; i < num_long_term_pics; i++ ) { | |
|           delta_poc_lsb_lt[ i ] | ue(v) |
|           delta_poc_msb_present_flag[ i ] | u(1) |
|           if( delta_poc_msb_present_flag[ i ] ) | |
|             delta_poc_msb_cycle_lt_minus1[ i ] | ue(v) |
|           used_by_curr_pic_lt_flag[ i ] | u(1) |
|         } | |
|       } | |
|     } | |
|     if( sample_adaptive_offset_enabled_flag ) { | |
|       slice_sao_interleaving_flag | u(1) |
|       slice_sample_adaptive_offset_flag | u(1) |

FIG 13A

| FIG 13 | FIG 13A |
|---|---|
| | FIG 13B |
| | FIG 13C |

| | |
|---|---|
| if( slice_sao_interleaving_flag && slice_sample_adaptive_offset_flag ) { | |
| sao_cb_enable_flag | u(1) |
| sao_cr_enable_flag | u(1) |
| } | |
| } | |
| if( scaling_list_enable_flag \|\| deblocking_filter_in_aps_enabled_flag \|\| ( sample_adaptive_offset_enabled_flag ) && !slice_sao_interleaving_flag ) \|\| adaptive_loop_filter_enabled_flag ) | |
| aps_id | ue(v) |
| if( slice_type == P \|\| slice_type == B ) { | |
| num_ref_idx_active_override_flag | u(1) |
| if( num_ref_idx_active_override_flag ) { | |
| num_ref_idx_l0_active_minus1 | ue(v) |
| if( slice_type == B ) | |
| num_ref_idx_l1_active_minus1 | ue(v) |
| } | |
| } | |
| if( lists_modification_present_flag ) { | |
| ref_pic_list_modification( ) | |
| ref_pic_list_combination( ) | |
| } | |
| if( slice_type == B ) | |
| mvd_l1_zero_flag | u(1) |
| } | |
| if( cabac_init_present_flag && slice_type != I ) | |
| cabac_init_flag | u(1) |
| if( !entropy_slice_flag ) { | |
| slice_qp_delta | se(v) |
| if( deblocking_filter_control_present_flag ) { | |
| if( deblocking_filter_in_aps_enabled_flag ) | |
| inherit_dbl_params_from_aps_flag | u(1) |
| if( !inherit_dbl_params_from_aps_flag ) { | |
| disable_deblocking_filter_flag | u(1) |
| if( !disable_deblocking_filter_flag ) { | |
| beta_offset_div2 | se(v) |

FIG 13B

| FIG 13 | FIG 13A |
|---|---|
| | FIG 13B |
| | FIG 13C |

| | |
|---|---|
| tc_offset_div2 | se(v) |
| } | |
| } | |
| } | |
| if( slice_type = = B ) | |
| collocated_from_l0_flag | u(1) |
| if( slice_type != I && | |
| ((collocated_from_l0_flag && num_ref_idx_l0_active_minus1 > 0 ) \|\| | |
| (!collocated_from_l0_flag && num_ref_idx_l1_active_minus1 > 0 ) ) | |
| collocated_ref_idx | ue(v) |
| if( ( weighted_pred_flag && slice_type = = P) \|\| | |
| ( weighted_bipred_idc = = 1 && slice_type = = B ) ) | |
| pred_weight_table( ) | |
| } | |
| if( slice_type = = P \|\| slice_type = = B ) | |
| five_minus_max_num_merge_cand | ue(v) |
| if( adaptive_loop_filter_enabled_flag ) { | |
| slice_adaptive_loop_filter_flag | u(1) |
| if( slice_adaptive_loop_filter_flag && alf_coef_in_slice_flag ) | |
| alf_param( ) | |
| if( slice_adaptive_loop_filter_flag && !alf_coef_in_slice_flag ) | |
| alf_cu_control_param( ) | |
| } | |
| if( seq_loop_filter_across_slices_enabled_flag && | |
| ( slice_adaptive_loop_filter_flag \|\| slice_sample_adaptive_offset_flag \|\| | |
| !disable_deblocking_filter_flag ) ) | |
| slice_loop_filter_across_slices_enabled_flag | u(1) |
| if( tiles_or_entropy_coding_sync_idc > 0 ) { | |
| num_entry_point_offsets | ue(v) |
| if( num_entry_point_offsets > 0 ) { | |
| offset_len_minus1 | ue(v) |
| for( i = 0; i < num_entry_point_offsets; i++ ) | |
| entry_point_offset[ i ] | u(v) |
| } | |
| } | |
| } | |

FIG 13C

| FIG 13 | FIG 13A |
|---|---|
| | FIG 13B |
| | FIG 13C |

| pic_parameter_set_rbsp( ) { | Descriptor |
|---|---|
| ... | |
| dependent_slices_present_flag | u(1) |
| last_ctb_cabac_init_flg | u(1) |
| } | |

| | Descriptor |
|---|---|
| slice_header( ) { | |
|   first_slice_in_pic_flag | u(1) |
|   if( first_slice_in_pic_flag == 0 ) | |
|     slice_address | u(v) |
|   slice_type | ue(v) |
| | |
|   ~~entropy_slice_flag~~ | ~~u(1)~~ |
|   dependent_slice_flag | u(1) |
|   ~~if( !entropy_slice_flag ) {~~ | |
|   if( !dependent_slice_flag ){ | |
|     ... | |
|   } else { | |
|     no_cabac_reset_flag | u(1) |
| | |
| | |
|   } | |
|   ... | |
|   if( cabac_init_present_flag && slice_type != I && !no_cabac_reset_flag) | |
|     cabac_init_flag | u(1) |
|   ... | |
|   if( slice_type == P \|\| slice_type == B ) | |
|     five_minus_max_num_merge_cand | ue(v) |
|   if( adaptive_loop_filter_enabled_flag ) { | |
|     slice_adaptive_loop_filter_flag | u(1) |
|     if( slice_adaptive_loop_filter_flag && alf_coef_in_slice_flag ) | |
|       alf_param( ) | |
|     if( slice_adaptive_loop_filter_flag && !alf_coef_in_slice_flag ) | |
|       alf_cu_control_param( ) | |
|   } | |
|   if( seq_loop_filter_across_slices_enabled_flag && | |
|     ( slice_adaptive_loop_filter_flag \|\| slice_sample_adaptive_offset_flag \|\| | |
|       !disable_deblocking_filter_flag ) ) | |
|     slice_loop_filter_across_slices_enabled_flag | u(1) |
|   if ( tiles_or_entropy_coding_sync_idc >= 0 ) { | |
|     num_entry_point_offsets | ue(v) |
|     if( num_entry_point_offsets > 0 ) { | |
|       offset_len_minus1 | ue(v) |
|       for( i = 0; i < num_entry_point_offsets; i++ ) | |
|         entry_point_offset[ i ] | u(v) |
|     } | |
|   } | |
| } | |

FIG 16

| | Descriptor |
|---|---|
| pic_parameter_set_rbsp( ) { | |
|    pic_parameter_set_id | ue(v) |
|    seq_parameter_set_id | ue(v) |
|    sign_data_hiding_flag | u(1) |
|    if( sign_data_hiding_flag ) | |
|       sign_hiding_threshold | u(4) |
|    cabac_init_present_flag | u(1) |
|    num_ref_idx_l0_default_active_minus1 | ue(v) |
|    num_ref_idx_l1_default_active_minus1 | ue(v) |
| [Ed. (BB): not present in HM software ] | |
|    pic_init_qp_minus26 | se(v) |
|    constrained_intra_pred_flag | u(1) |
|    slice_granularity | u(2) |
|    diff_cu_qp_delta_depth | ue(v) |
|    cb_qp_offset | se(v) |
|    cr_qp_offset | se(v) |
|    weighted_pred_flag | u(1) |
|    weighted_bipred_idc | u(2) |
|    output_flag_present_flag | u(1) |
|    transquant_bypass_enable_flag | u(1) |
|    dependent_slice_enabled_flag | u(1) |
|    tiles_or_entropy_coding_sync_idc | u(2) |
|    if( tiles_or_entropy_coding_sync_idc == 1 ) { | |
|       num_tile_columns_minus1 | ue(v) |
|       num_tile_rows_minus1 | ue(v) |
|       uniform_spacing_flag | u(1) |
|       if( !uniform_spacing_flag ) { | |
|          for( i = 0; i < num_tile_columns_minus1; i++ ) | |
|             column_width[ i ] | ue(v) |
|          for( i = 0; i < num_tile_rows_minus1; i++ ) | |
|             row_height[ i ] | ue(v) |
|       } | |
|       loop_filter_across_tiles_enabled_flag | u(1) |
|    } else if( tiles_or_entropy_coding_sync_idc == 3 ) | |
|       cabac_independent_flag | u(1) |
|    ... | |
| } | |

FIG 22

LOW DELAY PICTURE CODING

CROSS-REFERENCE TO RELATED APPLICATIONS

This application is a Continuation of U.S. Ser. No. 16/153,307, filed Oct. 5, 2018, which is a Continuation of U.S. Ser. No. 14/511,200, filed Oct. 10, 2014, now U.S. Pat. No. 10,123,006, which is a Continuation of International Application No. PCT/EP2013/057798, filed Apr. 15, 2013, which are incorporated herein by reference in its entirety, and additionally claims priority from US Applications Nos. 61/624,098, filed Apr. 13, 2012 and 61/666,185, filed Jun. 29, 2012, which are all incorporated herein by reference in their entirety.

BACKGROUND OF THE INVENTION

The present invention is concerned with low delay coding of pictures.

In the current HEVC design Slices, Entropy Slices (former Light Weight Slices) Tiles and WPP (Wavefront Parallel Processing) are contained as tools for parallelization.

For parallelization of video encoders and decoders picture-level partitioning has several advantages compared to other approaches. In previous video codecs, like H.264/AVC [1], picture partitions were only possible with regular slices with a high cost in terms of coding efficiency. For scalable parallel H.264/AVC decoding it is necessitated to combine macroblock-level parallelism for picture reconstruction and frame-level parallelism for entropy decoding. This approach, however, provides limited reduction in picture latencies and high memory usage. In order to overcome these limitations, new picture partition strategies have been included in the HEVC codec. Current reference software version (HM-6) contains 4 different approaches: regular or normal slices, entropy slices, wavefront parallel processing (WPP) sub-streams and tiles. Typically those picture partitions comprise a set of Largest Coding Units (LCUs), or, in a synonymous wording, Coding Tree Units (CTU), as defined in HEVC or even a subset of those.

FIG. 1 shows as a picture 898 exemplarily positioned into regular slice 900 per row 902 of LCUs or macroblocks in a picture. Regular or normal slices (as defined in H.264 [1]) have the largest coding penalty as they break entropy decoding and prediction dependencies.

Entropy slices, like slices, break entropy decoding dependencies but allow prediction (and filtering) to cross slice boundaries.

In WPP the picture partitions are row interleaved, and both entropy decoding and prediction are allowed to use data from blocks in other partitions. In this way coding losses are minimized while at the same time wavefront parallelism can be exploited. The interleaving, however, violates bitstream causality as a prior partition needs a next partition to decode.

FIG. 2 exemplarily shows a picture 898 divided up into two rows 904, 904*b* of horizontally partitioning tiles 906. Tiles define horizontal 908 and vertical boundaries 910 that partition a picture 898 into tile columns 912*a,b,c* and rows 904*a,b*. Similar to regular slices 900, tiles 906 break entropy decoding and prediction dependencies, but does not necessitate a header for each tile.

For each of these techniques the number of partitions can be freely chosen by the encoder. In general having more partitions leads to higher compression losses. However in WPP the loss propagation is not so high and therefore the number of picture partitions even can be fixed to one per row-. This leads also to several advantages. First, for WPP bitstream causality is guaranteed. Second, decoder implementations can assume that a certain amount of parallelism is available, which also increases with the resolution. And, finally, none of the context selection and prediction dependencies have to be broken when decoding in wavefront order, resulting in relative low coding losses.

However, until now all parallel coding in transform concepts fail to provide an achievement of high compression efficiency in combination with keeping the delay low. This is also true for the WPP concept. The slices are the smallest units of transportation, in the coding pipeline, and several WPP substreams still have to be transported serially.

SUMMARY

An embodiment may have a decoder for reconstructing a picture from a datastream into which the picture is coded in units of slices into which the picture is partitioned, wherein the decoder is configured to decode the slices from the datastream in accordance with a slice order and the decoder is responsive to a syntax element portion within a current slice of the slices, so as to decode the current slice in accordance with one of at least two modes, and in accordance with a first of the at least two modes, decode the current slice from the datastream using context adaptive entropy decoding including a derivation of contexts across slice boundaries, a continuous update of symbol probabilities of the contexts and an initialization of the symbol probabilities depending on saved states of symbol probabilities of a previously decoded slice, and in accordance with a second of the at least two modes, decode the current slice from the datastream using context adaptive entropy decoding with restricting the derivation of the contexts so as to not cross the slice boundaries, a continuous update of symbol probabilities of the contexts and an initialization of the symbol probabilities independent on any previously decoded slice.

Another embodiment may have an encoder for encoding a picture into a datastream in units of slices into which the picture is partitioned, wherein the encoder is configured to encode the slices into the datastream in accordance with a slice order and the encoder is configured to determine a syntax element portion for, and code same into, a current slice of the slices so that the syntax element portion signals the current slice to be coded in accordance with one of at least two modes, and if the current slice is to be coded in accordance with a first of the at least two modes, encode the current slice into the datastream using context adaptive entropy encoding including a derivation of contexts across slice boundaries, a continuous update of symbol probabilities of the contexts and an initialization of the symbol probabilities depending on saved states of symbol probabilities of a previously encoded slice, and if the current slice is to be coded in accordance with a second of the at least two modes, encode the current slice into the datastream using context adaptive entropy encoding with restricting the derivation of the contexts so as to not cross the slice boundaries, a continuous update of symbol probabilities of the contexts and an initialization of the symbol probabilities independent on any previously encoded slice.

Another embodiment may have a decoder for reconstructing a picture from a datastream into which the picture is coded in units of slices into which the picture is partitioned, using WPP processing, wherein the decoder is configured to decode the slices from the datastream in accordance with a slice order, wherein each slice includes a start syntax portion indicating a position of a decoding begin of the respective slice within the picture and the decoder is configured to identifying entry points of WPP sub streams into which the slices are grouped, by identifying, using the slices' start syntax portions, slices starting at a left hand side of the picture, parallel decoding the WPP substreams in a staggered manner with sequentially commencing the decoding of the WPP sub streams in accordance with the slice order.

Another embodiment may have an encoder for coding a picture into a datastream into which the picture is coded in units of slices into which the picture is partitioned, using WPP processing, wherein the encoder is configured to encode the slices into the datastream in accordance with a slice order, wherein the encoder is configured to provide each slice with a start syntax portion indicating a position of a coding begin of the respective slice within the picture and the encoder is configured to group the slices into WPP substreams so that for each WPP substream, the first slice in slice order starts at a left hand side of the picture, and parallel encode the WPP substreams in a staggered manner with sequentially commencing the encoding of the WPP substreams in accordance with the slice order.

According to another embodiment, a method for reconstructing a picture from a datastream into which the picture is coded in units of slices into which the picture is partitioned, may have the step of: decoding the slices from the datastream in accordance with a slice order and the method is responsive to a syntax element portion within a current slice of the slices, so as to decode the current slice in accordance with one of at least two modes, wherein in accordance with a first of the at least two modes, the current slice is decoded from the datastream using context adaptive entropy decoding including a derivation of contexts across slice boundaries, a continuous update of symbol probabilities of the contexts and an initialization of the symbol probabilities depending on saved states of symbol probabilities of a previously decoded slice, and in accordance with a second of the at least two modes, the current slice is decoded from the datastream using context adaptive entropy decoding with restricting the derivation of the contexts so as to not cross the slice boundaries, a continuous update of symbol probabilities of the contexts and an initialization of the symbol probabilities independent on any previously decoded slice.

According to another embodiment, a method for encoding a picture into a datastream in units of slices into which the picture is partitioned, may have the step of: encoding the slices into the datastream in accordance with a slice order, and may have the steps of: determining a syntax element portion for, and code same into, a current slice of the slices so that the syntax element portion signals the current slice to be coded in accordance with one of at least two modes, and if the current slice is to be coded in accordance with a first of the at least two modes, encoding the current slice into the datastream using context adaptive entropy encoding including a derivation of contexts across slice boundaries, a continuous update of symbol probabilities of the contexts and an initialization of the symbol probabilities depending on saved states of symbol probabilities of a previously encoded slice, and if the current slice is to be coded in accordance with a second of the at least two modes, encoding the current slice into the datastream using context adaptive entropy encoding with restricting the derivation of the contexts so as to not cross the slice boundaries, a continuous update of symbol probabilities of the contexts and an initialization of the symbol probabilities independent on any previously encoded slice.

According to another embodiment, a method for reconstructing a picture from a datastream into which the picture is coded in units of slices into which the picture is partitioned, using WPP processing, wherein the method may have the step of: decoding the slices from the datastream in accordance with a slice order, wherein each slice includes a start syntax portion indicating a position of a decoding begin of the respective slice within the picture, may further have the steps of: identifying entry points of WPP substreams into which the slices are grouped, by identifying, using the slices' start syntax portions, slices starting at a left hand side of the picture, parallel decoding the WPP substreams in a staggered manner with sequentially commencing the decoding of the WPP substreams in accordance with the slice order.

According to another embodiment, a method for coding a picture into a datastream into which the picture is coded in units of slices into which the picture is partitioned, using WPP processing, may have the steps of: encoding the slices into the datastream in accordance with a slice order, and providing each slice with a start syntax portion indicating a position of a coding begin of the respective slice within the picture, and further grouping the slices into WPP substreams so that for each WPP substream, the first slice in slice order starts at a left hand side of the picture, and parallel encoding the WPP substreams in a staggered manner with sequentially commencing the encoding of the WPP substreams in accordance with the slice order.

Another embodiment may have a computer program having a program code for performing, when running on a computer, an inventive method.

It is a basic finding of the present invention that parallel processing concepts such as wavefront parallel processing, may be realized with a reduced end-to-end delay if the usual slice concept according to which slices are either coded/decoded completely independent from areas of the picture outside of the respective slice, or at least independent from areas outside the respective slice as far as the entropy coding is concerned is given up in favor of slices of different modes, namely ones called dependent slices which allow for inter-dependencies across slice boundaries, and others which do not, called normal slices, for example.

It is a further basic finding of the present invention which may be combined with the first one or individually be used, that WPP processing concept may be made more efficiently if the slices' start syntax portions are used to locate WPP entry points.

BRIEF DESCRIPTION OF THE DRAWINGS

Embodiments of the present invention will be detailed subsequently referring to the appended drawings, in which:

FIG. 3 exemplarily shows an assignment of parallel encoded partitions to a slice or network transport segment;

FIG. 11, including FIGS. 11a through 11c, shows an example for a sequence parameter set syntax;

FIG. 12, including FIGS. 12a and 12b, shows an example for a picture parameter set syntax;

FIG. 13, including FIGS. 13a through 13c, shows an example for a slice header syntax;

FIG. 16 shows a possible slice-header syntax;

FIG. 22 shows another embodiment for a picture parameter set syntax;

DETAILED DESCRIPTION OF THE INVENTION

Figure 1:
FIG. 1 shows a picture exemplarily partitioned into a regular slice per row of LCUs or macroblocks in a picture.

In the following, the description starts with a description of today's concepts for enabling parallel picture processing and low delay coding, respectively. The problems occurring when wishing to have both abilities are outlined. In particular, as will turn out from the following discussion, the WPP substream concept as taught so far somehow conflicts with the wish to have a low delay due to the necessity to convey WPP substreams by grouping same into one slice. The following embodiments render parallel processing concepts such as the WPP concept, applicable to applications necessitating even less delay by broadening the slice concept, namely by introducing another type of slice, later on called dependent slices.

Minimization of the end to end video delay from capturing to display is one of the main aims in applications such as video conferencing and the like.

The signal processing chain for digital video transmission consists of camera, capturing device, encoder, encapsulation, transmission, demultiplexer, decoder, renderer and display. Each of these stages contributes to the end to end delay by buffering image data before its serial transmission to the subsequent stage.

Some applications necessitate minimization of such delay, e.g. remote handling of objects in hazardous areas, without direct sight to the handled object, or minimal invasive surgery. Even a short delay can result in severe difficulties of proper handling or even lead to catastrophic mistakes.

In many cases, a whole video frame is buffered within a processing stage, e.g. to allow for intra frame processing. Some stages gather data in order to form packets which are forwarded to the next stage. In general, there is a lower boundary for the delay which results from the requirements of the local processing. This is analyzed for each individual stage in more detail below.

The processing inside the camera does not necessarily necessitate intra-frame signal processing, so the minimum delay is given by the integration time of the sensor, which is bounded by the frame rate, and some design choices by the hardware manufacturer. The camera output is typically related to the scan order which usually starts processing in the top left corner, moves over to the top right corner and continues line by line to the bottom right corner. Consequently, it takes about one frame duration until all data is transferred from the sensor to the camera output.

The capturing device could forward the camera data immediately after reception; however it will typically buffer some data and generate bursts in order to optimize data access to memory or storage. Furthermore, the connection between camera/capturer and memory of the computer is typically limiting the bitrate for forwarding the captured image data to the memory for further processing (encoding). Typically, cameras are connected via USB 2.0 or soon with USB 3.0, which will include a partial transport of the image data to the encoder. This limits the parallelizability on the encoder side in extreme low-delay scenarios, i.e. the encoder will try to start encoding as soon as possible, when data becomes available from the camera, e.g. in a raster-scan order from top to bottom of the image.

In the encoder, there are some degrees of freedom which allow to trade-off encoding efficiency, in terms of data rate needed for a certain video fidelity, for a reduction of the processing delay.

The encoder uses data which has already been sent to predict the image to be subsequently encoded. In general, the difference between the actual image and the prediction can be encoded with fewer bits than would be needed without prediction. This prediction values need to be available at the decoder, thus prediction is based on previously decoded portions of the same image (intra-frame prediction) or on other images (inter-frame prediction) which have been processed earlier. Pre-HEVC video encoding standards use only the part of the image above or in the same line, but left—which has been previously encoded—for intra-frame prediction, motion vector prediction and entropy coding (CABAC).

In addition to the optimization of the prediction structure, the influence of parallel processing can be considered. Parallel processing necessitates the identification of picture areas which can be processed independently. For practical reasons, contiguous regions such as horizontal or vertical rectangles are chosen which are often called "tiles". In the case of low delay constraints, those regions should allow for parallelized coding of the data incoming from the capturer to the memory, as soon as possible. Assuming a raster-scan memory transfer, vertical partitions of the raw data make sense, in order to start encoding immediately. Inside such tiles, which divides the picture into vertical partitions (cf. figure below), intra-prediction, motion vector prediction and entropy coding (CABAC) can lead to reasonable coding efficiency. In order to minimize the delay, only part of the picture, starting from the top, would be transferred to the frame memory of the encoder, and parallel processing should be started in vertical tiles.

Another way of allowing parallel processing into use WPP within a regular slice, that would be compared to tiles, a "row" of tiles included in a single slice. The data within that slice, could be also parallel encoded using WPP sub streams, within the slice. The picture separation into slices 900 and tiles/WPP substreams 914 is shown in FIG. 3/1 form of examples.

FIG. 3, thus, shows the assignment of parallel encoded partitions such as 906 or 914 to a slice or network transport segment (a single network packet or multiple network 900 packets).

The encapsulation of the encoded data into Network Abstraction Layer (NAL) units, as defined in H.264 or HEVC, before transmission or during the encoding process adds some header to data blocks which allows for identification of each block and the reordering of blocks, if applicable. In the standard case, no additional signaling is necessitated, since the order of coding elements is in decoding order, that is an implicit assignment of the position of the tile or general coding fragment is given.

Figure 4:
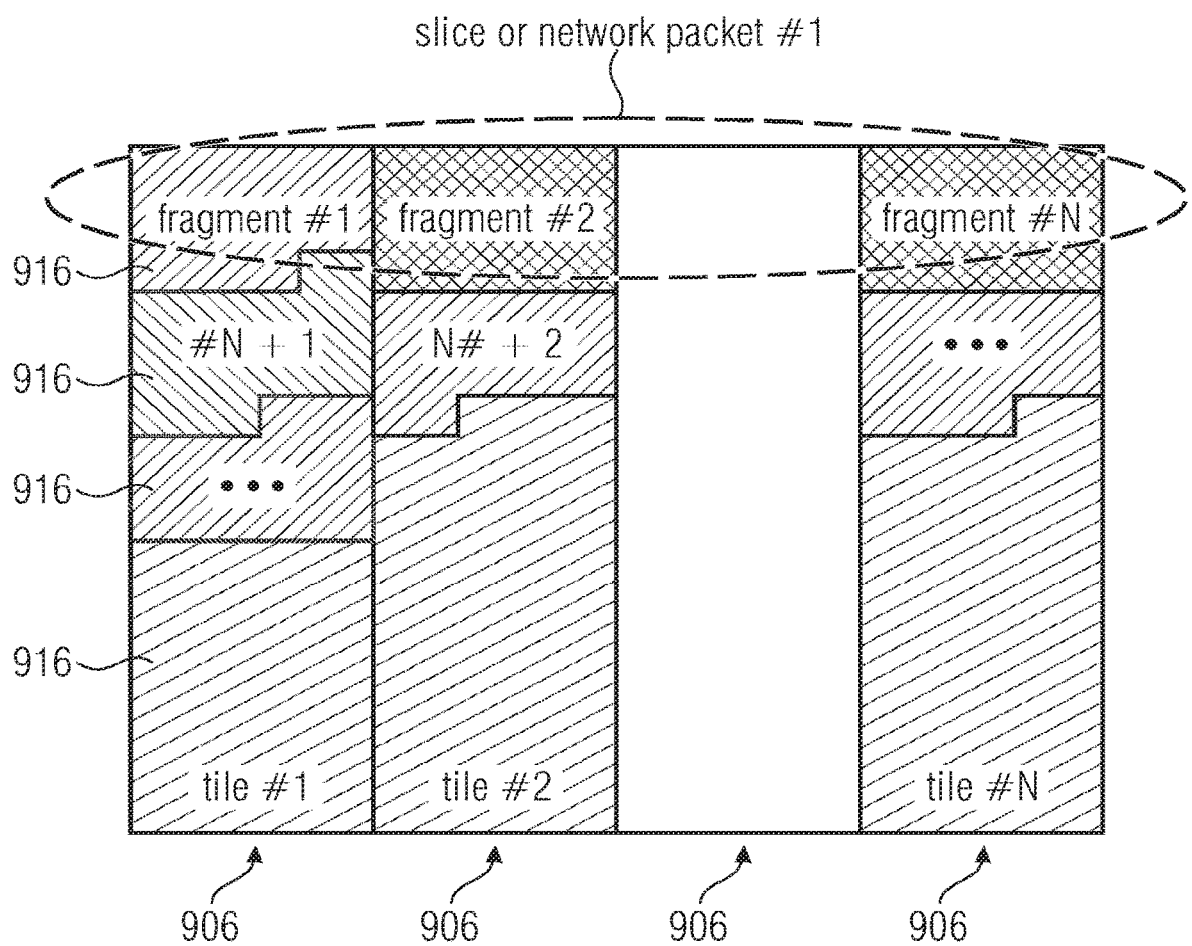
FIG. 4 shows a schematic diagram illustrating a generic fragmentation of a frame with a tile coding approach for minimum end-to-end delay.

If parallel processing is considered with an additional transport layer for low delay parallel transport, i.e. the transport layer may re-order picture partitions for tiles in order to allow for low delay transmission, meaning to send out fragments as shown in FIG. 4 as they are encoded. Those fragments may be also not fully encoded slices, they may be a subset of a slice, or may be contained in a dependent Slice.

In case of creating additional fragments, there is a trade-off between efficiency, which would be highest with large data blocks because the header information is adding a constant number of bytes, and delay, because large data blocks of the parallel encoders would need to be buffered before transmission. The overall delay can be reduced, if the encoded representation of vertical tiles 906 is separated in a number of fragments 916 which are transmitted as soon as a fragment is completely encoded. The size of each fragment can be determined in terms of a fixed image region, such as macroblocks, LCUs or in terms of a maximum data as shown in FIG. 4.

FIG. 4, thus, shows a generic fragmentation of a frame with tile coding approach for minimum end-to-end delay.

Figure 5:
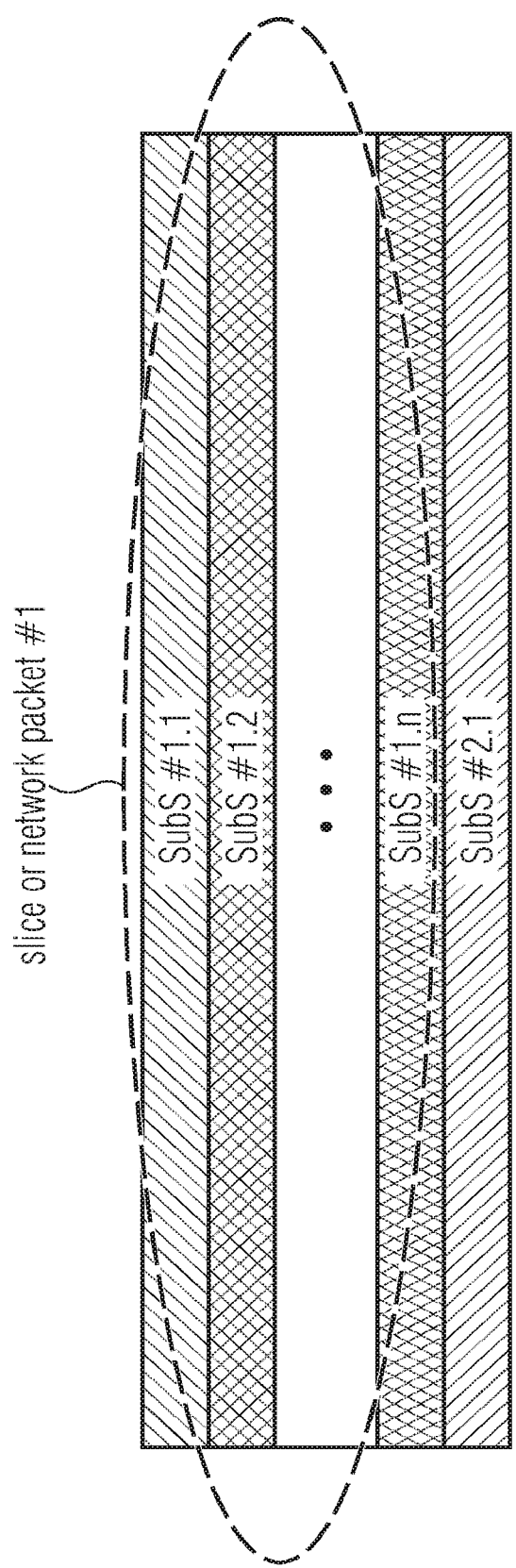
FIG. 5 shows a schematic diagram illustrating an exemplary fragmentation of a frame with WPP coding approach for minimum end-to-end delay.

Similarly, FIG. 5 shows a fragmentation of a frame with WPP coding approach for minimum end-to-end delay.

Figure 6:
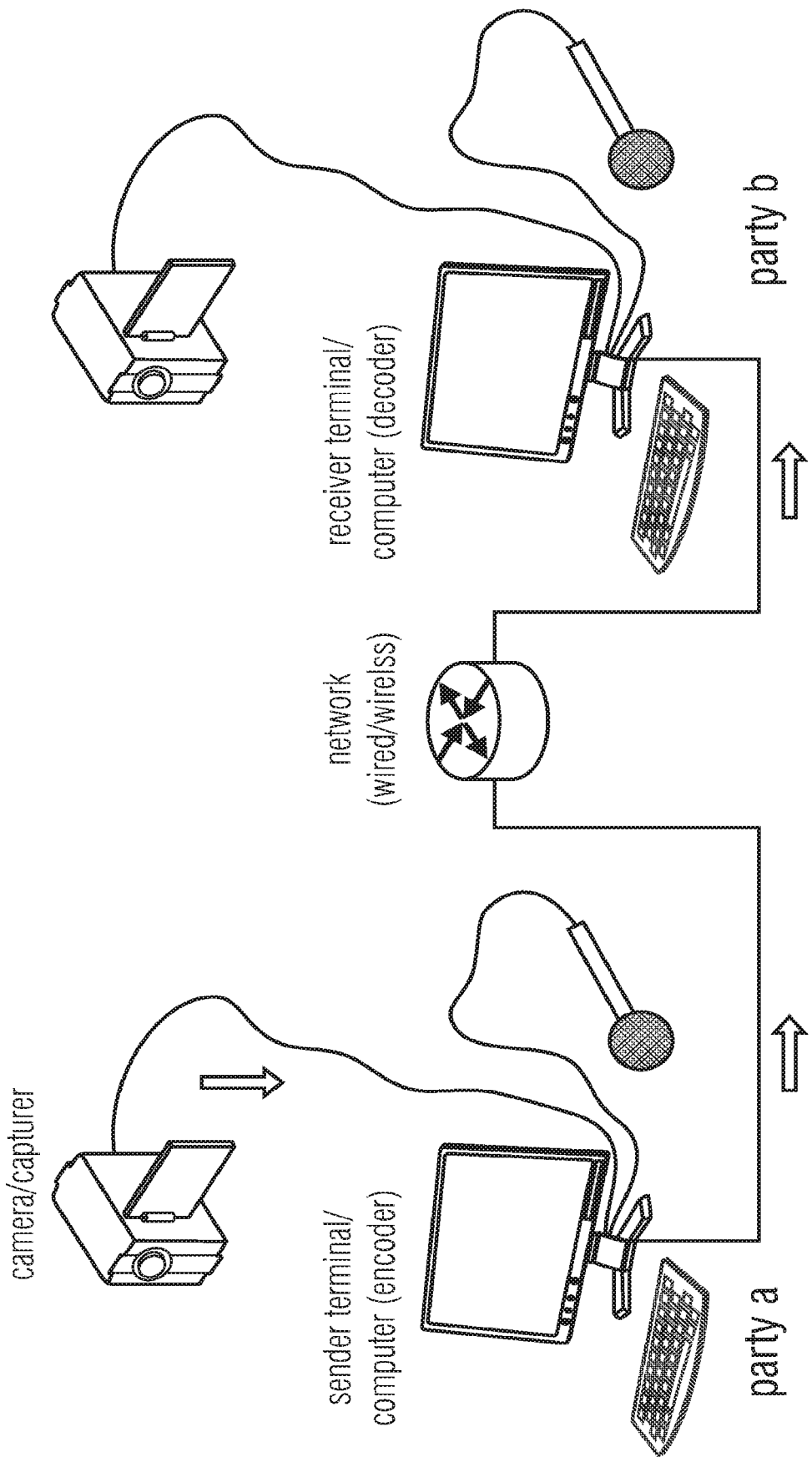
FIG. 6 shows a schematic block diagram illustrating a scenario of a conversation using video services.

The transmission may add further delay, e.g., if additional block oriented processing is applied, such as Forward Error Correction codes increasing the robustness of the transmission. Besides, the network infrastructure (routers etc.) or the physical link can add delay, this is typically known as latency for a connection. In addition to the latency the transmission bitrate determines, the time (delay) for transferring the data from Party a to Party b, in a conversation as shown in FIG. 6 which uses video services.

If encoded data blocks are transmitted out of order, reordering delay has to be considered.

The decoding can start as soon as a data unit has arrived, assumed that other data units which have to be decoded prior to this are available.

In case of tiles, there are no dependencies between tiles, thus a tile can be decoded immediately. If fragments have been produced of a tile, such as separate slices per each fragment as shown in FIG. 4, the fragments can be directly transported, as soon as they are encoded respectively their contained LCUs or CUs have been encoded.

The renderer assembles the outputs of parallel decoding engines and forwards the combined picture line by line to the display.

The display does not necessarily add any delay, but in practice may do some intra frame processing before the image data is actually displayed. This is up to design choices by the hardware manufacturer.

Summing up, we can influence the stages encoding, encapsulation, transmission and decoding in order to achieve minimum end-to-end delay. If we use parallel processing, tiles and fragmentation within the tiles, the total delay can be reduced significantly as shown in FIG. 7, compared to a commonly used processing chain that adds about one frame delay at each of these stages as shown in FIG. 8.

Figure 7:
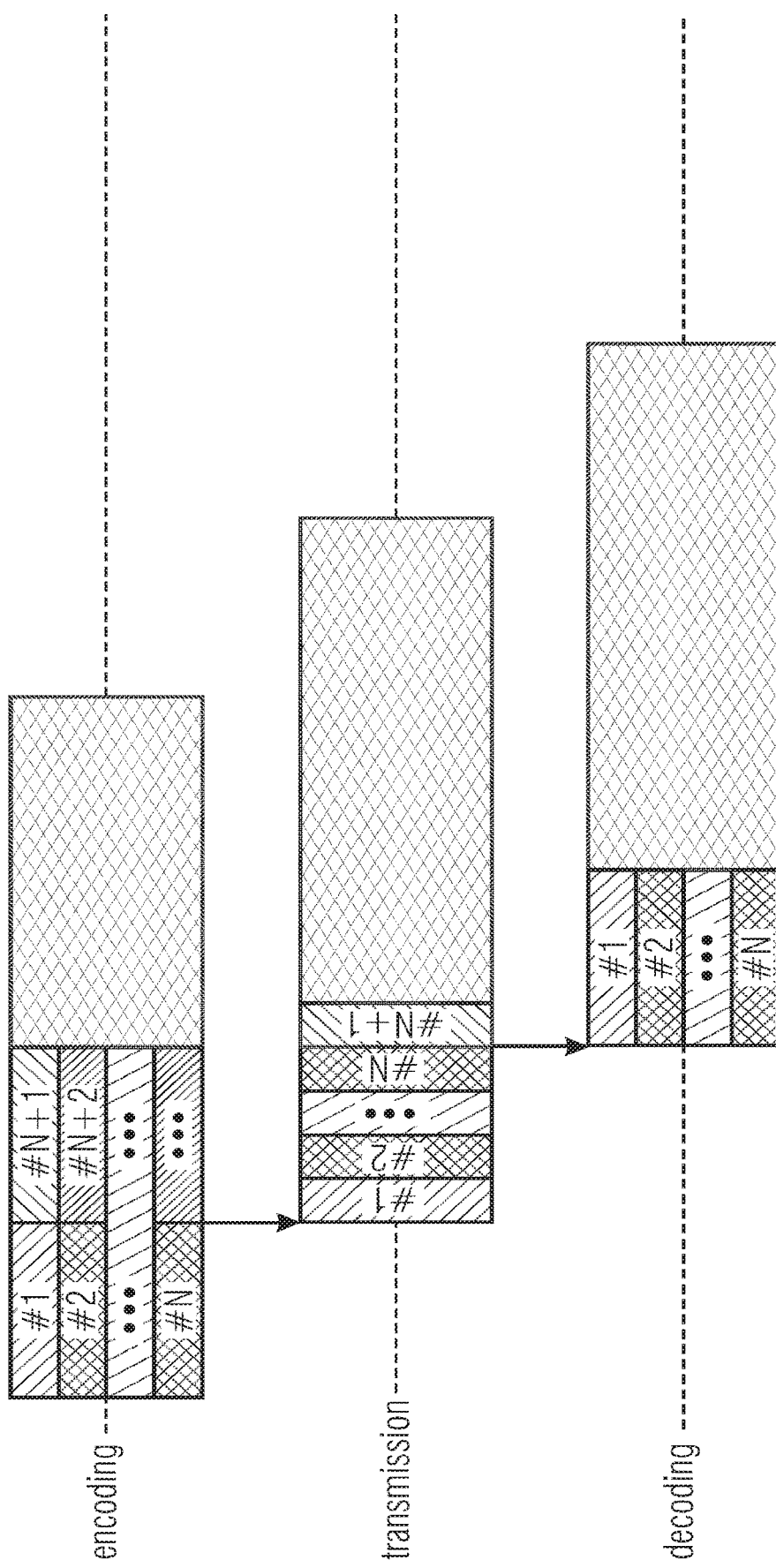
FIG. 7 illustrates schematically a possible time scheduling of encoding, transmission and decoding for tiles with generic subsets with minimum end-to-end delay.
Figure 8:
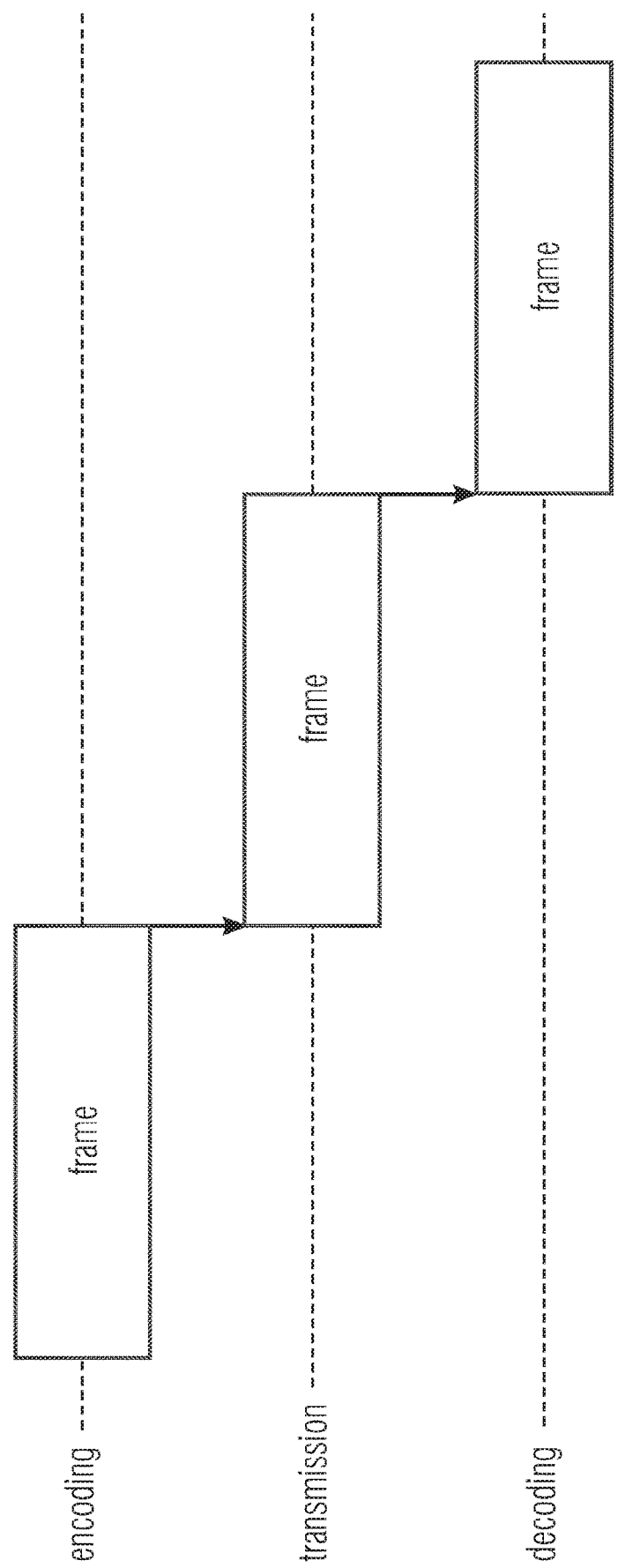
FIG. 8 schematically shows a timing schedule which commonly achieves an end-to-end delay.

In particular, while FIG. 7 shows encoding, transmission and decoding for tiles with generic subsets with minimum end-to-end delay, FIG. 8 illustrates a commonly achieved end-to-end delay.

HEVC allows the use of slice partitioning, tile partitioning, and in the following way.

tile: An integer number of treeblocks co-occurring in one column and one row, ordered consecutively in treeblock raster scan of the tile. The division of each picture into tiles is a partitioning. Tiles in a picture are ordered consecutively in tile raster scan of the picture. Although a slice contains treeblocks that are consecutive in treeblock raster scan of a tile, these treeblocks are not necessarily consecutive in treeblock raster scan of the picture.

slice: An integer number of treeblocks ordered consecutively in the raster scan. The division of each picture into slices is a partitioning. The treeblock addresses are derived from the first treeblock address in a slice (as represented in the slice header).

raster scan: A mapping of a rectangular two-dimensional pattern to a one-dimensional pattern such that the first entries in the one-dimensional pattern are from the first top row of the two-dimensional pattern scanned from left to right, followed similarly by the second, third, etc., rows of the pattern (going down) each scanned from left to right.

treeblock: A N×N block of luma samples and two corresponding blocks of chroma samples of a picture that has three sample arrays, or a N×N block of samples of a monochrome picture or a picture that is coded using three separate colour planes. The division of a slice into treeblocks is a partitioning.

partitioning: The division of a set into subsets such that each element of the set is in exactly one of the subsets.

quadtree: A tree in which a parent node can be split into four child nodes. A child node may become parent node for another split into four child nodes.

In the following, the spatial subdivision of pictures, slices and tiles is explained. In particular, the following description specifies how a picture is partitioned into slices, tiles and coding treeblocks. Pictures are divided into slices and tiles. A slice is a sequence of coding treeblocks. Likewise, a tile is a sequence of coding treeblocks.

The samples are processed in units of coding treeblocks. The luma array size for each treeblock in samples in both width and height is CtbSize. The width and height of the chroma arrays for each coding treeblock are CtbWidthC and CtbHeightC, respectively.

For example, a picture may be divided into two slices as shown in the next figure. As another example, a picture may be divided into three tiles as shown in the second following figure.

Unlike slices, tiles are rectangular and contain an integer number of coding treeblocks in coding treeblock raster scan. A tile may consist of coding treeblocks contained in more than one slice. Similarly, a slice may comprise coding treeblocks contained in more than one tile.

Figure 9:
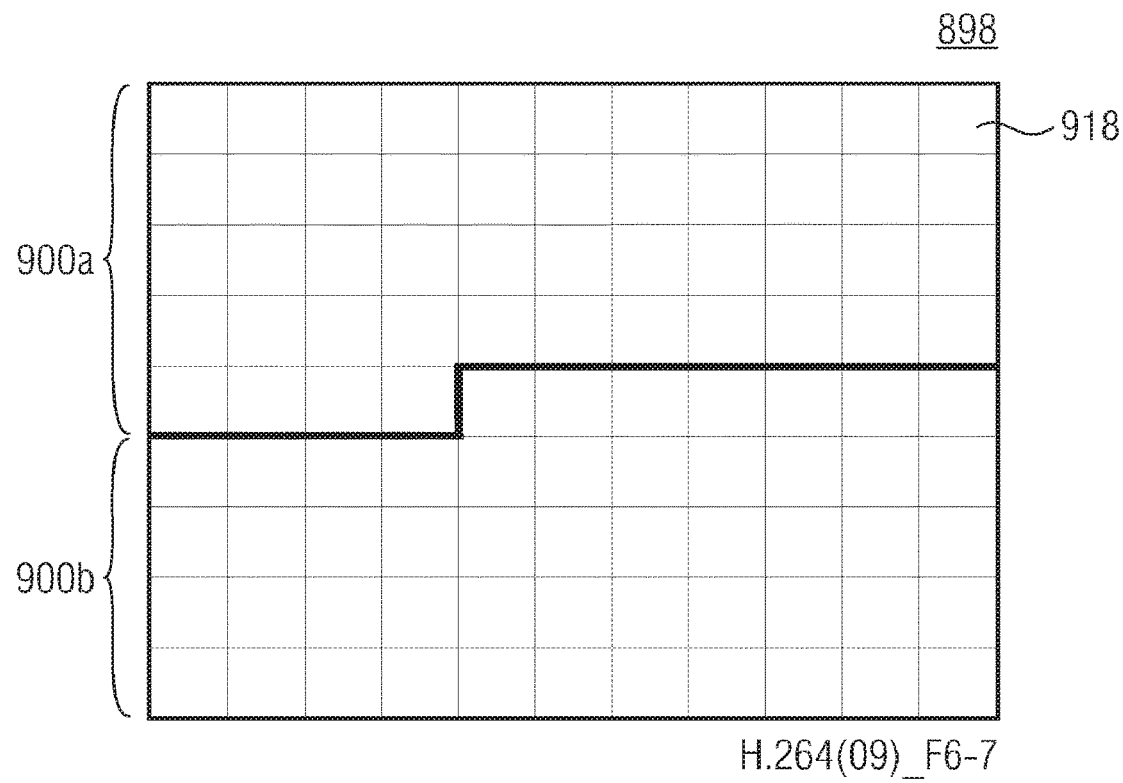
FIG. 9 illustrates a picture exemplarily having 11×9 coding treeblocks, that is partitioned into two slices.

FIG. 9 illustrates a picture 898 with 11 by 9 coding treeblocks 918 that is partitioned into two slices 900a,b.

Figure 10:
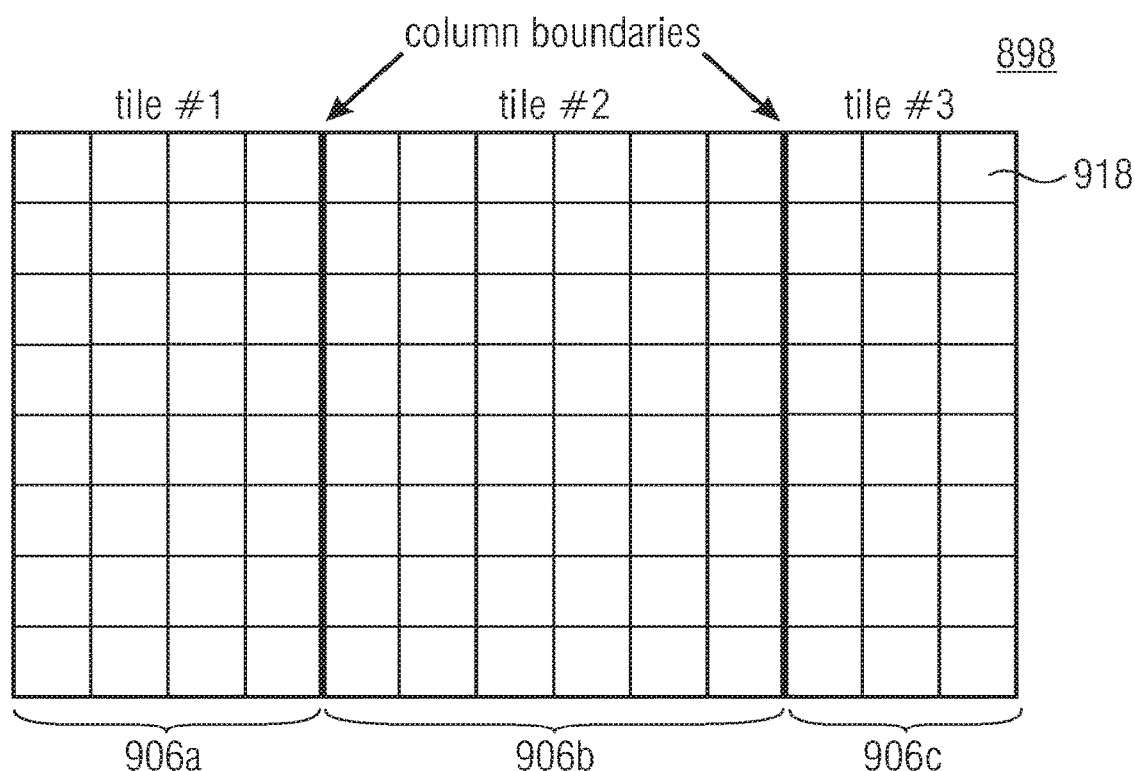
FIG. 10 illustrates a picture exemplarily having 13×8 coding treeblocks, that is partitioned into three tiles.

FIG. 10 illustrates a picture with 13 by 8 coding treeblocks 918 that is partitioned into three tiles.

Each coding 898 treeblock 918 is assigned a partition signaling to identify the block sizes for intra or inter prediction and for transform coding. The partitioning is a recursive quadtree partitioning. The root of the quadtree is associated with the coding treeblock. The quadtree is split until a leaf is reached, which is referred to as the coding block. The coding block is the root node of two trees, the prediction tree and the transform tree.

The prediction tree specifies the position and size of prediction blocks. The prediction blocks and associated prediction data are referred to as prediction unit.

FIG. 11 shows an exemplary sequence parameter set RESP syntax.

The transform tree specifies the position and size of transform blocks. The transform blocks and associated transform data are referred to as transform unit.

The splitting information for luma and chroma is identical for the prediction tree and may or may not be identical for the transform tree.

The coding block, the associated coding data and the associated prediction and transform units form together a coding unit.

A process for a conversion of a coding treeblock address in coding treeblock raster order to tile scan order could be as follows:

Outputs of this process are
an array CtbAddrTS[ctbAddrRS], with ctbAddrRS in the range of 0 to PicHeightInCtbs*PicWidthInCtbs−1, inclusive.
an array TileId[ctbAddrTS], with ctbAddrTS in the range of 0 to PicHeightInCtbs*PicWidthInCtbs−1, inclusive.

The array CtbAddrTS[ ] is derived as follows:

```
for( ctbAddrRS = 0; ctbAddrRS < PicHeightInCtbs * PicWidthInCtbs, ctbAddrRS++) {
    tbX = ctbAddrRS %PicWidthInCtbs
    tbY = ctbAddrRS / PicWidthInCtbs
    for( j = 0,j <=num_title_columns_minusl; j++)
        if( tbX <ColBd[j + 1])
            tileX = j
    for( i = 0; i <= num_tile_rows_minus1; i++)
        if( tbY < RowBd[ i + 1])
            tileY=i
    CtbAddrTS[ ctbAddrRS] = ctbAddrRS - tbX
        for( i = 0.i < tileX; i++)
        ctbAddrTS += RowHeight[ tileY] * ColumnWidth[i]
    CtbAddrTS[ ctbAddrRS ] += ( tbY - RowBd[ tileY]) * ColumnWidth[ tile Y] + tbX - ColBd[ tileX]
}
```

The array TileId[ ] is derived as follows:

```
for( j = 0, tileId = 0; j <=num_tile_columns_minusl, j++)
for( i = 0; i <= num_tile_rows_minusl, i++, tileId++)
    for( y = RowBd[ j ]; y < RowBd[ j + 1 ]; y++)
        for( x = ColBd[ i ]; x < ColBd[ i + 1 ], x++)
            TileId[ CtbAddrTS[ y*PicWidthinCtbs + x]] = tileiD
```

A corresponding, exemplary syntax is shown in FIGS. 11, 12 and 13, wherein FIG. 12 has an exemplary picture parameter set RESP syntax. FIG. 3 shows an exemplary slice header syntax.

In the syntax example, the following semantics may apply:

entropy_slice_flag equal to 1 specifies that the value of slice header syntax elements not present is inferred to be equal to the value of slice header syntax elements in a proceeding slice, where a proceeding slice is defined as the slice containing the coding treeblock with location (SliceCtbAddrRS−1). entropy_slice_flag shall be equal to 0 when SliceCtbAddrRS equal to 0.

tiles_or_entropy_coding_sync_idc equal to 0 specifies that there is only one tile in each picture in the coded video sequence, and no specific synchronization process for context variables is invoked before decoding the first coding treeblock of a row of coding treeblocks.

uniform_spacing_flag equal to 1 specifies that column boundaries and likewise row boundaries are distributed uniformly across the picture.

uniform_spacing_flag equal to 0 specifies that column boundaries and likewise row boundaries are not distributed uniformly across the picture but signalled explicitly using the syntax elements column_width[i] and row_height[i].

specifies the width of the i-th tile column in units of coding treeblocks.

column width[i]

row_height[i] specifies the height of the i-th tile row m units of coding treeblocks.

Values of ColumnWidth[i], specifying the width of the i-th tile column in units of coding treeblocks, and the values of ColumnWidthInLumaSamples[i], specifying the width of the i-th tile column in units of luma samples, are derived as follows:

```
for( i = O; i <= num_tile_columns_minusl, i++) {
  if( uniform_spacing_flag)
    ColumnWidth[ i] = ( ( i + 1) 'PicWidthInCtbs) / ( num_tile_columns_minusl + 1) -
      ( i * PicWidthInCtbs) / ( num_tile_columns_minusl + 1)
  else
    ColumnWidth[ i] = column_width[ i]
  ColumnWidthInLumaSamples[i] = ColumnWidth[i] << Log2CtbSize
}
``` tiles_or_entropy_coding_sync_idc equal to 1 specifies that there may be more than one tile in each picture in the coded video sequence, and no specific synchronization process for context variables is invoked before decoding the first coding treeblock of a row of coding treeblocks.

Values of RowHeight[i], specifying the height of the i-th tile row in units of

```
coding treeblocks, are derived as follows:
  for( i = 0; i <= num_tile_rows_minusl; i++)
    if( uniform_spacing_flag)
      RowHeight[ i] = ( ( i + 1) * PicHeightInCtbs) / ( num_tile_rows_minusl + 1) -
        ( i * PicHeightInCtbs) ./ ( num_tile_rows_minusl + 1)
    else
      RowHeight[ i ] = row_height[ i ]
``` tiles_or_entropy_coding_sync_idc equal to 2 specifies that there is only one tile in each picture in the coded video sequence, a specific synchronization process for context variables is invoked before decoding the first coding treeblock of a row of coding treeblocks, and a specific memorization process for context variables is invoked after decoding two coding treeblocks of a row of coding treeblocks.

The value of tiles_or_entropy_coding_sync_idc shall be in the range of 0 to 2, inclusive.

num_tile_columns_minusl plus 1 specifies the number of tile columns partitioning the picture.

num_tile_rows_minusl plus 1 specifies the number of tile rows partitioning the Picture.

When num_tile_columns_minusl is equal to 0, num_tile_rows_minusl shall not be equal to 0.

One or both of the following conditions shall be fulfilled for each slice and title:

All coded blocks in a slice belong to the same tile.

All coded blocks in a tile belong to the same slice.

NOTE—Within the same picture, there may be both slices that contain multiple tiles and tiles that contain multiple slices.

Values of ColBd[i], specifying the location of the left column boundary of the i-th tile column in units of coding treeblocks, are derived as follows:

for (ColBd[0]=0, i=0; i<=num_tile_columns_minusl; i++)

ColBd[$i$+1]=ColBd[$i$]+ColumnWidth[$i$]

Values of RowBd[i], specifying the location of the top row boundary of the i-th tile row in units of coding treeblocks, are derived as follows:

For (RowBd[0]=0, i=0; i<=num_tile_rows_minusl; i++)

RowBd[$i$+1]=RowBd[$i$]+RowHeight[$i$]

num_substreams_minusl plus 1 specifies the maximum number of subsets included in a slice when tiles_or_entropy_coding_sync_idc is equal to 2. When not present, the value of num_substreams_minusl is inferred to be equal to 0.

num_entry_point_offsets specifies the number of entry_point_offset[i] syntax elements in the slice header. When tiles_or_entropy_coding_sync_idc is equal to 1, the value of num_entry_point_offsets shall be in the range of O to (num_tile_columns_minusl+1)*(num_tile_rows_minusl+1)−1, inclusive. When tiles_or_entropy_coding_sync_idc is equal to 2, the value of num_entry_point_offsets shall be in the range of O to num_substreams_minusl, inclusive. When not present, the value of num_entry_point_offsets is inferred to be equal to 0.

offset_len_minus1 plus 1 specifies the length, in bits, of the entry_point_offset[i] syntax elements.

entry_point_offset[i] specifies the i-th entry point offset, in bytes and shall be represented by offset_len_minus1 plus 1 bits. The coded slice NAL unit consists of num_entry_point_offsets+1 subsets, with subset index values range from 0 to num_entry_point_offsets, inclusive. Subset 0 consists of bytes Oto entry_point_offset[0]-1, inclusive, of the coded slice NAL unit, subset k, with k in the range of 1 to num_entry_point_offsets-1, inclusive, consists of bytes entry_point_offset[k-1] to entry_point_offset[k]+entry_point_offset[k-1]-1, inclusive, of the coded slice NAL unit, and the last subset (with subset index equal to num_entry_point_offsets) consists of the remaining bytes of the coded slice NAL unit.

NOTE—The NAL unit header and the slice header of a coded slice NAL unit are included in subset 0.

When tiles_or_entropy_coding_sync_idc is equal to 1 and num_entry_point_offsets is greater than 0, each subset shall contain all coded bits of one or multiple complete tiles, and the number of subsets shall be equal to or less than the number of tiles in the slice.

When tiles_or_entropy_coding_sync_idc is equal to 2 and num_entry_point_offsets is greater than 0, subset k, for each of all the possible k values, shall contain all bits to be used during the initialization process for the current bitstream pointer k.

Regarding the slice data semantics, the following may apply.

end_of_slice_flag equal to 0 specifies that another macroblock is following in the slice end_of_slice_flag equal to 1 specifies the end of the slice and that no further macroblock follows.

entry_point_marker_two_3 bytes is a fixed-value sequence of 3 bytes equal to 0x000002. This syntax element is called an entry marker prefix.

tile_idx_minus_1 specifies the TileID in raster scan order. The first tile in the picture shall have a TileID of 0. The value of tile_idx_minus_1 shall be in the range of Oto (num_tile_columns_minus1+1)*(num_tile_rows_minus1+1)-1.

A CABAC parsing process for slice data could be as follows:

This process is invoked when parsing syntax elements with descriptor ae(v).

Inputs to this process are a request for a value of a syntax element and values of prior parsed syntax elements.

Output of this process is the value of the syntax element.

When starting the parsing of the slice data of a slice, the initialization process of a CABAC parsing process is invoked. When tiles_or_entropy_coding_sync_idc is equal to 2 and num_substreams_minus1 is greater than 0, a mapping table BitStreamTable with num_substreams_minus1+1 entries specifying a bitstream pointer table to use for later current bitstream pointer derivation is derived as follows.

BitStreamTable[0] is initialized to contain the bitstream pointer.
 For all indices 1 greater than O and less than num_substreams_minus1+1, BitStreamTable[i] contains a bitstream pointer to entry_point_offset[i] bytes after BitStreamTable[i-1].

The current bitstream pointer is set to BitStreamTable[0].

The minimum coding block address of the coding treeblock containing the spatial neighbor block T, ctb-MinCbAddrT, is derived using a location (xO, yO) of the top-left luma sample of the current coding treeblock such so, for example, as follows.

$$x = x0 + 2 << \text{Log 2CtbSize} - 1$$

$$y = y0 - 1$$

$$\text{ctbMinCbAddrT} = \text{MinCbAddrZS}[x >> \text{Log 2MinCbSize}][y >> \text{Log 2MinCbSize}]$$

The variable availableFlagT is obtained by invoking an appropriate coding block availability derivation process with ctbMinCbAddrT as input.

When starting the parsing of a coding tree and tiles_or_entropy_coding_sync_idc is equal to 2 and num_substreams_minus1 is greater than 0, the following applies.

If CtbAddrRS % PicWidthInCtbs is equal to 0, the following applies.
 When availableFlagT is equal to 1, the synchronization process of the CABAC parsing process is invoked as specified in subclause "Synchronization process for context variables".
 A decoding process for binary decisions before termination is invoked, followed by an initialization process for the arithmetic decoding engine.
 The current bitstream pointer is set to indicate BitStreamTable[i] with the index i derived as follows.

$$i = (\text{CtbAddrRS}/\text{PieWidthInCtbs}) \% (\text{num\_substreams\_minus1}+1)$$

Otherwise, if CtbAddrRS % PicWidthInCtbs is equal to 2, the memorization process of the CABAC parsing process is invoked as specified in subclause "Memorization process for context variables".

An initialization process could be as follows:

Outputs of this process are initialised CABAC internal variables.

Special processes thereof are invoked when starting the parsing of the slice data of a slice or when starting the parsing of the data of a coding tree and the coding tree is the first coding tree in a tile.

Memorization process for context variables could be as follows:

Inputs of this process are the CABAC context variables indexed by ctxidx.

Output of this process are variables TableStateSync and TableMPSSync containing the values of the variables m and n used in the initialization process of context variables that are assigned to syntax elements except for the end-of-slice flag.

For each context variable, the corresponding entries n and m of tables TableStateSyncand TableMPSSync are initialized to the corresponding pStateidx and valMPS.

Synchronization process for context variables could be as follows:

Inputs of this process are variables TableStateSync and TableMPSSync containing the values of the variables n and m used in the memorization process of context variables that are assigned to syntax elements except for the end-of-slice flag.

Outputs of this process are the CABAC context variables indexed by ctxidx.

For each context variable, the corresponding context variables pStateidx and valMPS are initialized to the corresponding entries n and m of tables TableStateSync and TableMPSSync.

In the following, a low delay coding and transport using WPP is explained. In particular, the below discussion reveals as to how the low-delay transport as described in FIG. 7 can be also applied to WPP.

First of all, it is important that a subset of the picture can be sent, before completion of the whole picture. Normally, this is achievable using slices, as already shown in FIG. 5.

In order to reduce the delay compared to tiles, as shown in the following figures, there is the need to apply a single WPP sub stream per row of LCUs and further allow the separate transmission of each of those rows. In order to keep the coding efficiency high, slices per each row/sub stream cannot be used. Therefore, below, a so-called Dependent Slice as defined in the next section is introduced. This slice, for example, has not all fields of the full HEVC Slice Header, but the fields used for Entropy Slices. Furthermore, there may be a switch to turn off the break of CABAC between rows. In case of WPP, usage of CABAC context (arrows in FIG. 14) and prediction of rows shall be allowed to keep the coding efficiency gain of WPP over tiles.

Figures 14, 15:
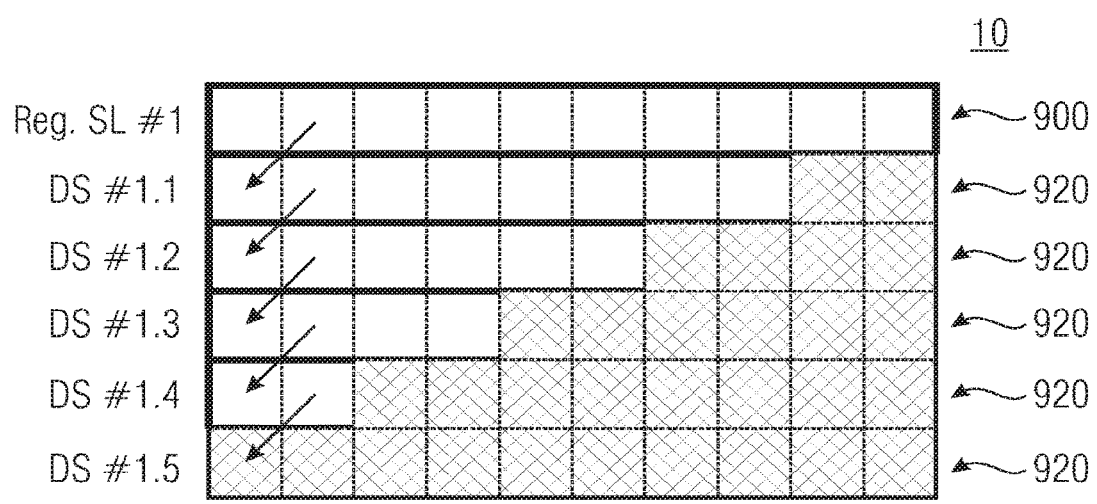
FIG. 14 exemplifies a partition of a picture for WPP processing into a regular slice and, for a low delay processing, into dependent slices.
FIG. 15 shows an example for a portion within a picture parameter set syntax.

In particular, FIG. 14 exemplifies a picture 10 for WPP into a regular slice 900 (reg. SL), and, for low delay processing, into dependent slices(DS) 920.

Currently the upcoming HEVC standard offers two types of partitioning in terms of slices. There are regular (normal) slice and entropy slice. The regular slice is completely independent picture partition except some dependencies that may be available due to deblocking filter process on slice boundaries. The entropy slice is also independent but only in terms of entropy coding. The idea of FIG. 14 is to generalize the slicing concept. Thus the upcoming HEVC standard should offer two general types of slices: independent (regular) or dependent. Therefore, a new type of slice, a Dependent Slice, is introduced.

Dependent Slice is a slice that has dependencies to previous slice. The dependencies are a particular data that can be utilized between slices in entropy decoding process and/or pixel reconstruction process.

In FIG. 14 a concept of dependent slices is exemplarily presented. The picture starts, for example, with a regular slice. Nate, in this concept the regular slice behavior is slightly changed. Typically, in the standards like H264/AVC or HEVC, regular slice is completely independent partition and do not have to keep any data after decoding except some data for deblocking filter process. But the processing of forthcoming dependent slice 920 is only possible by referencing the data of slice above, here in the first row: regular slice 900. To establish that, regular slices 900 should keep the data of the last CU-row. This data comprises:

CABAC coding engine data (context model states of one CU from that the entropy decoding process of dependent slice can be initialized), all decoded syntax elements of CUs for regular CABAC decoding process of dependent CUs, Data of intra and motion vector prediction.

Consequently each dependent slice 920 shall do the same procedure—keep data for forthcoming dependent slice in the same picture.

In practice, these additional steps should not be an issue, because the decoding process in generally is forced to store some data like syntax elements.

In the sections below possible changes for the HEVC standard syntax that are necessitated to enable the concept of dependent slices, are presented.

FIG. 5, for example, illustrates possible changes in picture parameter set RBSP syntax Picture parameter set semantics for dependent slices could be as follows:

dependent_slices_present_flag equal to 1 specifies that the picture is containing dependent slices and the decoding process of each (regular or dependent) slice shall store states of entropy decoding and data of intra and motion vector prediction for next slice that may be a dependent slice that may also follow the regular slice. The following dependent slice may reference that stored data.

FIG. 16 shows a possible slice_header syntax with the changes relative to HEVC's current status.

dependent_slice_flag equal to 1 specifies that the value of slice header syntax elements not present is inferred to be equal to the value of slice header syntax elements in a proceeding (regular) slice, where a proceeding slice is defined as the slice containing the coding treeblock with location (SliceCtbAddrRS−1). dependent_slice_flag shall be equal to 0 when SliceCtbAddrRS equal to 0.

no_cabac_reset_flag equal to 1 specifies CABAC initialization from saved state of previously decoded slice (and not with initial values). Otherwise, i.e. if 0, CABAC initialization independent from any state of previously decoded slice, i.e. with initial values.

last_ctb_cabac_init_flag equal to 1 specifies CABAC initialization from saved state of last coded treeblock of previously decoded slice (e.g. for tiles equal to 1). Otherwise (equals to 0), initialization data is referenced from saved state of second coded treeblock of last (neighboring) ctb-row of previously decoded slice, if the first coded treeblock of current slice is first coded treeblock in row (i.e. WPP mode), otherwise CABAC initialization is preformed from saved state of last coded treeblock of previously decoded slice.

A comparison of Dependent Slices and other partitioning schemes (informative) is provided below.

Figure 17:
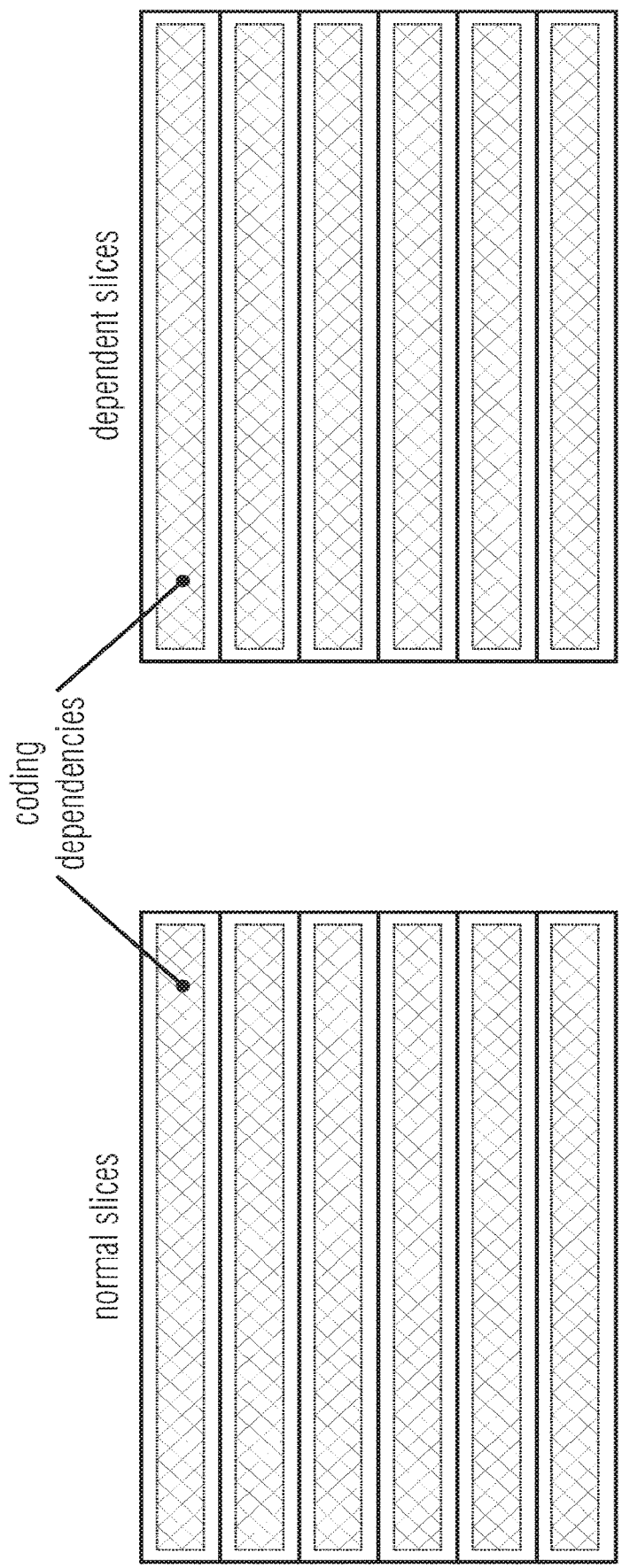
FIG. 17 schematically illustrates coding interdependencies for normal slices (and dependent slices)

In FIG. 17, the difference between normal and dependent slices is shown.

Figure 18:
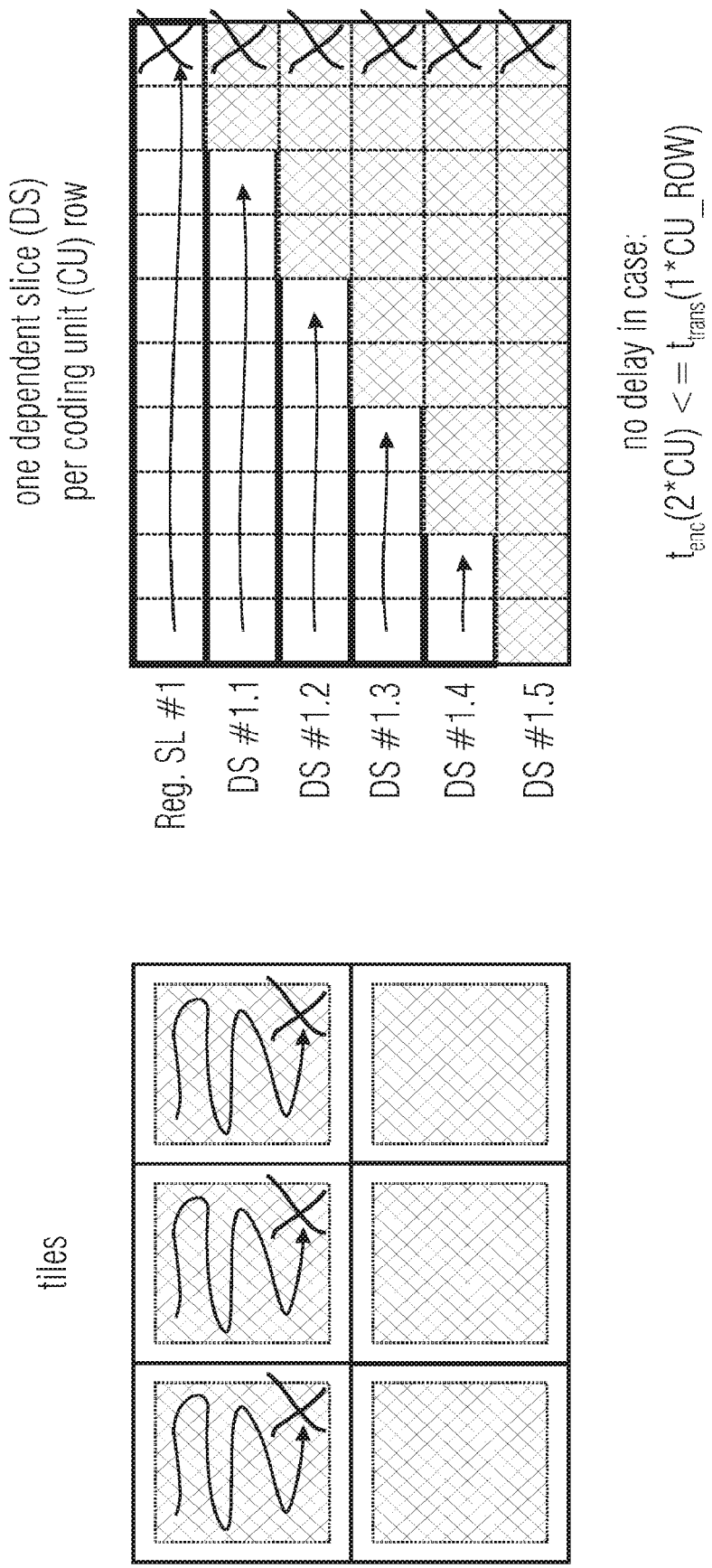
FIG. 18 shows a schematic diagram comparing an encoding for low delay transport of tiles (wavefront parallel processing using dependent slices)

A possible coding and transmission of WPP substreams in dependent slices (DS) as illustrated with respect to FIG. 18 compares an encoding for low delay transport of tiles (left) and WPP/DS (right). The bold continuously drawn crosses in FIG. 18 show the same time point of time for the two methods assuming that the encoding of the WPP row take the same time as the encoding of a single tile. Due to the coding dependencies, only the first line of WPP is ready, after all tiles have been encoded. But using the dependent slice approach allows the WPP approach to send out the first row once it is encoded. This is different from earlier WPP sub stream assignments, "substream" is defined for WPP as a concatenation of CU rows of slice to be WPP decoded by the same decoder thread, i.e. the same core/processor. Although, a substream per row and per entropy slice would also have been possible before, the entropy slice breaks the entropy coding dependencies and has therefore lower coding efficiency, i.e. the WPP efficiency gain is lost.

Figure 19:
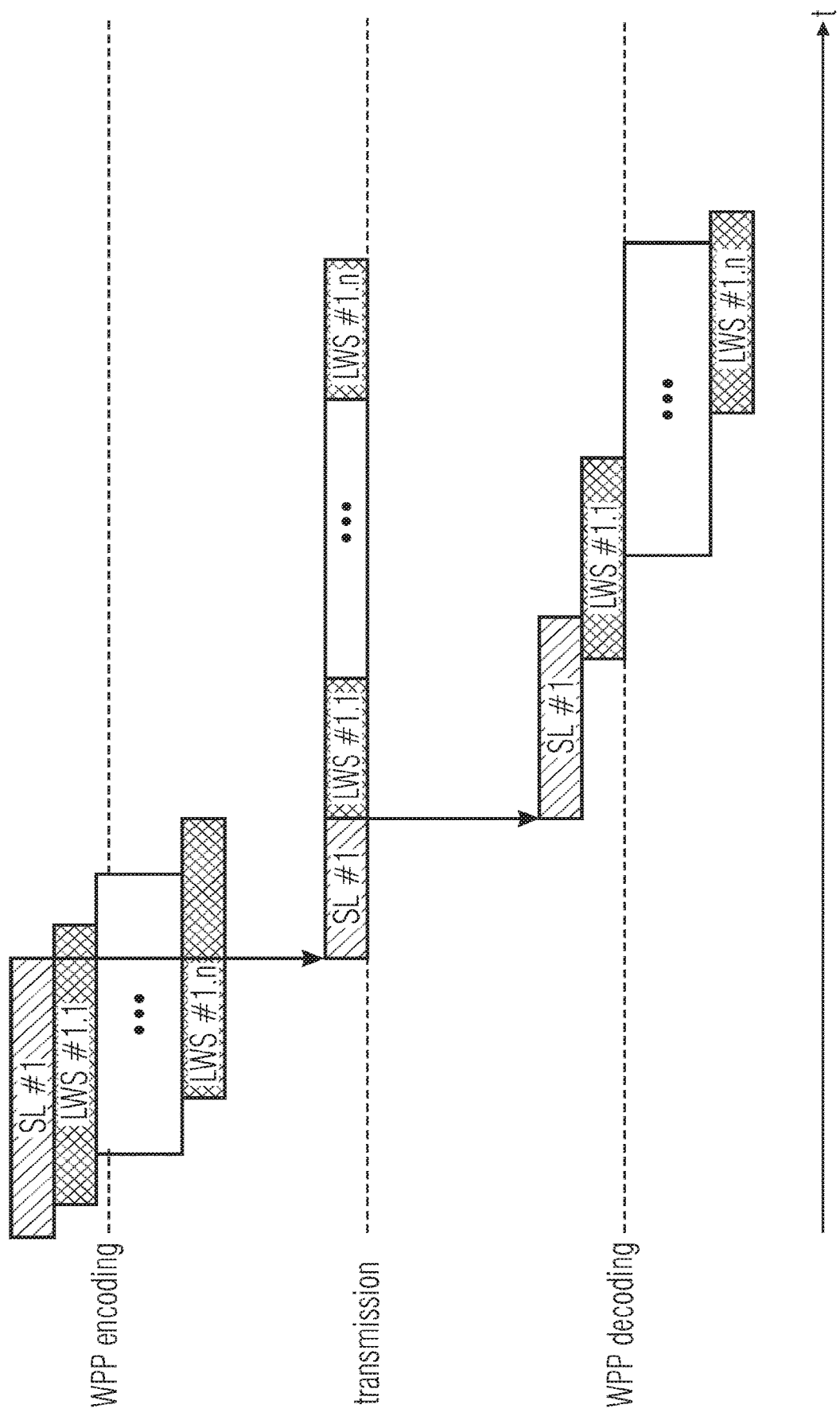
FIG. 19 illustrates a timing schedule illustrating an exemplary WPP coding with pipeline low delay transmission when using wavefront parallel processing using dependent slices as shown at the right-hand side of FIG. 18.

Additionally the delay difference between both approaches may be really low, assuming a transmission as shown in FIG. 19. In particular, FIG. 19 illustrates a WPP coding with pipelined low delay transmission.

Assuming that the encoding of the latter two CUs of DS #1.1 in the WPP approach in FIG. 18, does not take longer than the transmission of the first row SL #1, there is no difference between Tiles and WPP in the low delay case. But the coding efficiency of WP/DS outperforms the tile concept.

Figure 20:
FIG. 20 shows a schematic diagram illustrating a robustness improvement by using regular slices as anchors.

In order to increase the robustness for WPP low delay mode, FIG. 20 illustrates that robustness improving is achieved by using Regular Slices (RS) as anchors. In the picture shown in FIG. 20 a (regular) slice (RS) is followed by dependent slices (DS). Here, the (regular) slice acts as an anchor to break the dependencies to preceding slices, hence more robustness is provided at such insertion point of a (regular) slice. In principal, this is not different from inserting (regular) slices anyway.

The concept of dependent slices could also be implemented as follows.

Figure 21:
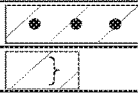
FIG. 21 shows another embodiment for a slice header syntax.

Here, FIG. 21 shows a possible slice header syntax.

The slice header semantics is as follows:

dependent_slice_flag equal to 1 specifies that the value of each slice header syntax element not present is inferred to be equal to the value of corresponding slice header syntax element in the preceding slice containing the coding tree block for which the coding tree block address is SliceCtbAddrRS−1. When not present, the value of dependent_slice_flag is inferred to be equal to 0. The value of dependent_slice_flag shall be equal to 0 when SliceCtbAddrRS equal to 0.

slice_address specifies the address in slice granularity resolution in which the slice starts. The length of the slice_address syntax element is (Ceil(Log 2 (PicWidthInCtbs*PicHeightInCtbs))+SliceGranularity) bits.

The variable SliceCtbAddrRS, specifying the coding tree block in which the slice starts in coding tree block raster scan order, is derived as follows.

SliceCtbAddrRS=(slice_address>>SliceGranularity)

The variable SliceCbAddrZS, specifying the address of first coding block in the slice in minimum coding block granularity in z-scan order, is derived as follows.

SliceCbAddrZS=slice_address<<((log 2_ diff_max_min_coding_block_size−SliceGranularity)<<1)

The slice decoding starts with the largest coding unit possible, or, in other terms, CTU, at the slice starting coordinate.

first_slice_in_pic_flag indicates whether the slice is the first slice of the picture. If first_slice_in_pic_flag is equal to 1, the variables SliceCbAddrZS and SliceCtbAddrRS are both set to 0 and the decoding starts with the first coding tree block in the picture.

pic_parameter_set_id specifies the picture parameter set in use. The value of pic_parameter_set_id shall be in the range of 0 to 255, inclusive.

num_entry_point_offsets specifies the number of entry_point_offset[i] syntax elements in the slice_header. When tiles_or_entropy_coding_sync_idc is equal to 1, the value of num_entry_point_offsets shall be in the range of 0 to (num_tile_columns_minus1+1)*(num_tile_rows_minus1+1)−1, inclusive. When tiles_or_entropy_coding_sync_idc is equal to 2, the value of num_entry_point_offsets shall be in the range of 0 to PicHeightInCtbs−1, inclusive. When not present, the value of num_entry_point_offsets is inferred to be equal to 0.

offset_len_minus1 plus 1 specifies the length, in bits, of the entry_point_offset[i] syntax elements.

entry_point_offset[i] specifies the i-th entry point offset, in bytes and shall be represented by offset_len_minus1 plus 1 bits. The coded slice data after the slice header consists of num_entry_point_offsets+1 subsets, with subset index values ranging from 0to num_entry_point_offsets, inclusive. Subset 0 consists of bytes 0to entry_point_offset[0]−1, inclusive, of the coded slice data, subset k, with k in the range of 1 to num_entry_point_offsets−1, inclusive, consists of bytes entry_point_offset[k−1] to entry_point_offset[k]+entry_point_offset[k−1]−1, inclusive, of the coded slice data, and the last subset (with subset index equal to num_entry_point_offsets) consists of the remaining bytes of the coded slice data.

When tiles_or_entropy_coding_sync_idc is equal to 1 and num_entry_point_offsets is greater than 0, each subset shall contain all coded bits of exactly one tile, and the number of subsets (i.e., the value of num_entry_point_offsets+1) shall be equal to or less than the number of tiles in the slice.

NOTE—When tiles_or_entropy_coding_sync_idc is equal to 1, each slice has to include either a subset of one tile (in which case signalling of entry points is unnecessitated) or an integer number of complete tiles.

When tiles_or_entropy_coding_sync_idc IS equal to 2 and num_entry_point_offsets is greater than 0, each subset k with k in the range of 0to num_entry_point_offsets−1, inclusive, shall contain all coded bits of exactly one row of coding tree blocks, the last subset (with subset index equal to num_entry_point_offsets) shall contain all coded bits of the remaining coding blocks included in the slice, wherein the remaining coding blocks consist of either exactly one row of coding tree blocks or a subset of one row of coding tree blocks, and the number of subsets (i.e., the value of num_entry_point_offsets+1) shall be equal to the number of rows of coding tree blocks in the slice, wherein a subset of one row of coding tree blocks in the slice is also counted.

NOTE When tiles_or_entropy_coding_sync_idc is equal to 2, a slice may include a number of rows of coding tree blocks and a subset of a row of coding tree blocks. For example, if a slice include two and a half rows of coding tree blocks, the number of subsets (i.e., the value of num_entry_point_offsets+1) shall be equal to 3.

The corresponding picture parameter set RESP syntax could be selected as shown in FIG. 22.

The picture parameter set RESP semantics could be as follows:

dependent_slice_enabled_flag equal to 1 specifies the presence of the syntax element dependent_slice_flag in the slice header for coded pictures referring to the picture parameter set. dependent_slice_enabled_flag equal to 0 specifies the absence of the syntax element dependent_slice_flag in the slice_header for coded pictures referring to the picture parameter set. When tiles_or_entropy_coding_sync_idc is equal to 3, the value of dependent_slice_enabled_flag shall be equal to 1.

tiles_or_entropy_coding_sync_idc equal to O specifies that there shall be only one tile in each picture referring to the picture parameter set, there shall be no specific synchronization process for context variables invoked before decoding the first coding tree block of a row of coding tree blocks in each picture referring to the picture parameter set, and the values of cabac_independent_flag and dependent_slice_flag for coded pictures referring to the picture parameter set shall not be both equal to 1.

Nate, when cabac_independent_flag and depedent_slice_flag are both equal to 1 for a slice, the slice is an entropy slice.

tiles_or_entropy_coding_sync_idc equal to 1 specifies that there may be more than one tile in each picture referring to the picture parameter set, there shall be no specific synchronization process for context variables invoked before decoding the first coding tree block of a row of coding tree blocks in each picture referring to the picture parameter set, and the values of cabac_independent_flag and dependent_slice_flag for coded pictures referring to the picture parameter set shall not be both equal to 1.

tiles_or_entropy_coding_sync_idc equal to 2 specifies that there shall be only one tile in each picture referring to the picture parameter set, a specific synchronization process for context variables shall be invoked before decoding the first coding tree block of a row of coding tree blocks in each picture referring to the picture parameter set and a specific memorization process for context variables shall be invoked after decoding two coding tree blocks of a row of coding tree blocks in each picture referring to the picture parameter set, and the values of cabac_independent_flag and dependent_slice_flag for coded pictures referring to the picture parameter set shall not be both equal to 1.

tiles_or_entropy_coding_sync_idc equal to 3 specifies that there shall be only one tile in each picture referring to the picture parameter set, there shall be no specific synchronization process for context variables invoked before decoding the first coding tree block of a row of coding tree blocks in each picture referring to the picture parameter set, and the values of cabac_independent_flag and dependent_slice_flag for coded pictures referring to the picture parameter set may both be equal to 1.

When dependent_slice_enabled_flag shall be equal to 0, tiles_or_entropy_coding_sync_idc shall not be equal to 3.

It's a requirement of bitstream conformance that the value of tiles_or_entropy_coding_sync_idc shall be the same for all picture parameter sets that are activated within a coded video sequence.

For each slice referring to the picture parameter set, when tiles_or_entropy_coding_sync_idc is equal to 2 and the first coding block in the slice is not the first coding block in the first coding tree block of a row of coding tree blocks, the last coding block in the slice shall belong to the same row of coding tree blocks as the first coding block in the slice.

num_tile_columns_minus1 plus 1 specifies the number of tile columns partitioning the picture.

num_tile_rows_minus1 plus 1 specifies the number of tile rows partitioning the picture.

When num_tile_columns_minus1 is equal to 0, num_tile_rows_minus1 shall not be equal to 0. uniform_spacing_flag equal to 1 specifies that column boundaries and likewise row boundaries are distributed uniformly across the picture. uniform_spacing_flag equal to O specifies that column boundaries and likewise row boundaries are not distributed uniformly across the picture but signalled explicitly using the syntax elements column_width[i] and row_height[i].

column_width[i] specifies the width of the i-th tile column in units of coding tree blocks.

row_height[i] specifies the height of the i-th tile row in units of coding tree blocks.

The vector colWidth[i] specifies the width of the i-th tile column in units of CTBs with the column i ranging from 0 to num_tile_columns_minus1, inclusive.

The vector CtbAddrRStoTS[ctbAddrRS] specifies the conversation from a CTB address in raster scan order to a CTB address in tile scan order with the index ctbAddrRS ranging from 0 to (picHeightlnCtbs*picWidthlnCtbs)−1, inclusive.

The vector CtbAddrTStoRS[ctbAddrTS] specifies the conversation from a CTB address in tile scan order to a CTB address in raster scan order with the index ctbAddrTS ranging from 0 to (picHeightlnCtbs*picWidthlnCtbs)−1, inclusive.

The vector TileId[ctbAddrTS] specifies the conversation from a CTB address in tile scan order to a tile id with ctbAddrTS ranging from Oto (picHeightlnCtbs*picWidthlnCtbs)−1, inclusive.

The values of colWidth, CtbAddrRStoTS, CtbAddrTStoRS and TileId are derived by invoking a CTB raster and tile scanning conversation process with PicHeightlnCtbs and PicWidthlnCtbs as inputs and the output is assigned to colWidth, CtbAddrRStoTS and TileId.

The values of ColumnWidthlnLumaSamples[i], specifying the width of the i-th tile column in units of luma samples, are set equal to colWidth[I]<<Log 2CtbSize.

The array MinCbAddrZS[x][y], specifying the conversation from a location (x, y) in units of minimum CBs to a minimum CB address in z-scan order with x ranging from 0 to picWidthlnMinCbs−1, inclusive, and y ranging from 0 to picHeightlnMinCbs−1, inclusive, is derived by invoking a Z scanning order array initialization process with Log 2MinCbSize, Log 2CtbSize, PicHeightlnCtbs, PicWidthlnCtbs, and the vector CtbAddrRStoTS as inputs and the output is assigned to MinCbAddrZS.

loop_filter_across_tiles_enabled_flag equal to 1 specifies that in-loop filtering operations are performed across tile boundaries. loop_filter_across_tiles_enabled_flag equal to 0 specifies that in-loop filtering operations are not performed across tile boundaries. The in-loop filtering operations include the deblocking filter, sample adaptive offset, and adaptive loop filter operations. When not present, the value of loop_filter_across_tiles_enabled_flag is inferred to be equal to 1.

cabac_independent_flag equal to 1 specifies that CABAC decoding of coding blocks in a slice is independent from any state of the previously decoded slice. cabac_independent_flag equal to 0 specifies that CABAC decoding of coding blocks in a slice is dependent from the states of the previously decoded slice. When not present, the value of cabac_independent_flag is inferred to be equal to 0.

A derivation process for the availability of a coding block with a minimum coding block address could be as follows:
Inputs to this process are
a minimum coding block address minCbAddrZS in z-scan order
the current minimum coding block address currMinCBAddrZS in z-scan order Output of this process is the availability of the coding block with minimum coding block address cbAddrZS in z-scan order cbAvailable.

NOTE 1—The meaning of availability is determined when this process is invoked.

NOTE 2—Any coding block, regardless of its size, is associated with a minimum coding block address, which is the address of the coding block with the minimum coding block size in z-scan order.

If one or more of the following conditions are true, cbAvailable is set to FALSE.
minCbAddrZS is less than 0
minCbAddrZS is greater than currMinCBAddrZS
the coding block with minimum coding block address minCbAddrZS belongs to a different slice than the coding block with the current minimum coding block address currMinCBAddrZS and the dependent_slice_flag of the slice containing the coding block with the current minimum coding block address currMinCBAddrZS is equal to 0.
the coding block with minimum coding block address minCbAddrZS is contained in a different tile than the coding block with the current minimum coding block address currMinCBAddrZS.
Otherwise, cbAvailable is set to TRUE.

A CABAC parsing process for slice data could be as follows:

This process is invoked when parsing certain syntax elements with descriptor ae(v).

Inputs to this process are a request for a value of a syntax element and values of prior parsed syntax elements.

Output of this process is the value of the syntax element.

When starting the parsing of the slice data of a slice, the initialization process of the CABAC parsing process is invoked.

Figure 23:
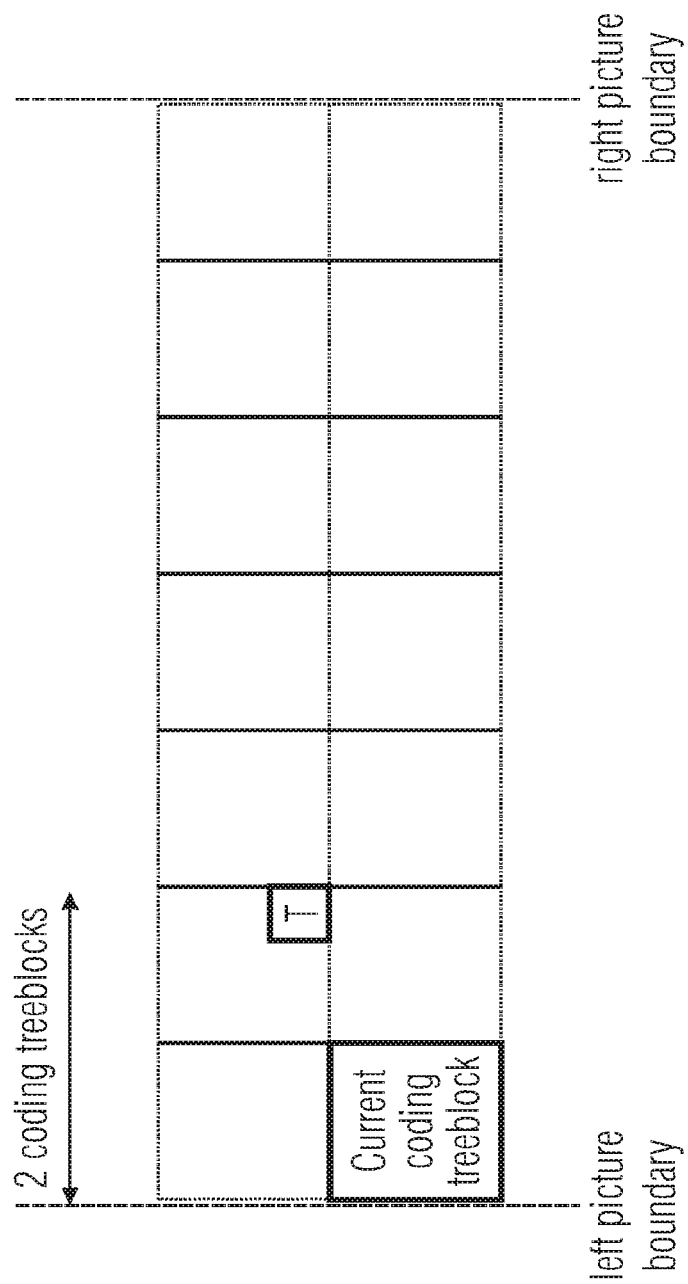
FIG. 23 shows a schematic diagram illustrating a symbol probability initialization process for a dependent slice in case of beginning at the left picture boundary.

FIG. 23 illustrates as to how a spatial neighbor T is used to invoke the coding tree block availability derivation process relative to the current coding tree block (informative).

The minimum coding block address of the coding tree block containing the spatial neighbor block T (FIG. 23), ctbMinCbAddrT, is derived using the location (x0, y0) of the top-left luma sample of the current coding tree block as follows.

$$x = x0 + 2 \ll \text{Log 2CtbSize} - 1$$

$$y = y0 - 1$$

ctbMinCbAddrT=MinCbAddrZS[x>>Log 2MinCbSize][y>>Log 2MinCbSize]

The variable availableFlagT is obtained by invoking a coding block availability derivation process with ctbMinCbAddrT as input.

When starting the parsing of a coding tree as specified, the following ordered steps apply.
  ing engine is initialised as follows.
  If CtbAddrRS is equal to slice_address, dependent_slice_flag is equal to 1 and
  The
  arith
  metic
  decod
  entropy_coding_reset_flag is equal to 0, the following applies.
    The synchronization process of the CABAC parsing process is invoked with TableStateIdxDS and TableMPSValDS as input.
    A decoding process for binary decisions before termination is invoked, followed by an initialization process for the arithmetic decoding engine.
  Otherwise if tiles_or_entropy_coding_sync_idc is equal to 2, and CtbAddrRS % PicWidthInCtbs is equal to 0, the following applies.
    When availableFlagT is equal to 1, a synchronization process of the CABAC parsing process is invoked with TableStateIdxWPP and TableMPSValWPP as input.
    A decoding process for binary decisions before termination is invoked, followed by the process for the arithmetic decoding engine.
  When cabac_independent_flag is equal to 0 and dependent_slice_flag is equal to 1, or when tiles_or_entropy_coding_sync_idc is equal to 2, the memorization process is applied as follows.
    When tiles_or_entropy_coding_sync_idc is equal to 2 and CtbAddrRS % PicWidthInCtbs is equal to 2, the memorization process of the CABAC parsing process is invoked with TableStateIdxWPP and TableMPSValWPP as output.
    When cabac_independent_flag is equal to 0, dependent_slice_flag is equal to 1, and end_of_slice_flag is equal to 1, the memorization process of the CABAC parsing process is invoked with TableStateIdxDS and TableMPSValDS as output.

x elements proceeds as follows:

For each requested value of a syntax element a binarization is derived.

The binarization for the syntax element and the sequence of parsed bins
The
parsin
g of
synta
determines the decoding process flow.

For each bin of the binarization of the syntax element, which is indexed by the variable binIdx, a context index ctxIdx is derived.

For each ctxIdx the arithmetic decoding process is invoked.

The resulting sequence (b0 . . . bbinidx) of parsed bins is compared to the set of bin strings given by the binarization process after decoding of each bin. When the sequence matches a bin string in the given set, the corresponding value is assigned to the syntax element.

In case the request for a value of a syntax element is processed for the syntax element pcm-flag and the decoded value of pcm_flag is equal to 1, the decoding engine is initialised after the decoding of any pcm_alignment_zero_bit, num_subsequent_pcm, and all pcm_sample_luma and pcm_sample_chroma data.

Figure 24:
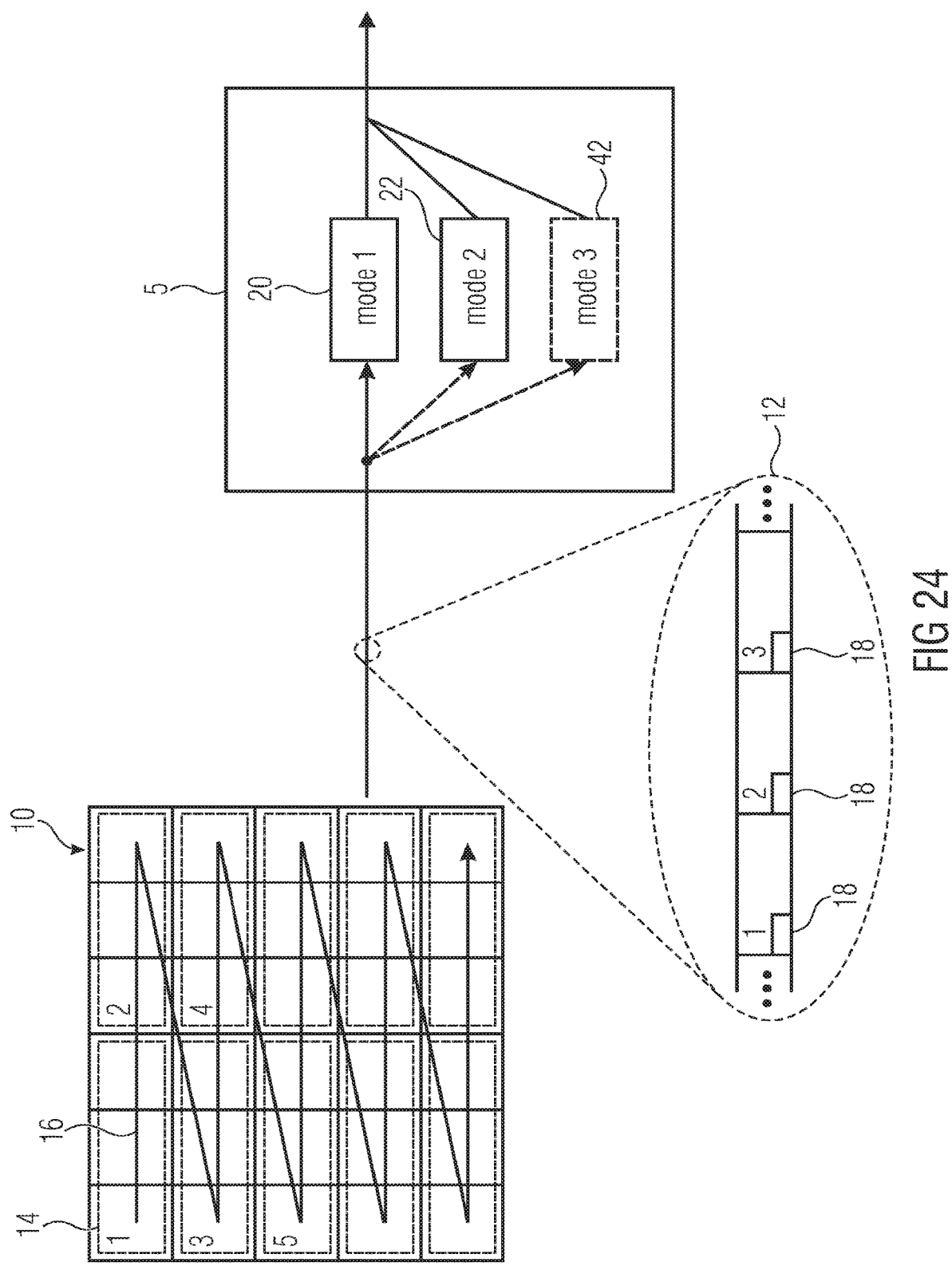
FIG. 24 shows a schematic diagram of a decoder.

Thus, the above description reveals a decoder as shown in FIG. 24. This decoder, which is generally indicated by reference sign 5, reconstructs a picture 10 from a data stream 12 into which the picture 10 is coded in units of slices 14 into which the picture 10 is partitioned, wherein the decoder 5 is configured to decode the slices 14 from the data stream 12 in accordance with a slice order 16. Naturally, decoder 5 is not restricted to serially decode the slices 14. Rather, the decoder 5 may use wavefront parallel processing in order to decode the slices 14, provided the pictures 10 partitioning into slices 14 is appropriate for wavefront parallel processing. Accordingly, decoder 5 may, for example, be a decoder which is able to decode slices 14 in parallel in a staggered manner with starting the decoding of the slices 14 by taking the slice order 16 into account so as to allow wavefront processing as it has been described above and will be described below, too.

Decoder 5 is responsive to a syntax element portion 18 within a current slice of the slices 14 so as to decode the current slice in accordance with one of at least two modes 20 and 22. In accordance with a first of the at least two modes, namely mode 20, the current slice is decoded from the data stream 12 using context adaptive entropy decoding including a derivation of context across slice boundaries, i.e. across the dashed lines in FIG. 24, i.e. by using information stemming from coding/decoding of other "in slice order 16 preceding slices". Further, decoding the current slice from the data stream 12 using the first mode 20 comprises a continuous update of symbol probabilities of the codec and an initialization of the symbol probabilities at the beginning of the decoding of the current slice, which depends on saved states of the symbol probabilities of a previously decoded slice. Such dependency was described above, for example, in connection with the "synchronization process for codec variables". Finally, the first mode 20 also involves predictive decoding across the slice boundaries. Such predictive decoding across slice boundaries may, for example, involve intra-prediction across slice boundaries, i.e. predicting sample values within the current slice on the basis of already reconstructed sample values of an "in slice order 16", preceding slice, or a prediction of coding parameters across slice boundaries such as a prediction of motion vectors, prediction modes, coding modes or the like.

In accordance with the second mode 22, the decoder 5 decodes the current slice, i.e. the slice currently to be decoded, from the data stream 12 using context adaptive entropy decoding with restricting, however, the derivation of the contexts so as to not cross the slice boundaries. If ever, for example, a template of neighboring positions used for deriving the context for a certain syntax element relating to a block within the current slice extends into a neighboring slice, thereby crossing the slice boundary of the current slice, the corresponding attribute of the respective portion of the neighboring slice, such as the value of the corresponding syntax element of this neighboring portion of the neighboring slice, is set to the default value in order to inhibit interdependencies between the current slice and the neighboring slices. While a continuous update of symbol probabilities of the contexts may take place just as it is the case in the first mode 20, the initialization of the symbol probabilities in the second mode 22 is independent of any previously decoded slice. Further, the predictive decoding is performed with restricting the predictive decoding so as to not cross the slice boundaries.

Figure 25:
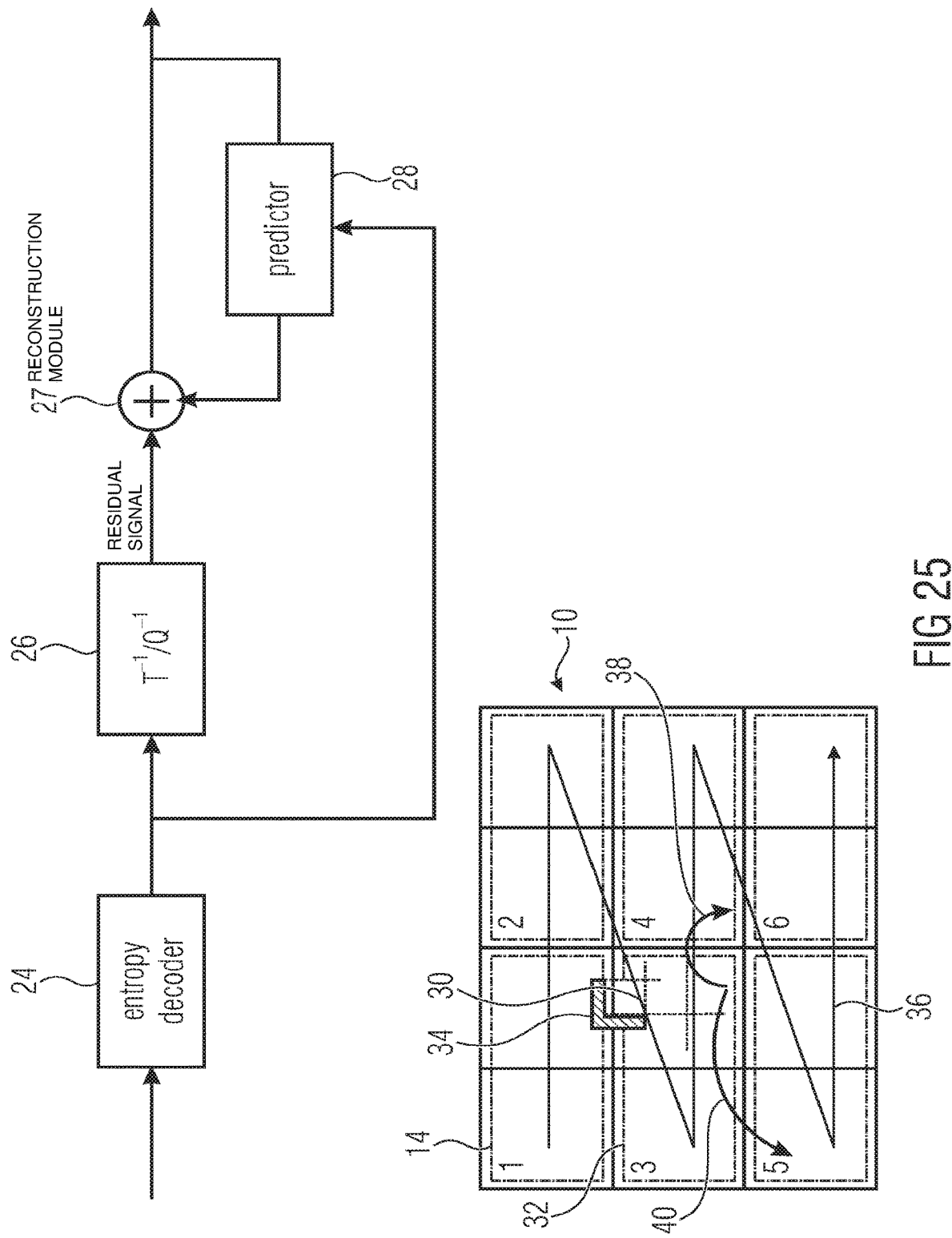
FIG. 25 schematically shows a block diagram of a decoder along with schematically illustrating the partitioning of a picture into coding blocks and slices.

In order to ease the understanding of the description of FIG. 24 and the following description, reference is made to FIG. 25, which shows a possible implementation of decoder 5 in a more structural sense than compared to FIG. 24. As it is the case in FIG. 24, the decoder 5 is a predictive decoder using context adaptive entropy decoding for decoding the data stream so as to obtain, for example, the prediction residual and prediction parameters.

As shown in FIG. 25, the decoder 5 may comprise an entropy decoder 24, a dequantization and inverse transform module 26, a combiner 28 implemented, as shown in FIG. 25, for example, as an adder and a predictor 28. Entropy decoder 24, module 26 and adder 27 are serially connected between input and output of decoder 5 in the order of their mentioning, and predictor 28 is connected between an output of adder 28 and a further input thereof in order to form the prediction loop along with combiner 27. Hence, the decoder 24 has its output additionally connected to a coding parameter input of predictor 28.

Although FIG. 25 provides the impression that the decoder serially decodes the current picture, the decoder 5 may, for example, be implemented so as to decode picture 10 in parallel. The decoder 5 may, for example, comprise multiple cores each operating according to elements 24-28 in FIG. 25. The parallel processing, however, is optional and a serially operating decoder 5 is also able to decode the data stream inbound at the input of entropy decoder 24.

In order to efficiently achieve the just-mentioned ability of either serially or in parallel decoding the current picture 10, the decoder 5 operates in units of coding blocks 30 in order to decode picture 10. Coding blocks 30 are, for example, leaf blocks into which coding tree blocks or largest coding blocks 32 are partitioned by recursive multitree partitioning such as quadtree partitioning. The code treeblocks 32, in turn, may be regularly arranged in columns and rows so as to form a regular partitioning of picture 10 into these code treeblocks 32. In FIG. 25, the code treeblocks 32 are shown with continuous lines, whereas coding blocks 30 are shown with dashed lines. For illustration purposes, merely one code treeblock 32 is shown to be further partitioned into coding blocks 30, while the other code treeblocks 32 are shown to be not further partitioned so as to directly form a coding block, instead. The data stream 12 may comprise a syntax portion signaling as to how picture 10 is partitioned into the code blocks 30.

The data stream 12 conveys, for each coding block 30, syntax elements which reveal as to how modules 24 to 28 are to recover the picture content within that coding block 30. For example, these syntax elements comprise:

1) optionally, partitioning data further partitioning coding block 30 into prediction blocks,
2) optionally, partitioning data further partitioning the coding block 30 into residual and/or transform blocks,
3) a prediction mode signaling as to which prediction mode is to be used for deriving the prediction signal for the coding block 30, wherein the granularity at which this prediction mode is signaled may depend on coding blocks 30 and/or prediction block.
4) prediction parameters may be signaled per coding block or, if present, per prediction block with a kind of prediction parameters sent depending, for example, on the prediction mode. Possible prediction modes may, for example, comprise intra-prediction and/or inter-prediction.
5) Other syntax elements may also be present such as filtering information for filtering picture 10 at coding block 30 so as to obtain the prediction signal and/or the reconstructed signal to be reproduced.
6) Finally, residual information in form of, inter alia, transform coefficients may be comprised in a data stream for coding block 30; in units of residual blocks, residual data may be signaled; per residual block, the spectral decomposition may, for example, performed in units of the aforementioned transform blocks, if present.

The entropy decoder 24 is responsible for obtaining the just-mentioned syntax elements from the data stream. To this end, the entropy decoder 24 uses context adaptive entropy decoding. That is, the entropy decoder 24 provides several context. In order to derive a certain syntax element from the data stream 12, the entropy decoder 24 selects a certain context among the possible contexts. The selection among the possible contexts is performed depending on an attribute of a neighborhood of the portion of picture 10 to which the current syntax element belongs. For each of the possible contexts, the entropy decoder 24 manages symbol probabilities, i.e., a probability estimate for each possible symbol of the symbol alphabet based on which the entropy decoder 24 operates. The "managing" involves the aforementioned continuous updates of the symbol probabilities of the contexts so as to adapt the symbol probabilities associated with each context to the actual picture content. By this measure, the symbol probabilities are adapted to the actual probability statistics of the symbols.

Another circumstance where attributes of a neighborhood influence the reconstruction of a current portion of picture 10 such as a current coding block 30, is the predictive decoding within predictor 28. The prediction is restricted not only to prediction content within the current coding block 30, but may also encompass prediction of parameters contained within the data stream 12 for the current coding block 30 such as prediction parameters, partitioning data, or even transform coefficients. That is, predictor 28 may predict picture content or such parameters from the aforementioned neighborhood so as to obtain the written signal which is then combined with the prediction residual as obtained by module 26 from data stream 12. In case of predicting parameters, predictor 28 may use syntax elements contained within the data stream as prediction residuals so as to obtain the actual value of the prediction parameter. Predictor 28 uses the latter prediction parameter value in order to obtain the just-mentioned prediction signal to be combined with the prediction residual in combiner 27.

The aforementioned "neighborhood" primarily covers the upper left-hand part of the circumference of the current portion to which the syntax element currently to be entropy-decoded or the syntax element to be currently predicted belongs. In FIG. 25, such neighborhood is illustrated at 34 exemplarily for one coding block 30.

A coding/decoding order is defined among the coding blocks 30: at a coarsest level, the code treeblocks 32 of picture 10 are scanned in a scan order 36, here illustrated as a raster scan leading row-wise from top to bottom. Within each code treeblock, the coding blocks 30 are scanned in a depth first traversal order such that, in each hierarchy level, the code treeblock 32 is substantially scanned also in a raster scan leading row-wise from top to bottom.

The coding order defined among the coding blocks 30 harmonizes with the definition of the neighborhood 34 used for deriving an attribute in the neighborhood so as to select contexts and/or perform spatial prediction in that the neighborhood 34 mostly covers portions of picture 10 which have already been subject to decoding in accordance with the coding order. Whenever a portion of neighborhood 34 covers non-available portions of picture 10, default data is, for example, being used instead. For example, a neighborhood template 34 may extend outside picture 10. Another possibility is, however, that the neighborhood 34 extends into a neighboring slice.

Slices divide-up, for example, picture 10 along a coding/decoding order defined along the coding blocks 30, i.e. each slice is a continuous non-interrupted sequence of coding blocks 30 along the aforementioned coding block order. In FIG. 25, the slices are indicated with dash-dot-lines 14. The order defined among the slices 14 results from their composition of runs of sequential coding blocks 30 as outlined above. If the syntax element portion 18 of a certain slice 14 indicates that same is to be decoded in the first mode, then entropy-decoder 24 allows the context adaptive entropy decoding to derive contexts across slice boundaries. That is, the spatial neighborhood 34 is used in order to select contexts in entropy decoding data concerning the current slice 14. In case of FIG. 25, for example, slice number 3 may be the currently decoded slice, and in entropy-decoding syntax element concerning coding block 30 or some portion contained therein, the entropy decoder 24 may use attributes stemming from decoding portions within the neighboring slice such as slice number 1. The predictor 28 behaves the same: for slices being of the first mode 20, predictor 28 uses spatial prediction across the slice boundary encircling the current slice.

For slices, however, having the second mode 22 associated therewith, i.e. for which syntax element portion 18 indicates the second mode 22, entropy decoder 24 and predictor 28 restrict the derivation of entropy contexts and predictive decoding to depend on attributes relating to portions lying within the current slice only. Obviously, the coding efficiency suffers from this restriction. On the other hand, slices of the second mode 22 allow for disrupting interdependencies between the sequence of slices. Accordingly, slices of the second mode 22 may be interspersed within picture 10 or within a video to which picture 10 belongs in order to allow for resynchronization points. It is not necessitated, however, that each picture 10 has at least one slice in the second mode 22.

As already mentioned above, first and second mode 20 and 22 also differ in their initialization of the symbol probabilities. Slices coded in the second mode 22, result in the entropy decoder 24 re-initializing the probabilities independent of any previously decoded slice, i.e. previously decoded in the sense of the order defined among the slices. The symbol probabilities are, for example, set to default values known to both encoder and decoder side, or initialization values are contained within slices coded in a second mode 22.

That is, for slices being coded/decoded in a second mode 22, the adaptation of the symbol probabilities starts immediately from the beginning of these slices. Accordingly, the adaptation accuracy is bad for these slices at the beginning of these slices.

Figure 2:
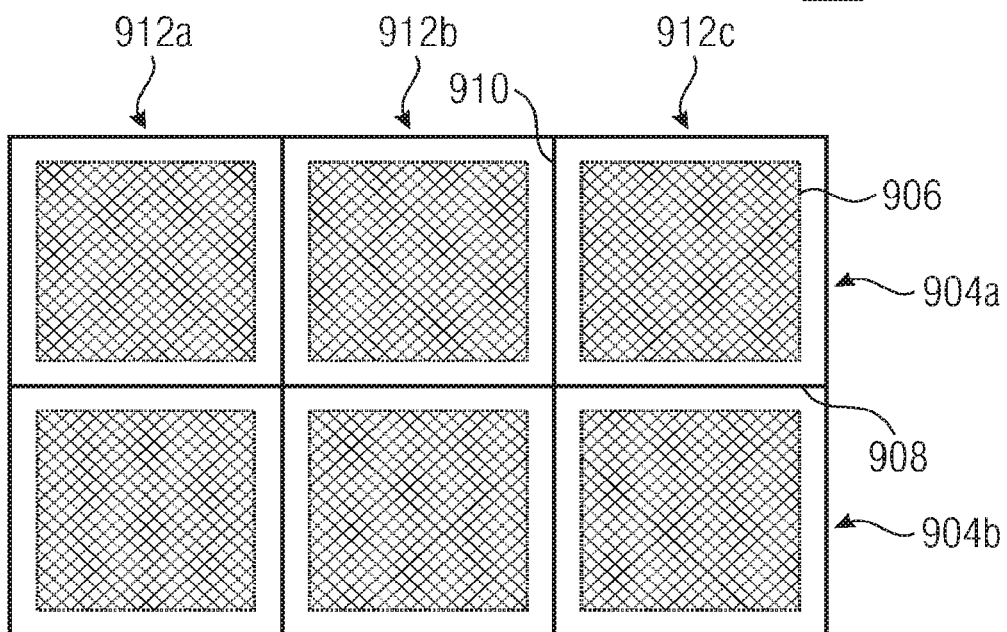
FIG. 2 shows a picture exemplarily divided up into two rows of horizontally partitioned tiles.

Things are different in slices coded/decoded in the first mode 20. For the latter slices, the initialization of the symbol probabilities performed by entropy decoder 24 depends on saved states of symbol probabilities of a previously decoded slice. Whenever a slice coded/decoded in a first mode 20, has its beginning, for example, positioned other than the left-hand side of picture 10, i.e. not at the side from where the raster scan 36 starts running row-wise before stepping to the next row bottom-wards, the symbol probabilities as resulting at the end of entropy decoding the immediately preceding slice are adopted. This is illustrated, for example, in FIG. 2 by an arrow 38 for slice no. 4. Slice no. 4 has its beginning somewhere in between the right-hand side and left-hand side of picture 10 and accordingly, in initializing the symbol probabilities, entropy decoder 24 adopts, in initializing the symbol probabilities, the symbol probabilities which were obtained in entropy decoding the immediately preceding slice, i.e. slice no. 3, until the end thereof, i.e. including the continuous update of symbol probabilities during the entropy decoding of slice 3 until its end.

Slices having the second mode 22 associated therewith, which have, however, the beginning at the left-hand side of picture 10 such as, for example, slice no. 5, do not adapt the symbol probabilities as obtained after finishing the entropy decoding of the immediately preceding slice no. 4, because this would prevent decoder 5 from parallelly decoding picture 10 by use of wavefront processing. Rather, as outlined above, the entropy decoder 24 adapts the symbol probabilities as obtained after finishing entropy decoding the second—in encoding/decoding order 36—code treeblock 32 in the immediately preceding—in encoding/decoding order 36—code treeblock row as illustrated by an arrow 40.

In FIG. 25, for example, picture 10 was exemplarily partitioned into three rows of code treeblocks and four columns of coding tree root blocks 32 and each code treeblock row was sub-divided into two slices 14, so that the beginning of every second slice coincides with the first coding unit in coding unit order of a respective code tree root block row. The entropy decoder 24 would, accordingly, be able to use wavefront processing in decoding picture 10, by decoding each code tree root block row in parallel, with commencing decoding these code tree root block rows in a staggered manner, starting with a first or topmost code tree root block row, then the second, and then the third.

Naturally, the partitioning of blocks 32 in a recursive manner into further coding blocks 30 is optional and accordingly, in a more general sense, blocks 32 could be called "coding blocks" as well. That is, more generally speaking, picture 10 may be partitioned into coding blocks 32 arranged in rows and columns and having a raster scan order 36 defined among each other, and the decoder 5 may be considered to associate each slice 14 with a continuous subset of the coding blocks 32 in the raster scan order 36 so that the subsets follow each other along the raster scan order 36 in accordance with the slice order.

As became also clear from the above discussion, the decoder 5 or, more specifically, the entropy decoder 24 may be configured to save symbol probabilities as obtained in context adaptive entropy decoding any slice up to a second coding block in a coding block row in accordance with the raster scan order 36. In initializing the symbol probabilities for the context adaptive entropy decoding of a current slice having the first mode 20 associated therewith, the decoder 5, or, more specifically, the entropy decoder 24, checks as to whether a first coding block 32 of the continuous subset of coding blocks 32 associated with the current slice is a first coding block 32 in a coding block row in accordance with the raster scan order 36. If so, the symbol probabilities for the context adaptive entropy decoding of the current slice is initialized as explained with respect to arrow 40, namely depending on the saved symbol probabilities as obtained in context entropy decoding the previously decoded slice up to the second coding block in coding block row in accordance with the raster scan order 36. If not, initialization of the symbol probabilities for the context adaptive entropy decoding of the current slice is performed depending on symbol probabilities as obtained in context adaptive entropy decoding the previously decoded slice up to the end of the previously decoded slice, i.e. according to arrow 38. Again, in case of initialization according to 38, the saved state at the end of entropy decoding the immediately preceding slice in slice order 36 is meant, whereas in case of initialization 40, it is that previously decoded slice comprising the end of the second block of the immediately preceding row of block 32 in block order 36.

As illustrated by dashed lines in FIG. 24, the decoder may be configured to be responsive to the syntax element portion 18 within the current slice of the slices 14 so as to decode the current slice in accordance with one of at least three modes. That is, there may be a third mode 42 beside the other ones 20 and 22. The third mode 42 may differ from the second mode 22 in that prediction across slice boundaries is allowed, whereas entropy coding/decoding is still restricted so as to not cross slice boundaries.

Above, two embodiments were presented regarding the syntax element portion 18. The table below summarizes these two embodiments.

|  | Embodiment 1 | Embodiment 2 |
| --- | --- | --- |
| syntax element portion | dependent_slice_flag, no cabac reset flag | dependent_slice_flag |
| mode 1 | dependent_slice_flag = 1, no cabac reset flag = 1 | dependent_slice_flag = 1, |
| mode 2 | dependent_slice_flag = 0 | dependent_slice_flag = 0 |
| mode3 | dependent_slice_flag = 1, no_cabac_reset_flag = 0 | dependent_slice_flag = 1, cabac_independent_flag = 1, tiles_or_entropy_coding_sync_idc = 3 |

In the one embodiment, the syntax element portion 18 is formed by dependent_slice_flag individually, while in the other embodiment, the combination of dependent_slice_flag and no_cabac_reset_flag forms the syntax element portion. Reference is made to the synchronization process for context variables as far as the initialization of symbol probabilities depending on saved states of symbol probabilities of a previously decoded slice is concerned. In particular, the decoder may be configured to, if last_ctb_cabac_init_flag=O and tiles_or_entropy_coding_sync_idc=2, save symbol probabilities as obtained in context adaptive entropy decoding the previously decoded slice up to a second coding block in a row in accordance with the raster scan order, and, in initializing the symbol probabilities for the context adaptive entropy decoding of the current slice in accordance with the first mode, check as to whether a first coding block of the continuous subset of coding blocks associated with the current slice is a first coding block in a row in accordance with the raster scan order, and, if so, initialize the symbol probabilities for the context adaptive entropy decoding of the current slice depending on the saved symbol probabilities as obtained in context adaptive entropy decoding the previously decoded slice up to a second coding block in a row in accordance with the raster scan order, and, if not, initialize the symbol probabilities for the context adaptive entropy decoding of the current slice depending on symbol probabilities as obtained in context adaptive entropy decoding the previously decoded slice up to the end of the previously decoded slice.

Thus, in other words, in accordance with the second embodiment for a syntax, the decoder would reconstruct picture 10 from datastream 12 into which the picture is coded in units of slices 14 into which the picture (10) is partitioned, wherein the decoder is configured to decode the slices 14 from the datastream 12 in accordance with a slice order 16 and the decoder is responsive to a syntax element portion 18, namely dependent_slice_flag within a current slice of the slices, so as to decode the current slice in accordance with one of at least two modes 20, 22. In accordance with a first 20 of the at least two modes, namely if dependent_slice_flag=1, the decoder decodes the current slice from the datastream 12 using context adaptive entropy decoding 24 including a derivation of contexts across slice boundaries, a continuous update of symbol probabilities of the contexts and an initialization 38, 40 of the symbol probabilities depending on saved states of symbol probabilities of a previously decoded slice, and predictive decoding across the slice boundaries, and in accordance with a second 22 of the at least two modes, namely if dependent_slice_flag=O, the decoder decodes the current slice from the datastream 12 using context adaptive entropy decoding with restricting the derivation of the contexts so as to not cross the slice boundaries, a continuous update of symbol probabilities of the contexts and an initialization of the symbol probabilities independent on any previously decoded slice, and predictive decoding with restricting the predictive decoding so as to not cross the slice boundaries. The picture 10 may be partitioned in coding blocks 32 arranged in rows and columns and having a raster scan order 36 defined among each other, and the decoder is configured to associate each slice 14 with a continuous subset of the coding blocks 32 in the raster scan order 36 so that the subsets follow each other along the raster scan order 36 *m* accordance with the slice order. The decoder may be configured to, namely responsive to tiles_or_entropy_coding_sync_idc=2, save symbol probabilities as obtained in context adaptive entropy decoding the previously decoded slice up to a second coding block 32 in a row in accordance with the raster scan order 36, and, in initializing the symbol probabilities for the context adaptive entropy decoding of the current slice in accordance with the first mode, check as to whether a first coding block of the continuous subset of coding blocks 32 associated with the current slice is a first coding block 32 in a row in accordance with the raster scan order, and, if so, initialize 40 the symbol probabilities for the context adaptive entropy decoding of the current slice depending on the saved symbol probabilities as obtained in context adaptive entropy decoding the previously decoded slice up to a second coding block in a row in accordance with the raster scan order 36, and, if not, initialize 38 the symbol probabilities for the context adaptive entropy decoding of the current slice depending on symbol probabilities as obtained in context adaptive entropy decoding the previously decoded slice up to the end of the previously decoded slice. The decoder may be configured to be responsive to the syntax element portion (18) within the current slice of the slices 14, so as to decode the current slice in accordance with one of at least three modes, namely in the one of the first 20 and a third mode 42 or a second mode 22, wherein the decoder is configured to, in accordance with the third mode 42, namely if dependent_slice_flag=1 and tiles_or_entropy_coding_sync_idc=3, decode the current slice from the datastream using context adaptive entropy decoding with restricting the derivation of the contexts so as to not cross the slice boundaries, a continuous update of symbol probabilities of the contexts and an initialization of the symbol probabilities independent on any previously decoded slice, and predictive decoding across the slice boundaries, wherein the one of the first and third modes is selected depending on a syntax element, namely cabac_independent_flag. The decoder may further be configured to, namely if tiles_or_entropy_coding_sync_idc=0, 1, and 3 ("3" when cabac_independent flag=0), save symbol probabilities as obtained in context adaptive entropy decoding the previously decoded slice up to an end of the previously decoded slice, and, in initializing the symbol probabilities for the context adaptive entropy decoding of the current slice in accordance with the first mode, initialize the symbol probabilities for the context adaptive entropy decoding of the current slice depending on symbol probabilities saved. The decoder may be configured to, namely if tiles_or_entropy_coding_sync_idc=1, in the first and second mode, restrict the predictive decoding within tiles into which the picture is sub-divided.

Naturally, an encoder is able to set the above presented syntax accordingly in order to enable the decoder to gain the above outlined advantages. The encoder may a parallel processing, such as a multi-core, encoder, but does not need to be. For encoding picture 10 into datastream 12 in units of slices 14, the encoder would be configured to encode the slices 14 into the datastream 12 in accordance with slice order 16. The encoder would determine syntax element portion 18 for, and code same into, a current slice of the slices so that the syntax element portion signals the current slice to be coded in accordance with one of the at least two modes 20, 22, and if the current slice is to be coded in accordance with a first 20 of the at least two modes, encode the current slice into the datastream 12 using context adaptive entropy encoding 24 including a derivation of contexts across slice boundaries, a continuous update of symbol probabilities of the contexts and an initialization 38, 40 of the symbol probabilities depending on saved states of symbol probabilities of a previously encoded slice, and predictive encoding across the slice boundaries, and if the current slice is to be coded in accordance with a second 22 of the at least two modes, encode the current slice into the datastream 12 using context adaptive entropy encoding with restricting the derivation of the contexts so as to not cross the slice boundaries, a continuous update of symbol probabilities of the contexts and an initialization of the symbol probabilities independent on any previously encoded slice, and predictive encoding with restricting the predictive encoding so as to not cross the slice boundaries. While the picture 10 may be partitioned in coding blocks 32 arranged in rows and columns and having a raster scan order 36 defined among each other, the encoder may be configured to associate each slice 14 with a continuous subset of the coding blocks 32 in the raster scan order 36 so that the subsets follow each other along the raster scan order 36 in accordance with the slice order. The encoder may be configured to save symbol probabilities as obtained in context adaptive entropy encoding the previously encoded slice up to a second coding block 32 in a row in accordance with the raster scan order 36, and, in initializing the symbol probabilities for the context adaptive entropy encoding of the current slice in accordance with the first mode, check as to whether a first coding block of the continuous subset of coding blocks 32 associated with the current slice is a first coding block 32 in a row in accordance with the raster scan order, and, if so, initialize 40 the symbol probabilities for the context adaptive entropy encoding of the current slice depending on the saved symbol probabilities as obtained in context adaptive entropy encoding the previously encoded slice up to a second coding block in a row in accordance with the raster scan order 36, and, if not, initialize 38 the symbol probabilities for the context adaptive entropy encoding of the current slice depending on symbol probabilities as obtained in context adaptive entropy encoding the previously decoded slice up to the end of the previously encoded slice. The encoder may be configured to be code the syntax element portion (18) into the current slice of the slices (14) so that the current slice is signaled to be coded thereinto in accordance with one of at least three modes, namely in the one of the first (20) and a third mode (42) or a second mode (22), wherein the encoder is configured to  in accordance with the third mode (42**), encode the current slice into the datastream using context adaptive entropy encoding with restricting the derivation of the contexts so as to not cross the slice boundaries, a continuous update of symbol probabilities of the contexts and an initialization of the symbol probabilities independent on any previously encoded slice, and predictive coding across the slice boundaries, wherein the encoder distinguishes between the one of the first and third modes being using a syntax element, namely cabac_independent_flag, for example. The encoder may be configured to determine a generic syntax element such as dependent_slices_present_flag and write same into the datastream with operating in one of at least two generic operating modes depending on the generic syntax element, namely, with, according to a first generic operating mode, performing coding the syntax element portion for each slice, and, according to a second generic operating mode, inevitably using a different one of the at least two modes other than the first mode. The encoder may be configured to according to the first and second modes, inevitably and uninterruptedly continue continuously updating the symbol probabilities from a beginning to an end of the current slice. The encoder ay be configured to save symbol probabilities as obtained in context adaptive entropy encoding the previously encoded slice up to an end of the previously encoded slice, and, in initializing the symbol probabilities for the context adaptive entropy encoding of the current slice in accordance with the first mode, initialize the symbol probabilities for the context adaptive entropy encoding of the current slice depending on symbol probabilities saved. And the encoder may, in the first and second mode, restrict the predictive encoding within tiles into which the picture is sub-divided.

Figure 26:
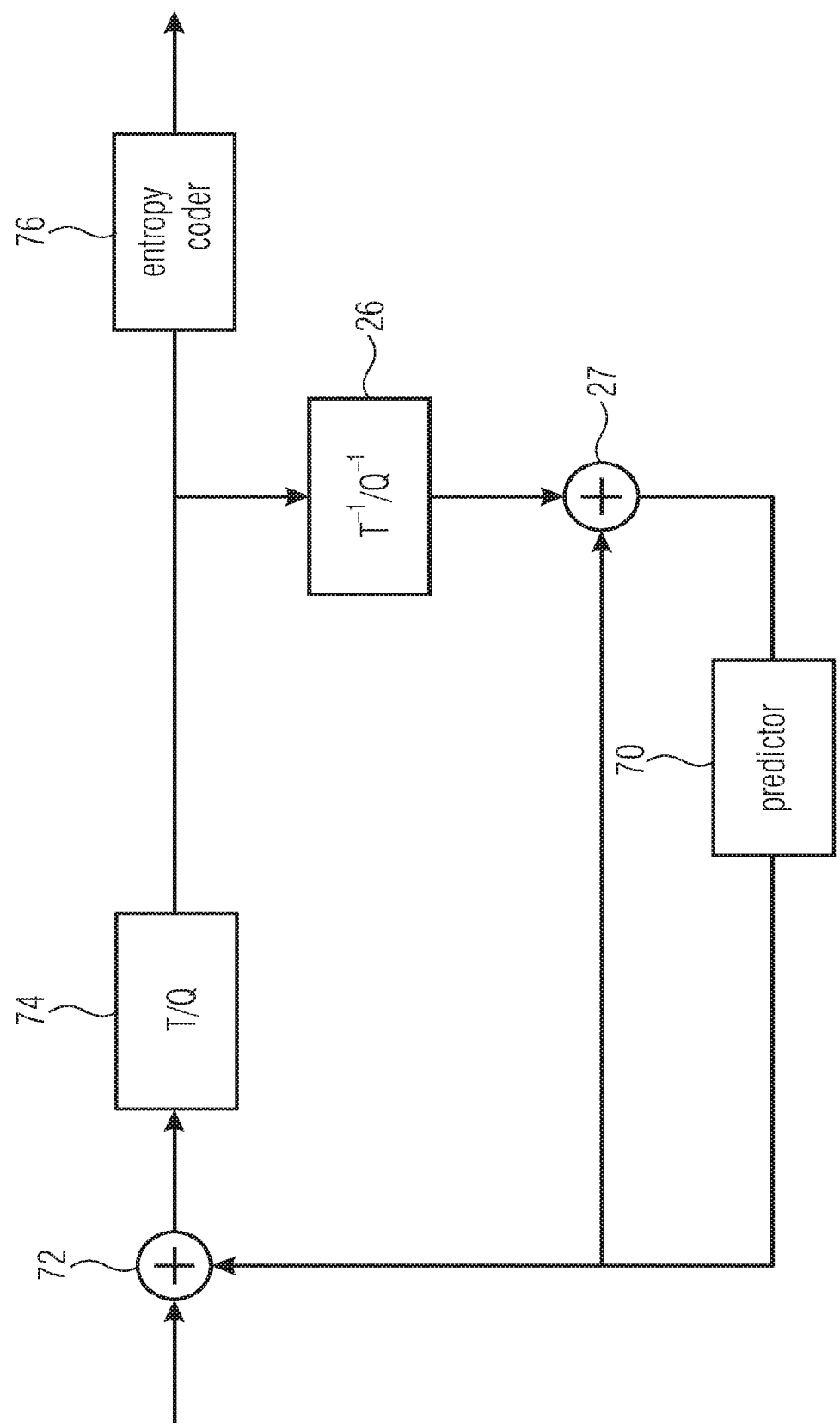
FIG. 26 schematically shows a block diagram of an encoder.

A possible structure of an encoder is depicted in FIG. 26 for sake of completeness. Predictor 70 operates almost the same as predictor 28, i.e. performs the prediction, but also determines, by optimization, for example, the coding parameters including the prediction parameters and modes. Modules 26 and 27 also occur in the decoder. Subtractor 72 determines the lossless prediction residual which is then, lossy—by use of quantization and, optionally, using spectrally decomposing transformation —, coded in the transformation and quantization module 74. Entropy coder 76 performs the context adaptive entropy encoding.

In addition to the above concrete syntax examples, a different example is outlined below with presenting the concordance between terms used hereinafter and terms used above.

In particular, without having particularly outlined above, dependent slices are not only "dependent" in that same allow for exploiting knowledge known from outside its boundary, such as, as outlined above, have the entropy contexts adapted faster, or achieve a better spatial prediction due to allowance of crossing its boundary. Rather, in order to save rate cost having to be spent for defining the slice headers by splitting-up the picture into slices, dependent slices adopt a part of the slice header syntax from previous slices, i.e. this slice syntax header portion is not transmitted again for dependent slices. This is shown for example, in FIG. 16 at 100 and in FIG. 21 at 102, according to which the slice type, for example, is adopted from the previous slice. By this measure, the subdivision of a picture into slices, such as an independent slice and dependent slices, as less expensive in terms of bit-consumption expensive.

It is the just-mentioned dependency which leads, in the below outlined example, to a slightly different wording: slices are defined as unit portions of a picture at which slice header syntax is individually settable. Accordingly, slices are composed of one—using the nomenclature above—independent/regular/normal slice, now called independent slice segment and no, one or more—using the nomenclature above—dependent slices now called dependent slice segments.

Figure 27:
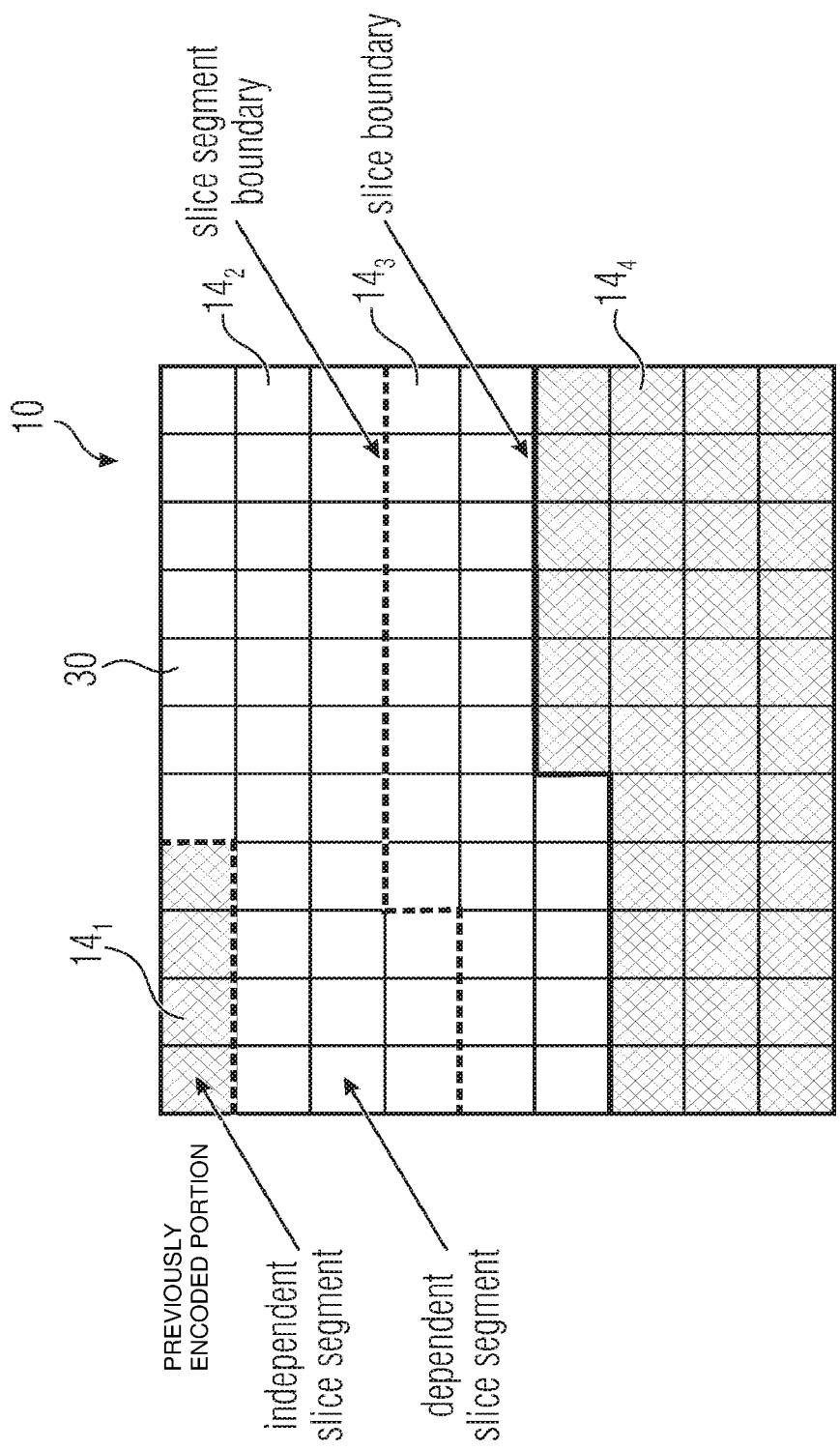
FIG. 27 schematically shows a picture partitioned into normal and dependent slices, here called slice segments.
Figure 28:
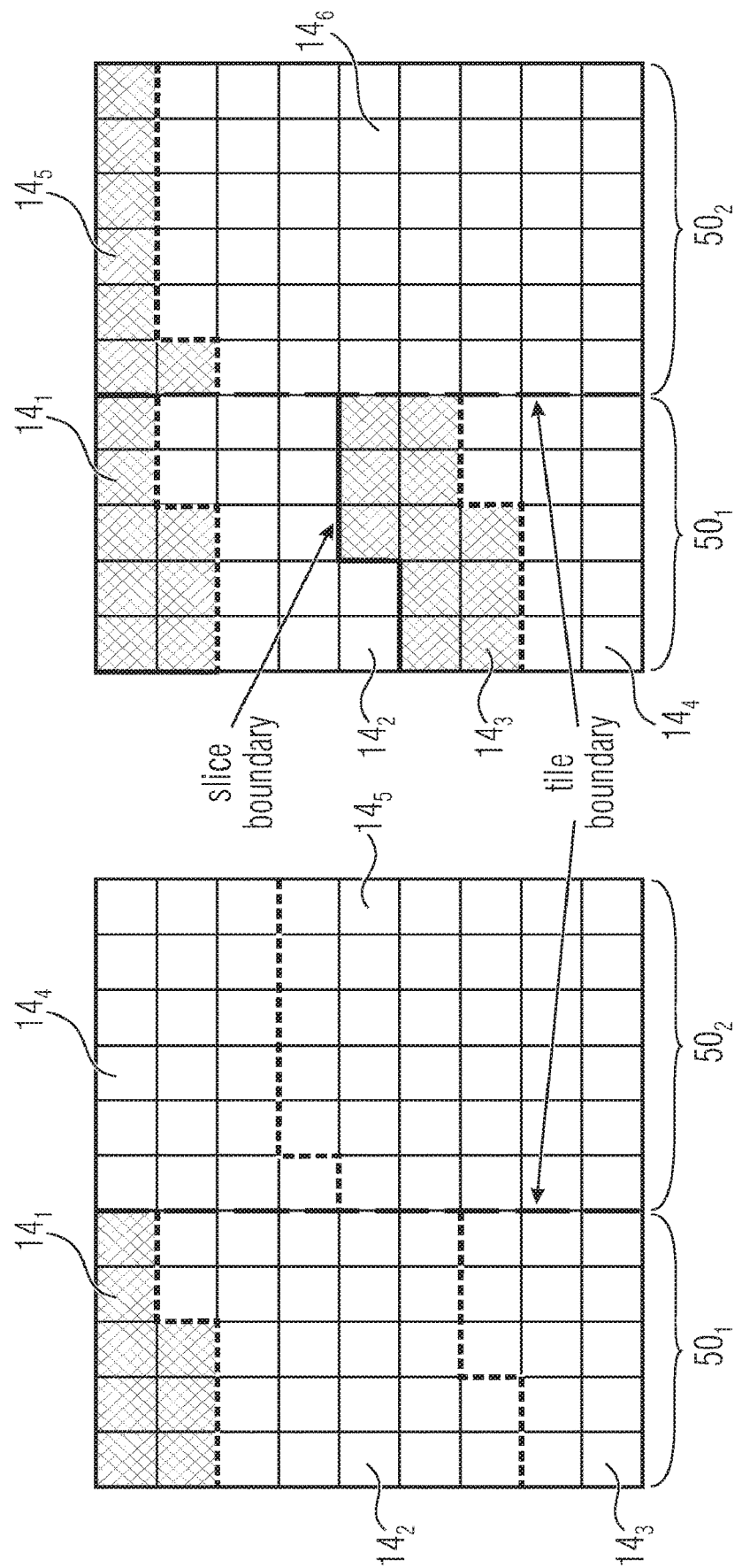
FIGS. 28a and 28b schematically shows a picture partitioned into normal and dependent slices here called slice segments, on the one hand, and tiles on the other hand.

FIG. 27, for example, shows a picture to be partitioned into two slices, one formed by slice segments 141 to 143 and the other solely formed by slice segment 144. The indices 1 to 4 show the slice order in coding order. FIGS. 28*a* and *b* show different example in case of a sub-division of picture 10 into two tiles, with, in case of FIG. 28*a*, one slice formed by all five slice segments 14, covering both tiles 501 and 502—the index again raising in coding order-, and, in case of FIG. 28*a*, two slices formed by slice segments 141 and 142 and 143 and 144, respectively, subdividing tile 501, and another slice formed by slice segments 14*s*-146 covering tile 502.

The definitions could be as follows:

dependent slice segment: A slice segment for which the values of some syntax elements of the slice segment header are inferred from the values for the preceding independent slice segment in decoding order—formerly, in the above embodiments—called a dependent slice.

independent slice segment: A slice segment for which the values of the syntax elements of the slice segment header are not inferred from the values for a preceding slice segment—formerly, in the above embodiments—called a normal slice.

slice: An integer number of coding tree units contained in one independent slice segment and all subsequent dependent slice segments (if any) that precede the next independent slice segment (if any) within the same access unit/picture.

slice header: The slice segment header of the independent slice segment that is a current slice segment or is the independent slice segment that precedes a current dependent slice segment.

slice segment: An integer number of coding tree units ordered consecutively in the tile scan and contained in a single NAL unit; the division of each picture into slice segments is a partitioning.

slice segment header: A part of a coded slice segment containing the data elements pertaining to the first or all coding tree units represented in the slice segment.

The signaling of the "modes" 20 and 22, l.e. "dependent slice segment" and "independent slice segment" could be as follows:

In some extra NAL units such as PPS, a syntax element could be used to signal as to whether usage of dependent slices is made or not for a certain picture of even a sequence for certain pictures:

dependent_slice_segments_enabled_flag equal to 1 specifies the presence of the syntax element dependent_slice_segment_flag in the slice segment headers. dependent_slice_segments_enabled_flag equal to O specifies the absence of the syntax element dependent_slice_segment_flag in the slice segment headers.

dependent_slice_segments_enabled_flag is similar in scope to the formerly described dependent_slices_present_flag.

Similarly, dependent_slice_flag could be called dependent_slice_segment_flag so as to account for the different nomenclature with respect to slices.

dependent_slice_segment_flag equal to 1 specifies that the value of each slice segment header syntax element that is not present in the current slice segment's header is inferred to be equal to the value of the corresponding slice segment header syntax element in the slice_header, i.e. the slice segment here of the preceding independent slice segment.

In the same level, such as picture level, the following syntax element could be included:

entropy_coding_sync_enabled_flag equal to 1 specifies that a specific synchronization process for context variables is invoked before decoding the coding tree unit which includes the first coding tree block of a row of coding tree blocks in each tile in each picture referring to the PPS, and a specific storage process for context variables is invoked after decoding the coding tree unit which includes the second coding tree block of a row of coding tree blocks in each tile in each picture referring to the PPS. entropy_coding_sync_enabled_flag equal to O specifies that no specific synchronization process for context variables is necessitated to be invoked before decoding the coding tree unit which includes the first coding tree block of a row of coding tree blocks in each tile in each picture referring to the PPS, and no specific storage process for context variables is necessitated to be invoked after decoding the coding tree unit which includes the second coding tree block of a row of coding tree blocks in each tile in each picture referring to the PPS.

It is a requirement of bitstream conformance that the value of entropy_coding_sync_enabled_flag shall be the same for all PPSs that are activated within a CVS.

When entropy_coding_sync_enabled_flag is equal to 1 and the first coding tree block in a slice is not the first coding tree block of a row of coding tree blocks in a tile, it is a requirement of bitstream conformance that the last coding tree block in the slice shall belong to the same row of coding tree blocks as the first coding tree block in the slice.

When entropy_coding_sync_enabled_flag is equal to 1 and the first coding tree block in a slice segment is not the first coding tree block of a row of coding tree blocks in a tile, it is a requirement of bitstream conformance that the last coding tree block in the slice segment shall belong to the same row of coding tree blocks as the first coding tree block in the slice segment.

As already described, the coding/decoding order among the CTBs 30 leads in raster manner row-wise from top to bottom starting with scanning the first tile with then visiting the next tile, if more than one tile is present in the picture.

Figure 29:
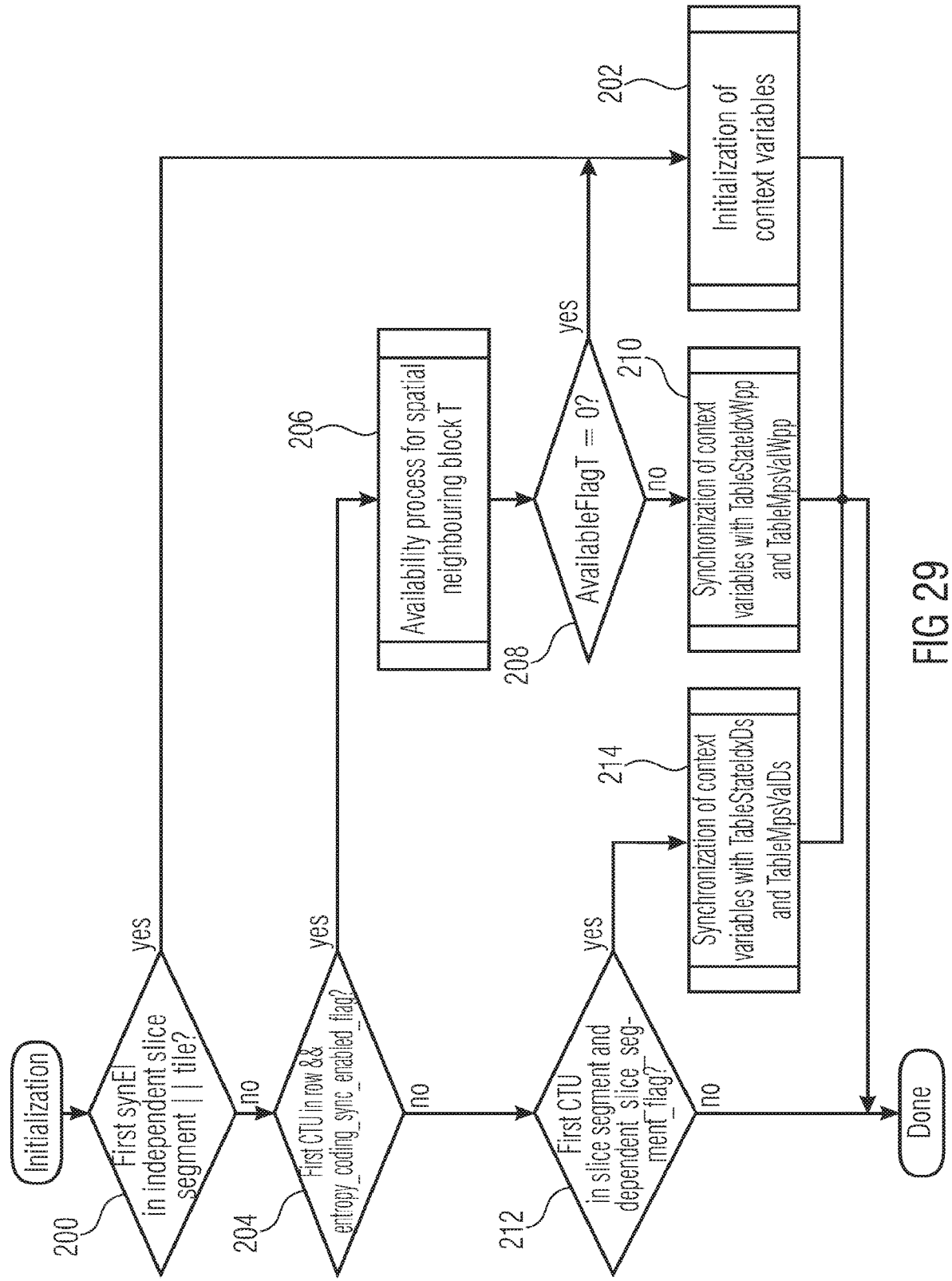
FIG. 29 shows a flow diagram illustrating an context initialization process using dependent slices.

The decoder 5—and the encoder accordingly—acts as follows in entropy decoding (coding) the slice segments 14 of the picture:

A1) Whenever a currently decoded/coded syntax element synEl is the first syntax element of a tile 50, slice segment 14 or row of CTB, an initialization process of FIG. 29 is commenced.

A2) Otherwise, decoding of this syntax element takes place using the current entropy contexts.

Figure 30:
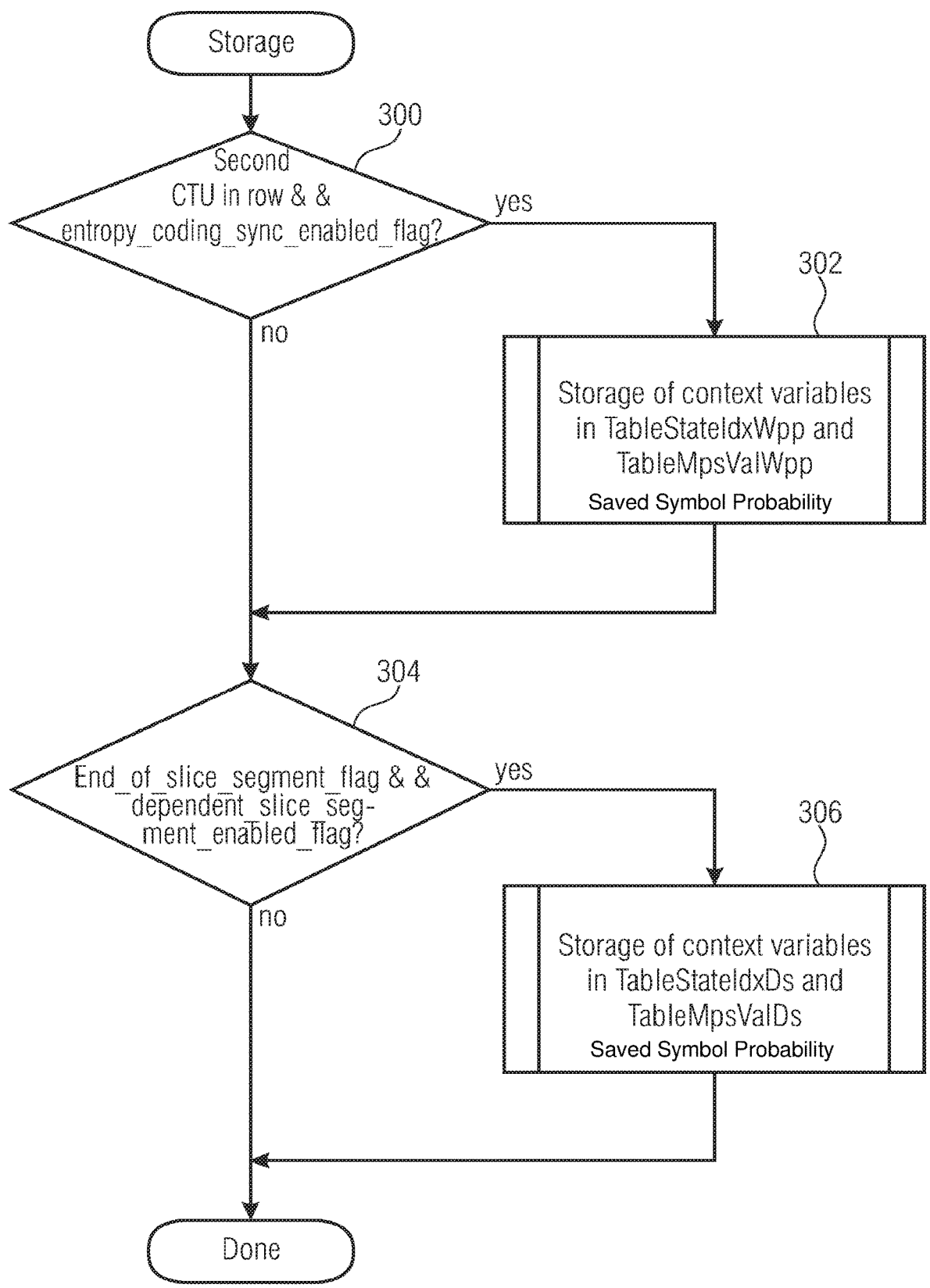
FIG. 30 shows a flow diagram illustrating a context storage process for using dependent slices.

A3) If the current syntax element was the last syntax element in a CTB 30, then an entropy context storage process as shown in FIG. 30 is commenced.

A4) The process proceeds at A1) with the next syntax element.

In the initialization process, it is checked 200 whether synEl is the first syntax element of a slice segment 14 or tile 50. If yes, the contexts are initialized independent from any previous slice segment in step 202. If no, is checked 204 whether synEl is the first syntax element of a row of CTBs 30 and entropy_coding_sync_enabled_flag equals one. If yes, it is checked 206 whether in the previous line of CTBs 30 of equal tile, the second CTB 30 is available (see FIG. 23). If yes, a context adoption according to 40 is performed in step 210 using the currently stored context probabilities for type 40 adoptions. If not, contexts are initialized independent from any previous slice segment in step 202. If the check 204 reveals no, then it is checked in step 212, whether synEl is the first syntax element in the first CTB of a dependent slice segment 14 and whether dependent_slice_segement_flag equals one, and if yes, context adoption according to 38 is performed in step 214 using the currently stored context probabilities for type 38 adoptions. After any of steps 214, 212, 210 and 202, the decoding/coding is actually commenced.

Dependent slice segments with dependent_slice_segement_flag equaling one, thus help to further decrease coding/decoding delay with almost no coding efficiency penalty.

segment 14, and dependent_slice_segement_flag equals one. If yes, the current entropy contexts are stored in step 306, i.e. the entropy coding probabilities of the contexts, in a storage which is specific for adoptions a la 38.

It is noted that any check querying as to whether a syntax element is the first synEl of a CTB row, exploits for example, the syntax element slice_address 400 within the slice segment's headers, i.e. a start syntax element revealing a position of a begin of the respective slice segment along the decoding order.

In reconstructing the picture 10 from the datastream 12 using WPP processing, the decoder is able to exploit exactly the latter start syntax portion 400 so as to retrieve the WPP substream entry points. Since each slice segment comprises a start syntax portion 400 indicating the position of a decoding begin of the respective slice segment within the picture 10, the decoder is able to identify the entry points of the WPP substreams into which the slice segments are grouped, by identifying, using the slice segments' start syntax portions 400, slice segments starting at a left hand side of the picture. The decoder may then, in parallel, decode the WPP substreams in a staggered manner with sequentially commencing the decoding of the WPP substreams in accordance with the slice order. The slice segments may even be smaller than one picture width, i.e. one row of CTBs, so that their transmission may be interleaved among the WPP sub streams so as to further reduce the overall transmission end-to-end delay. The Encoder provides each slice (14) with a start syntax portion (400) indicating a position of a coding begin of the respective slice within the picture (10) and would group the slices into WPP substreams so that for each WPP substream, the first slice in slice order starts at a left hand side of the picture. The encoder may even, by itself, use WPP processing in encoding the picture: the encoder parallel encodes the WPP substreams in a staggered manner with sequentially commencing the encoding of the WPP substreams in accordance with the slice order.

By the way, the latter aspect of using the slice segment's start syntax portions as a means for locating the WPP substream's entry points, may be used without the dependent slice concept.

It would be feasible to all for parallel processing picture 10, by setting above variables as follows:

|  | tiles_enabled_flag==0 | tiles_enabled_flag==1 | entropy_cooding_sync_enable flag ==1 | tiles_enabled_flag==1 | entropy_cooding_sync_enable_flag ==1 |
|---|---|---|---|---|---|
| dependent slice segment flag | 0/1 | 0/1 | 0/1 | 0/1 | 0/1 |
| Picture subdivision into tiles | No | Yes | No | Yes | No |
| Slice subdivision with entry points to indicate start of WPP substream or Tile. | No | Yes | Yes | No | No |
| parallel processing possible | in slices | in Tiles | WPP | in Tiles | WPP |

In the storage process of FIG. 30, it is checked in step 300 whether the coded/decoded synEl is the last syntax element of a second CTB 30 of a row of CTBs 30, and entropy_coding_sync_enabled_flag equals one. If yes, the current entropy contexts are stored in step 302, i.e. the entropy coding probabilities of the contexts, in a storage which is specific for adoptions a la 40. Similarly, it is checked in step 304, in addition to steps 300 or 302, whether the coded/decoded synEl is the last syntax element of a slice It would even feasible to mix WPP with tile partitioning. In that case, one could treat tiles as individual pictures: each which uses WPP would be composed of a slice having one or more dependent slice segments, and the check in step 300 and 208 would refer to the second CTB in the above CTB row in the same tile, just as steps 204 and A1 would refer to the first CTB 30 in the CTB 30 row of the current tile! In that case, above table could be expanded:

|  | tiles_enabled_flag | tiles_enabled_flag==1 | entropy_cooding_sync_enable_flag==1 | tiles_enabled_flag==1 | entropy_cooding_sync_enable_flag==1 | entropy_cooding_sync_enable_flag==1 | entrapy_cooding_sync_enable_flag==1 |
|---|---|---|---|---|---|---|---|
| dependent_slice_segmentflag | 0/1 | 0/1 | 0/1 | 0/1 | 0/1 | 0/1 | 0/1 |
| Picture subdivision into tiles | No | Yes | No | Yes | No | Yes | Yes |
| Slice subdivision with entry points to indicate start of WPP substream or Tile. | No | Yes | Yes | No | No | No (each substream ofa tile in its own dependent slice) | Yes (each tile ma separate slice and entry points for WPP substreams within the slice of the tile) |
| parallel processing possible | in slices | in Tiles | WPP | in Tiles | WPP | WPP substreams within Tiles | WPP substreams within Tiles |

As a brief note, the latter extension would have also been possible with embodiment 2. Embodiment 2 allows the following processing:

|  | Syntax level |  |  |  |  |
|---|---|---|---|---|---|
| tiles_or_entropy_coding_sync_idc | per picture | 0 | 1 | 2 | 3 |
| cabac_independent_flag | per slice | not present | not present | not present | 0/1 |
| dependent_slice_flag | per slice | 0/1 | 0/1 | 0/1 | 0/1 |
| Picture subdivision into tiles |  | No | Yes | No | No |
| Slice subdivision with entry points to indicate start of WPP substream or Tile |  | No | Yes | Yes | No |

-continued

|  | Syntax level |  |  |  |  |
|---|---|---|---|---|---|
| parallel processing possible |  | in slices | in Tiles | WPP | Entropy coding of slices |

But with the following extensions, the table below would result:

Add to Semantics of Picture Parameter Set:

If tiles_or_entropy_coding_sync_idc is equal to 4, each, but the first row of CTBs shall be contained in a different slice with dependent slice flag set to 1. CTBs of different rows does not have to be present in the same slice. There may be more than one slice present per CTB row.

If tiles_or_entropy_coding_sync_idc is equal to 5, the CTBs of each, but the first tile has to be contained in different slice. CTBs of different tiles does not have to be present in the same slice. There may be more than one slice present per tile.

Figure 31:
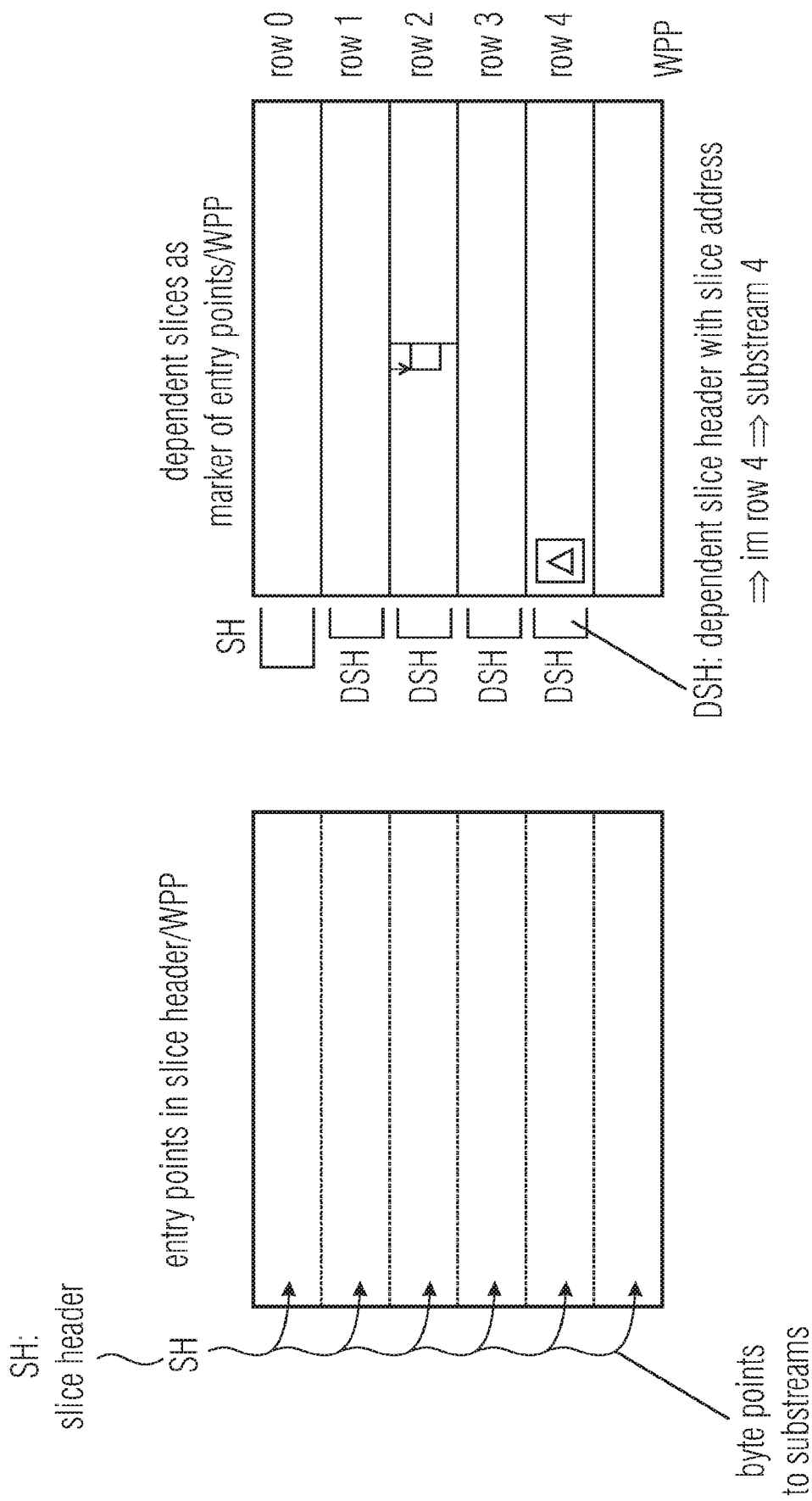
FIG. 31 schematically shows different possibilities of signaling WPP entry points.

See FIG. 31, for further explanation.

That is, above table may be extended:

|  | Syntax level |  |  |  |  |  |  |  |
|---|---|---|---|---|---|---|---|---|---|
| tiles_or_entropy_coding_sync_idc | per picture | 0 | 1 | 2 | 3 | 5 | 4 | 6 | 7 |
| cabac_independent_flag | per slice | not present | not present | not present | 0/1 | not present | not present | not present | not present |
| dependent_slice_flag | per slice | 0/1 | 0/1 | 0/1 | 0/1 | 0/1 | 0/1 | 0/1 | 0/1 |
| Picture subdivision into tiles |  | No | Yes | No | No | Yes | No | Yes | Yes |
| Slice subdivision with entry points to indicate start of WPP sub stream or Title. |  | No | Yes | Yes | No | No | No | No (each substream ofa title in its own dependent slice) | Yes (each title in a separate slice and entry paints for WPP substreams within the slice of the title) |

| | Syntax level | | | | | | |
|---|---|---|---|---|---|---|---|
| parallel processing possible | in slice | in Tiles | WPP | Entrapy copding of slices | in Tiles | WPP | WPp substreams within Titles | WPP substreams within Titles |

With regard the above embodiments, it should be noted that the decoder could be configured to, for example, responsive to tiles_or_entropy_coding_sync_idc=1, 2, in the first and second mode, read information from current slice revealing a subdivision of the current slice into parallel subsections, wherein parallel subsections could be WPP substreams or tiles, cease the context adaptive entropy decoding at the end of the first parallel subsection and resume the context adaptive entropy decoding anew at a beginning of any subsequent parallel subsection including, in the first mode, an initialization of the symbol probabilities depending on saved states of symbol probabilities of the preceding parallel subsection and, in the second mode, an initialization of the symbol probabilities independent from any previously decoded slice and any previously decoded parallel sub section.

Thus, above description revealed methods for low delay encoding, decoding, encapsulation and transmission of structured video data as provided by the new HEVC coding standard, such as structured in tiles, Wavefront Parallel Processing (WPP) substreams, slices or entropy slices.

Especially, it has been defined how to transport parallel encoded data in a conversational scenario in order to gain minimum latency in the encoding, decoding and transmission process. Therefore it has been described a pipelined parallel coding, transmission and decoding approach in order to allow minimal delay applications like gaming, remote surgery, etc.

Furthermore, the above embodiments closed the gap of Wavefront Parallel Processing (WPP) to make it useable in low delay transmission scenarios. Therefore, a new encapsulation format for WPP substreams 0 has been presented, a dependent slice. This dependent slice may contain Entropy Slice data, a WPP substream, a full row of LCUs, just a fragment of a slice, where the prior transmitted slice_header also applies to the contained fragment data. The contained data is signaled in the sub slice_header.

It is finally noted, that the naming for the new slices could also be "Subset/Light weight slices", but the name "Dependent Slice" has been found to be better.

A signaling has been presented which describes the level of parallelization in coding and transport.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Thomas Wiegand, Gary J. Sullivan, Gisle Bjontegaard, Ajay Luthra, "Overview of the H.264/AVC Video Coding Standard", IEEE Trans. Circuits Syst. Video Technol., vol. 13, N7, July 2003.
[2] JCT-VC, "High-Efficiency Video Coding (HEVC) text specification Working Draft 6", JCTVC-H1003, February 2012.
[3] ISO/IEC 13818-1: MPEG-2 Systems specification.

The invention claimed is:

1. A decoder for decoding information from a datastream to reconstruct a picture, which is partitioned into portions, the decoder comprising:
a processor;
an entropy decoder configured to entropy decode, using the processor, the portions based on wavefront parallel processing (WPP), wherein the portions are grouped in one or more WPP substreams, and for each of the one or more WPP substreams, a first portion according to a slice order in a respective WPP substream starts at a left edge of the picture, and wherein the entropy decoder is configured to entropy decode a current portion of the portions according to one of at least two modes including:
in accordance with a first mode of the at least two modes, decode data related to the current portion using context adaptive entropy decoding to obtain a residual signal, wherein the context adaptive entropy decoding includes deriving contexts across portion boundaries and initializing a symbol probability associated with the current portion depending on a saved state of the symbol probability of a previously decoded portion, wherein, in initializing the symbol probability associated with the current portion in accordance with the first mode, the entropy decoder is configured to:
for a current coding block that is the first coding block from a left end of a current row of the picture in accordance with a raster scan order, initialize the symbol probability associated with the current portion based on a saved symbol probability as acquired in context adaptive entropy decoding the previously decoded portion up to a second coding block of a preceding row of the picture, wherein the second coding block of the preceding row of the picture includes a part of the picture, wherein the preceding row is associated with the previously decoded portion and neighbors the current row, and
otherwise, initialize the symbol probability associated with the current portion based on a symbol probability as acquired at an end of context adaptive entropy decoding the previously decoded portion, and in accordance with a second mode of the at least two modes, decode data related to the current portion using context adaptive entropy decoding to obtain a residual signal, wherein the context adaptive entropy decoding includes restricting the derivation of the contexts so as to not cross the portion boundaries and an initialization of the symbol probabilities independent of a previously decoded portion, and save the symbol probability as acquired in context adaptive entropy decoding the previously decoded portion up to the second coding block in the preceding row associated with the previously decoded portion in accordance with the raster scan order,
wherein the picture is partitioned into the portions, the portions are slices or slice segments, and the current portion includes information indicating a position within the picture at which entropy decoding of the current portion begins;
a predictor configured to generate, using the processor, a prediction signal based on prediction parameters related to the current portion from the datastream; and
a reconstruction module configured to reconstruct, using the processor, a portion of the picture related to the current portion based on the residual signal and the prediction signal.

2. The decoder according to claim 1, where the picture is partitioned in coding blocks arranged in rows and columns and having the raster scan order defined among each other and each portion of the portions is a slice, and the decoder is configured to associate each slice with a continuous subset of the coding blocks in the raster scan order so that the subsets follow each other along the raster scan order in accordance with a slice order.

3. The decoder according to claim 1, wherein, in initializing the symbol probability associated with the current portion in accordance with the first mode, the entropy decoder is configured to: responsive to a determination that the first coding block associated with the current portion is not the first coding block in the current row, initialize the symbol probability associated with the current portion based on a symbol probability as acquired at the end of context adaptive entropy decoding the previously decoded portion.

4. The decoder according to claim 1, wherein the entropy decoder is configured to be responsive to a syntax element portion within the current portion, the syntax element portion indicating which of the first and second modes to use for decoding.

5. The decoder according to claim 4, wherein the entropy decoder is configured to be responsive to a generic syntax element in the datastream so as to operate in one of at least two generic operating modes, with, according to a first generic operating mode, performing responsive to the syntax element portion for each portion, and, according to a second generic operating mode, using a different one of the at least two modes other than the first mode.

6. The decoder according to claim 1, wherein the entropy decoder is configured to according to the first and second modes, continue continuously updating the symbol probabilities from a beginning to an end of the current portion.

7. The decoder according to claim 1, wherein the entropy decoder is configured to save symbol probabilities as acquired in context adaptive entropy decoding the previously decoded portion up to an end of the previously decoded portion.

8. The decoder according to claim 1, wherein the entropy decoder is configured to, in the first and second modes, restrict the predictive decoding within tiles into which the picture is sub-divided.

9. The decoder according to claim 1, wherein the entropy decoder is configured to, in accordance with the first of the at least two modes, copy for the current portion, a portion of a slice header syntax from a preceding portion decoded in the second mode.

10. An encoder for encoding a picture into a datastream, wherein the picture is partitioned into portions, the encoder comprising:
 a processor;
 a residual module configured to generate, using the processor, a residual signal related to a current portion of the portions of the picture;
 a predictor configured to generate, using the processor, prediction parameters based on a prediction signal, wherein the prediction parameters are encoded into the datastream; and
 an entropy encoder configured to entropy encode, using the processor into the datastream, the portions based on wavefront parallel processing (WPP), wherein the portions are grouped in one or more WPP substreams, and for each of the one or more WPP substreams, a first portion according to a slice order in a respective WPP substream starts at a left edge of the picture, and the residual signal related to the current portion is to be entropy encoded according to one of at least two modes, wherein the entropy encoder is configured to:
 if the current portion is to be coded in accordance with a first mode of the at least two modes, encode the residual signal using context adaptive entropy encoding including deriving contexts across portion boundaries and initializing a symbol probability associated with the current portion depending on a saved state of the symbol probability of a previously encoded portion, wherein, in initializing the symbol probability associated with the current portion in accordance with the first mode, the entropy encoder is configured to:
 for a current coding block that is the first coding block from a left end of a current row of the picture in accordance with a raster scan order, initialize the symbol probability associated with the current portion based on the saved symbol probability as acquired in context adaptive entropy encoding the previously encoded portion up to a second coding block of a preceding row of the picture, wherein the second coding block of the preceding row of the picture includes a part of the picture, wherein the preceding row is associated with the previously encoded portion and neighbors the current row, and
 otherwise, initialize the symbol probability associated with the current portion based on a symbol probability as acquired at an end of context adaptive entropy encoding the previously encoded portion, and
 if the current portion is to be coded in accordance with a second mode of the at least two modes, encode the residual signal using context adaptive entropy encoding with restricting the derivation of the contexts so as to not cross the portion boundaries and initializing the symbol probabilities independent of any previously encoded portion, and save the symbol probability as acquired in context adaptive entropy encoding the previously encoded portion up to the second coding block in the preceding row associated with the previously encoded portion in accordance with the raster scan order, wherein the picture is partitioned into the portions, the portions are slices or slice segments, and the current portion includes information indicating a position within the picture at which entropy encoding of the current portion begins.

11. The encoder according to claim 10, where the picture is partitioned in coding blocks arranged in rows and columns and having the raster scan order defined among each other and each portion of the portions is a slice, and the encoder is configured to associate each slice with a continuous subset of the coding blocks in the raster scan order so that the subsets follow each other along the raster scan order in accordance with a slice order.

12. The encoder according to claim 10, wherein, in initializing the symbol probability associated with the current portion in accordance with the first mode, the entropy encoder is configured to: responsive to a determination that the first coding block associated with the current portion is not the first coding block in the current row, initialize the symbol probability associated with the current portion based on a symbol probability as acquired at the end of context adaptive entropy encoding the previously encoded portion.

13. The encoder according to claim 10, wherein the entropy encoder is configured code a syntax element portion within the current portion of the portions, the syntax element portion indicating which of the first and second modes to use for encoding.

14. The encoder according to claim 13, wherein the entropy encoder is configured to determine a generic syntax element and write the generic syntax element into the datastream with operating in one of at least two generic operating modes depending on the generic syntax element, namely, with, according to a first generic operating mode, performing coding the syntax element portion for each portion, and, according to a second generic operating mode, inevitably using a different one of the at least two modes other than the first mode.

15. The encoder according to claim 10, wherein the entropy encoder is configured to according to the first and second modes, continue continuously updating the symbol probabilities from a beginning to an end of the current portion.

16. The encoder according to claim 10, where the entropy encoder is configured to save symbol probabilities as acquired in context adaptive entropy encoding the previously encoded portion up to an end of the previously encoded portion.

17. The encoder according to claim 10, where the entropy encoder is configured to, in the first and second modes, restrict the predictive encoding within tiles into which the picture is sub-divided.

18. A non-transitory computer-readable medium for storing data associated with a video, comprising:
 a data stream stored in the non-transitory computer-readable medium, the data stream comprising encoded information related to a picture of a video, wherein the picture is partitioned in units of portions, wherein a processor is configured to code the encoded information into the data stream for storing in the non-transitory computer-readable medium using operations including:
 generating a residual signal related to a current portion of the portions of the picture;

generating prediction parameters based on a prediction signal, wherein the prediction parameters are encoded into the datastream;

entropy encoding the portions based on wavefront parallel processing (WPP), wherein the portions are grouped in one or more WPP substreams, and for each of the one or more WPP substreams, a first portion according to a slice order in a respective WPP substream starts at a left edge of the picture, and the residual signal related to the current portion is to be entropy encoded according to one of at least two modes, wherein the entropy encoding includes:

if the current portion is to be coded in accordance with a first mode of the at least two modes, encoding the residual signal using context adaptive entropy encoding including deriving contexts across portion boundaries and initializing a symbol probability associated with the current portion depending on a saved state of the symbol probability of a previously encode portion, wherein, in initializing the symbol probability associated with the current portion in accordance with the first mode, the entropy encoding includes:

for a current coding block that is the first coding block from a left end of a current row of the picture in accordance with a raster scan order, initializing the symbol probability associated with the current portion based on the saved symbol probability as acquired in context adaptive entropy encoding the previously encoded portion up to a second coding block of a preceding row of the picture, wherein the second coding block of the preceding row of the picture includes a part of the picture, wherein the preceding row is associated with the previously encoded portion and neighbors the current row, and otherwise, initializing the symbol probability associated with the current portion based on a symbol probability as acquired at an end of context adaptive entropy encoding the previously encoded portion, and if the current portion is to be coded in accordance with a second mode of the at least two modes, encoding the residual signal using context adaptive entropy encoding with restricting the derivation of the contexts so as to not cross the portion boundaries and initializing the symbol probabilities independent of any previously encoded portion, and saving the symbol probability as acquired in context adaptive entropy encoding the previously encoded portion up to the second coding block in the preceding row associated with the previously encoded portion in accordance with the raster scan order, wherein the picture is partitioned into the portions, the portions are slices or slice segments, and the current portion includes information indicating a position within the picture at which entropy encoding of the current portion begins.

19. The non-transitory computer-readable medium according to claim 18, wherein the operations include, in initializing the symbol probability associated with the current portion in accordance with the first mode, the entropy encoding includes: responsive to a determination that the first coding block associated with the current portion is not the first coding block in the current row, initializing the symbol probability associated with the current portion based on a symbol probability as acquired at the end of context adaptive entropy encoding the previously encoded portion.

* * * * *